(12) United States Patent
Manofsky, Jr. et al.

(10) Patent No.: US 8,950,433 B2
(45) Date of Patent: Feb. 10, 2015

(54) MANIFOLD SYSTEM FOR GAS AND FLUID DELIVERY

(75) Inventors: William L. Manofsky, Jr., Ridgecrest, CA (US); Eric J. Redemann, Corona Del Mar, CA (US); Donald H. Julian, San Jose, CA (US)

(73) Assignee: Advantage Group International Inc., Ridgecrest, CA (US)

( * ) Notice: Subject to any disclaimer, the term of this patent is extended or adjusted under 35 U.S.C. 154(b) by 372 days.

(21) Appl. No.: 13/462,511

(22) Filed: May 2, 2012

(65) Prior Publication Data

US 2012/0279592 A1 Nov. 8, 2012

Related U.S. Application Data

(60) Provisional application No. 61/518,184, filed on May 2, 2011, provisional application No. 61/519,582, filed on May 25, 2011, provisional application No. 61/629,180, filed on Nov. 14, 2011, provisional application No. 61/630,133, filed on Dec. 5, 2011.

(51) Int. Cl.
*F16K 27/00* (2006.01)
*G05D 7/00* (2006.01)

(52) U.S. Cl.
CPC ........................................ *G05D 7/00* (2013.01)
USPC .......................................................... 137/884

(58) Field of Classification Search
USPC ......................................... 137/269, 271, 884
See application file for complete search history.

(56) References Cited

U.S. PATENT DOCUMENTS

| | | | |
|---|---|---|---|
| 5,368,062 A * | 11/1994 | Okumura et al. | 137/240 |
| 5,488,925 A | 2/1996 | Kumada | |
| 5,605,179 A * | 2/1997 | Strong et al. | 137/884 |
| 5,769,110 A | 6/1998 | Ohmi et al. | |
| 5,819,782 A | 10/1998 | Itafuji | |
| 5,836,355 A | 11/1998 | Markulec et al. | |
| 5,901,984 A | 5/1999 | Nishikawa | |
| 5,964,481 A | 10/1999 | Buch | |
| 5,975,112 A | 11/1999 | Ohmi et al. | |
| 5,979,944 A | 11/1999 | Yokoyama et al. | |
| 5,983,933 A | 11/1999 | Ohmi et al. | |
| 5,988,217 A | 11/1999 | Ohmi et al. | |
| 5,992,463 A | 11/1999 | Redemann et al. | |
| 6,035,893 A | 3/2000 | Ohmi et al. | |

(Continued)

FOREIGN PATENT DOCUMENTS

EP 0845623 A1 6/1998
EP 1571381 A2 9/2005

(Continued)

*Primary Examiner* — John Fox

(57) ABSTRACT

A fluid delivery system includes a manifold plate having an upper surface, four vertical sides, and a lower surface opposite the upper surface, where the manifold plate includes a gas inlet, a gas outlet, and a plurality of component receiving stations, one or more component receiving stations located on the upper surface and two or more component receiving stations located on the lower surface. The manifold plate also includes a plurality of internal fluid passageways interconnecting the gas inlet, the plurality of component receiving stations, and the gas outlet. The system also includes a plurality of active fluid components, one active fluid component coupled to a corresponding one component receiving station on the manifold plate. The fluid delivery system can be configured having a single channel or a dual channel.

3 Claims, 40 Drawing Sheets

(56) References Cited

U.S. PATENT DOCUMENTS

| | | | |
|---|---|---|---|
| 6,039,360 A | 3/2000 | Ohmi et al. |
| 6,068,016 A | 5/2000 | Manofsky, Jr. et al. |
| 6,085,783 A | 7/2000 | Hollingshead |
| 6,109,303 A | 8/2000 | Itafuji et al. |
| 6,116,282 A | 9/2000 | Yamaji et al. |
| 6,116,283 A | 9/2000 | Yamaji et al. |
| 6,125,887 A | 10/2000 | Pinto |
| 6,135,155 A | 10/2000 | Ohmi et al. |
| 6,142,539 A | 11/2000 | Redemann et al. |
| 6,152,175 A | 11/2000 | Itoh et al. |
| 6,186,177 B1 | 2/2001 | Maher |
| 6,189,570 B1 | 2/2001 | Redemann et al. |
| 6,192,938 B1 | 2/2001 | Redemann et al. |
| 6,209,571 B1 | 4/2001 | Itoh et al. |
| 6,257,270 B1 | 7/2001 | Ohmi et al. |
| 6,260,581 B1 | 7/2001 | Hollingshead |
| 6,273,139 B1 | 8/2001 | Ohmi et al. |
| 6,283,155 B1 | 9/2001 | Vu |
| 6,293,310 B1 | 9/2001 | Redemann et al. |
| 6,302,141 B1 | 10/2001 | Markulec et al. |
| 6,349,744 B1 | 2/2002 | Grosshart |
| 6,361,081 B1 | 3/2002 | Yokoyama et al. |
| 6,374,859 B1 | 4/2002 | Vu et al. |
| 6,382,238 B2 | 5/2002 | Ishii et al. |
| 6,394,138 B1 | 5/2002 | Vu et al. |
| 6,408,879 B1 | 6/2002 | Ohmi et al. |
| 6,415,822 B1 | 7/2002 | Hollingshead |
| 6,435,215 B1 | 8/2002 | Redemann et al. |
| 6,474,700 B2 | 11/2002 | Redemann et al. |
| 6,502,601 B2 | 1/2003 | Eidsmore et al. |
| 6,543,483 B2 * | 4/2003 | Johnson ........................ 137/884 |
| 6,546,960 B1 * | 4/2003 | Rohrberg et al. ............. 137/884 |
| 6,615,871 B2 | 9/2003 | Morokoshi et al. |
| 6,629,546 B2 | 10/2003 | Eidsmore et al. |
| 6,644,353 B1 | 11/2003 | Eidsmore |
| 6,729,353 B2 | 5/2004 | Nguyen |
| 6,769,463 B2 | 8/2004 | Vu |
| 6,776,193 B2 | 8/2004 | Eidsmore |
| 6,874,538 B2 | 4/2005 | Bennett |
| 6,886,599 B2 | 5/2005 | Ichikawa et al. |
| 6,938,644 B2 | 9/2005 | Eidsmore |
| 7,048,007 B2 | 5/2006 | Nordstrom et al. |
| 7,048,008 B2 | 5/2006 | Milburn |
| 7,178,556 B2 | 2/2007 | Reid, II et al. |
| 7,195,037 B2 | 3/2007 | Eidsmore |
| 7,213,618 B2 | 5/2007 | Milburn et al. |
| 7,225,835 B2 | 6/2007 | Vu |
| 7,258,139 B2 | 8/2007 | Perusek et al. |
| 7,334,605 B2 | 2/2008 | Vu |
| 7,806,143 B2 * | 10/2010 | Taskar ........................... 137/884 |
| 7,967,882 B2 * | 6/2011 | DiPrizio et al. ................. 55/309 |
| 8,322,380 B2 * | 12/2012 | Taskar ........................... 137/884 |
| 8,820,360 B2 * | 9/2014 | Oya et al. ...................... 137/884 |

FOREIGN PATENT DOCUMENTS

| | | |
|---|---|---|
| EP | 1683994 A2 | 7/2006 |
| JP | 2865644 | 12/1998 |
| WO | 0116512 A1 | 3/2001 |
| WO | 2004088772 A2 | 10/2004 |

* cited by examiner

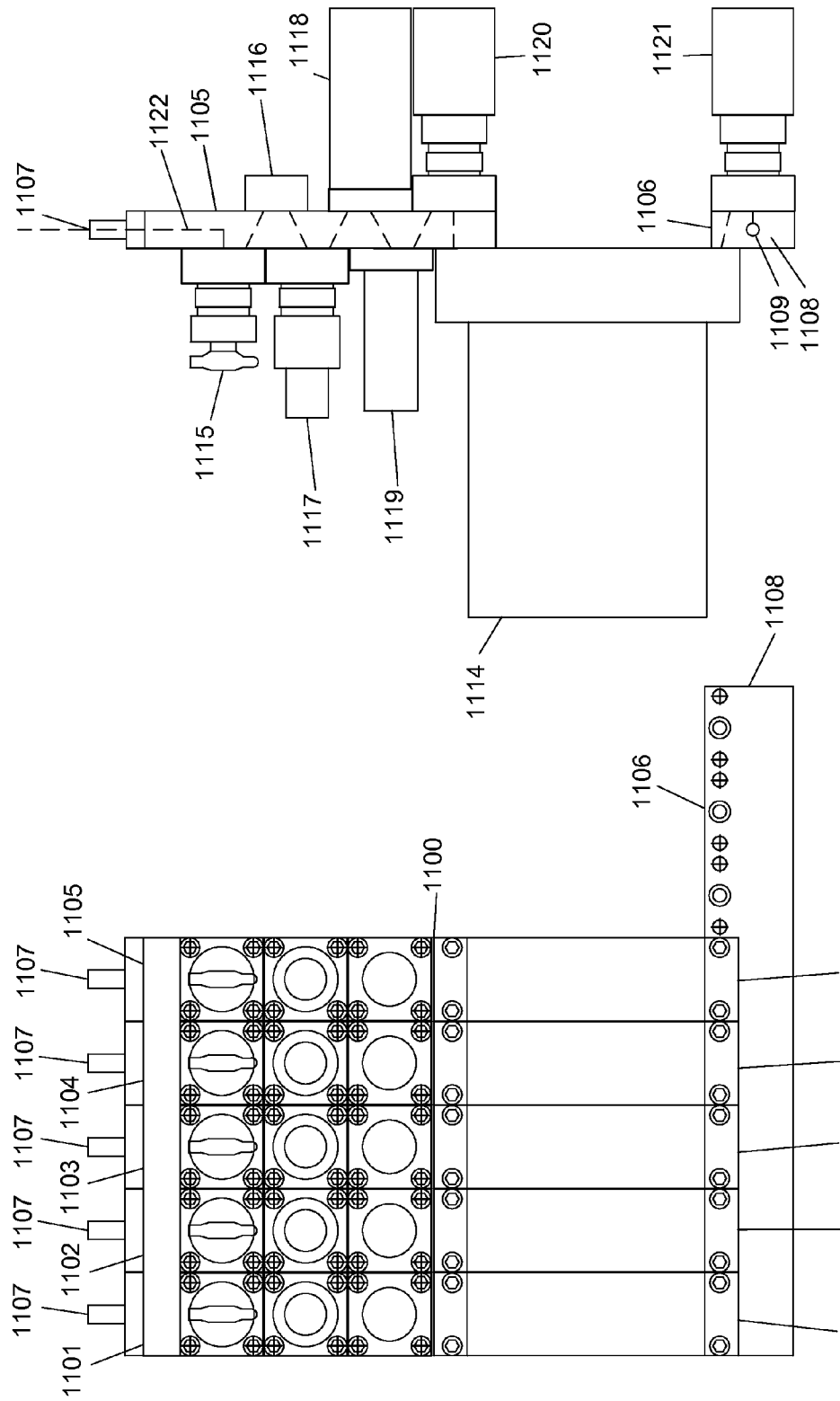

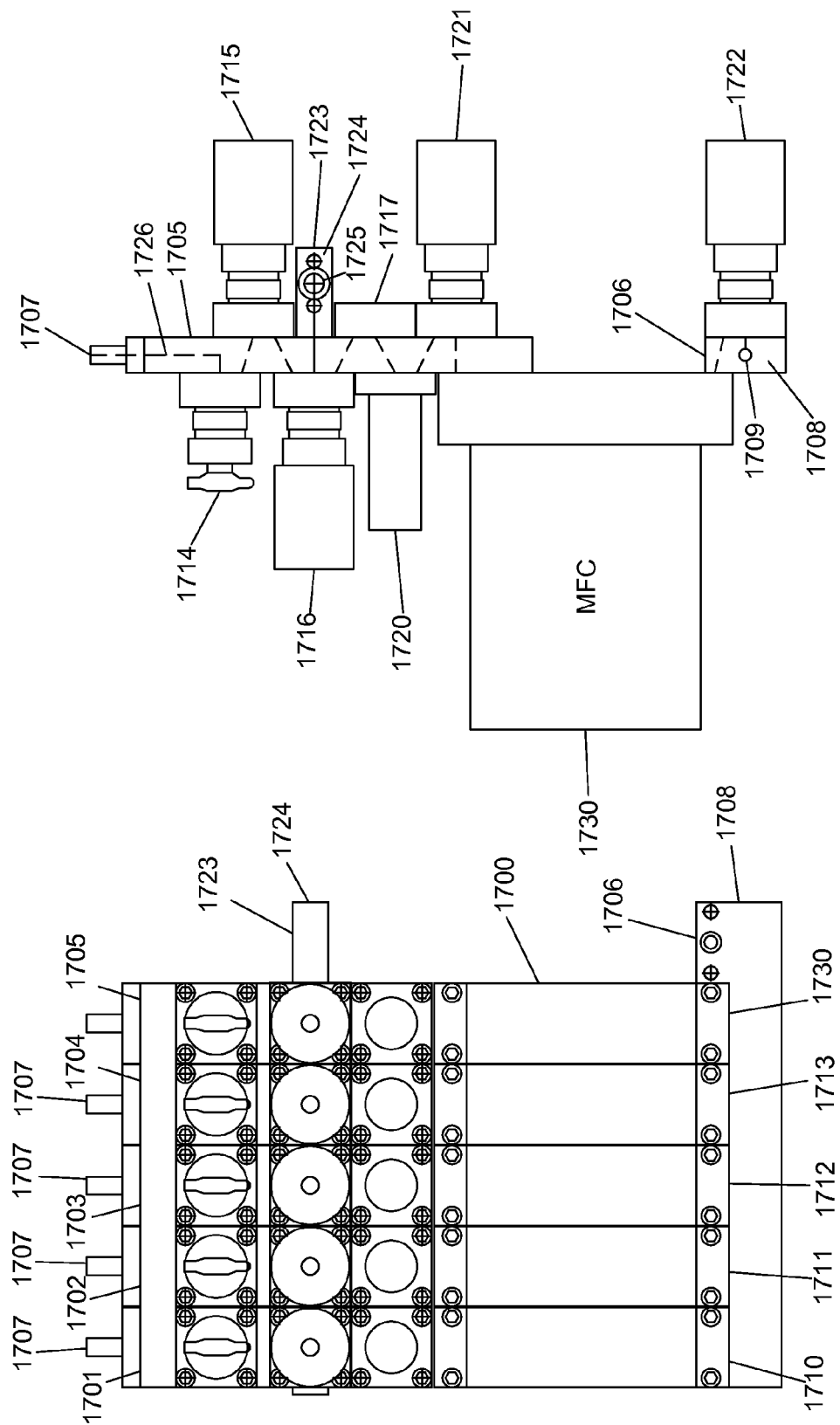

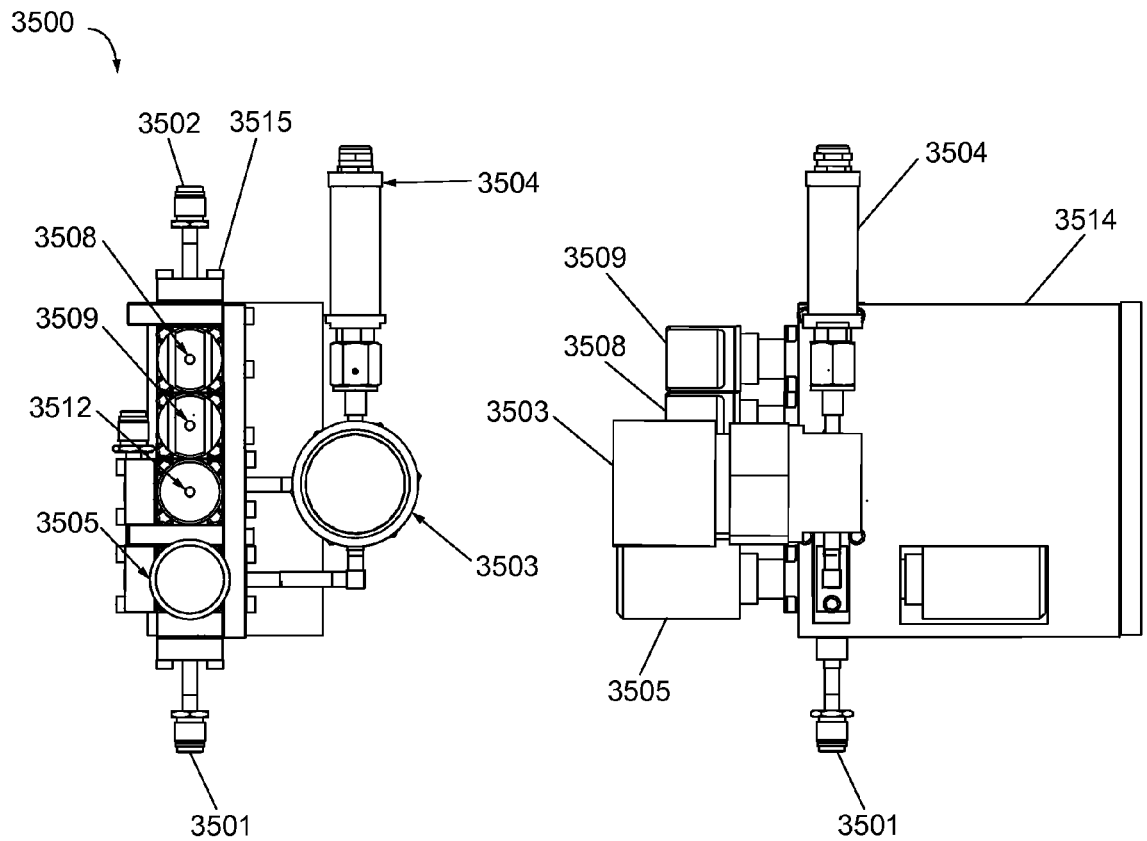
FIG 28A
FIG 28B
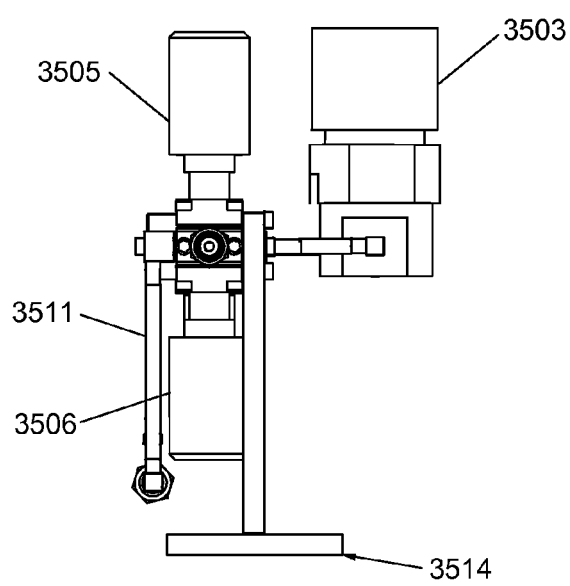
FIG 28C

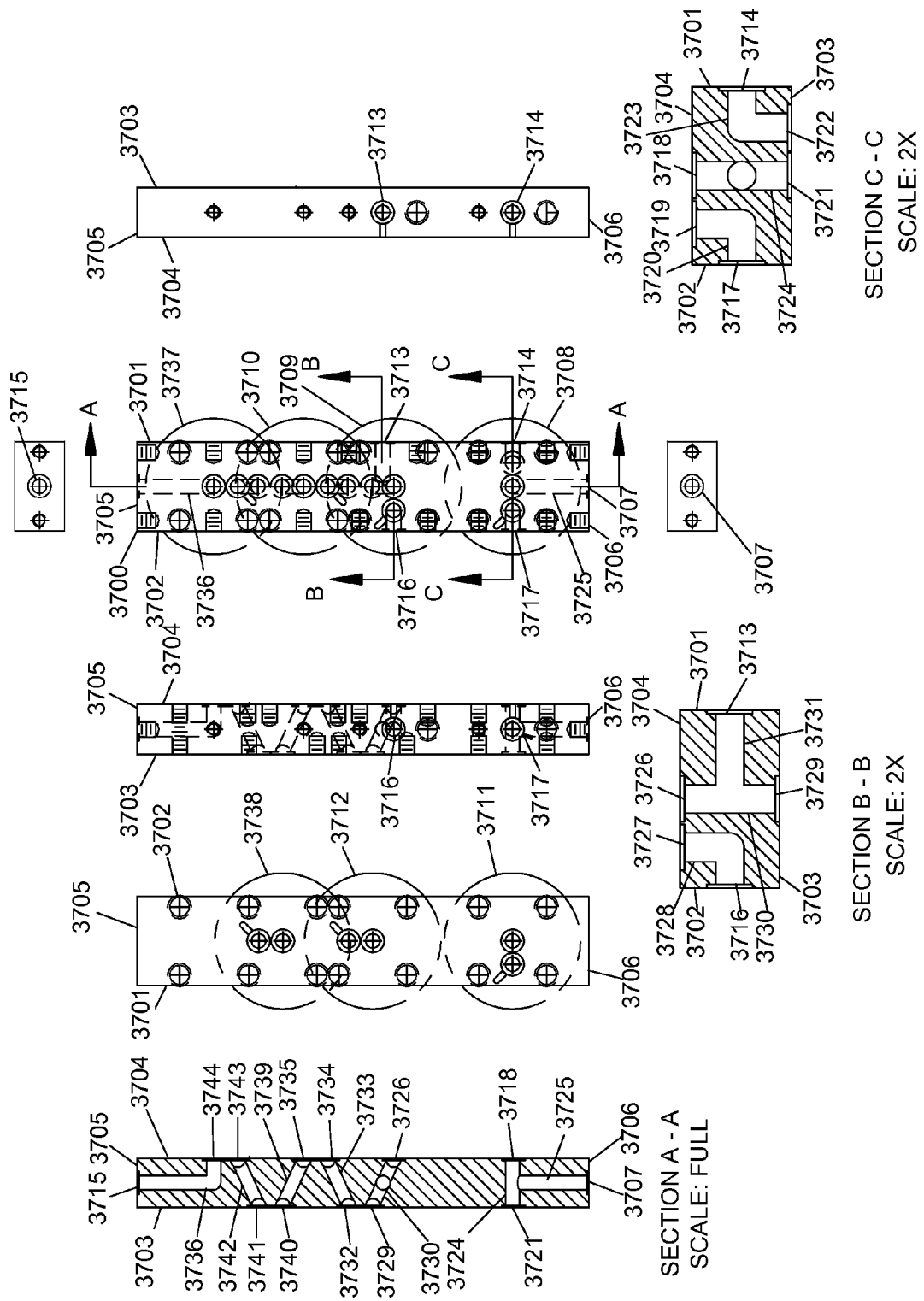

MANIFOLD SYSTEM FOR GAS AND FLUID DELIVERY

RELATED APPLICATIONS

This application claims priority of U.S. Provisional Application, Ser. No. 61/518,184, filed May 2, 2011, and entitled "Two Sided Manifold Body For Gas And Fluid Delivery Systems." This application also claims priority of U.S. Provisional Application, Ser. No. 61/519,582, filed May 25, 2011, and entitled "Two Sided Manifold Plate And Rail System For Gas And Fluid Delivery." This application claims priority of U.S. Provisional Application, Ser. No. 61/629,180, filed Nov. 14, 2011, and entitled "Dual Channel Two Sided Manifold Body For Gas And Fluid Delivery Systems." This application claims priority of U.S. Provisional Application, Ser. No. 61/630,133, filed Dec. 5, 2011, and entitled "Dual Channel Manifold System For Gas And Fluid Delivery Systems." This application incorporates U.S. provisional application, Ser. Nos. 61/518,184, 61/519,582, 61/629,180, and 61/630,133 in their entireties by reference.

FIELD OF THE INVENTION

The present invention relates to modular fluid handling systems which include a specialized mounting structure that may be used to form a variety of different fluid handling configurations.

BACKGROUND OF THE INVENTION

The fluid handling systems of interest typically handle corrosive and toxic materials, but may handle non-toxic and even inert fluids as well. The fluids may be in the form of gases, vapors, and liquids under various degrees of pressure that can be positive or negative relative to atmospheric pressure. The fluid handling systems are useful in the chemical processing industry in general, whether that industry relates to semiconductor processing, MEMS and micro device fabrication, energy conversion and device fabrication, pharmaceutical production, biomaterial production or analysis, and a multitude of other instances where the ease in obtaining a sealed fluid handling system is important, ease of configuring the fluid handling system is important, and ability to maintain the fluid handling system with minimal down time is important.

Semiconductor processing utilizes inert, toxic, corrosive, and flammable gases which require the use of various operative fluid flow control and fluid filtering devices to ensure that the proper quantity of contaminant free gas reaches a semiconductor process chamber. The operative fluid flow control and filtering devices, for example, are assembled in linear clusters of interconnected elements forming individual gas specific flow control channels which are known in the industry as "gas sticks". Typically, these gas sticks are then typically mounted to a common manifold, with the entire distribution assembly then mounted to a pallet for handling and maintenance purpose. These gas sticks are typically single channel devices. The semiconductor industry employs processing which makes use of processing gases which are toxic and/or corrosive. There are numerous publications, including patents, which relate to fluid handling systems for the semiconductor industry. Such gases, or liquids and vapors require specialized handling equipment for transport, pressure reduction, filtering, mass flow control, fluid mixing and other known related functions.

Examples of related disclosures which are informative regarding previous efforts to meet industry needs include U.S. Pat. No. 6,125,887 to Pinto, issued Oct. 3, 2000, discloses welded modular blocks provided in a variety of standard selectable configurations that permit fabrication of gas panels and other fluid flow control systems for high purity, leak-proof applications. Each module is pre-welded and provided with mating ports to receive gas control components such as valves, controllers, pressure regulators, and the like. The mating ports are configured to receive a single one gas control component on each of opposing sides. Each module is also provided with one or more connector tube stubs which may be welded to a tube stub of another module to form an array of modular blocks and associated components. The components are bolted to the modular blocks and may be readily removed for servicing. The welding of the standardized blocks obviates costly seals otherwise needed to prevent leakage.

U.S. Pat. No. 5,992,463 to Redemann, issued Nov. 30, 1999; U.S. Pat. No. 6,189,570 to Redemann, issued Feb. 20, 2001; and U.S. Pat. No. 6,293,310 to Redemann, issued Sep. 25, 2001; each disclose a gas panel for use with a tool for manufacturing a semiconductor includes a one-piece manifold body having an inlet for receiving a process gas. The manifold body has at least one lateral wall extending in the general direction of the gas flow. The lateral wall includes at least one operative device site having an operative device thereon. In some embodiments, the operative device sites are all configured on a single side of the manifold body. In other embodiments, the operative device sites are all configured on adjacent sides of the manifold body. In either case, gas carrying pathways formed in the manifold body for connecting component receiving stations on the same or adjacent side are V-shaped. The operative device is in gas communication with a gas carrying path. The operative device may be a manual valve, a pneumatic valve, a pressure regulator, a pressure transducer, a purifier, a filter, or a flow controller. The gas is received from the operative device at a continuation of the gas flow path in the manifold body and is conveyed to a manifold outlet and ultimately to the tool.

U.S. Pat. No. 6,068,016 to Manofsky, issued May 30, 2000, discloses a modular, monolithic pump-purge system which can be integrated into a modular, monolithic fluid handling system without creating a closed tolerance loop. In particular the pump-purge system comprises a plurality of valves mounted on a modular monolithic fluid handling system. At least a portion, and preferably all of the fluid transfer conduits necessary for either applying a vacuum (or other evacuation means) to a fluid handling system conduit which is to be evacuated (pumped), or for transfer of flushing fluid within a conduit (purging) are present within monolithic manifolds of the fluid handling system. The modular, monolithic manifold of the pump-purge system contains openings and fluid flow conduits which correspond with openings and fluid flow conduits of the modular, monolithic fluid handling system, to enable evacuation or flushing of a selected fluid flow conduit within the fluid handling system. To avoid the formation of a closed tolerance loop, it is necessary that the pump-purge manifold or a portion of the modular, monolithic fluid handling system manifold to which it is attached be sufficiently free-floating to permit making of all necessary connections without creating stress which can lead to an increased rate of corrosion or failure of the connection. In some embodiments of the gas handling system, the gas handling flow lines which make up the system are comprised of individual sticks of gas handling elements, each of which is attached to the manifold of the pump-purge system that is free-floating.

U.S. Pat. No. 6,394,138 to Kim Vu, issued May 28, 2002, discloses a manifold system for enabling a distribution of fluids includes a plurality of individual manifold blocks that can be joined together to form a gas stick. Each manifold block has a fluid passageway with an entrance port and exit port accessing a common surface.

An operative component can be mounted to one manifold block, while extending across a port of an adjacent manifold block. An alignment system can be provided to ensure that the entrance and exit ports are positioned in a plane containing the common surface to facilitate sealing.

U.S. Pat. No. 6,546,961 to Yoshitomo Fukushima, issued Apr. 15, 2003 discloses an integrated gas control device that has an elongated base having a pair of ribs longitudinally extending on the base to form a groove there-between. A plurality of passage blocks are mounted in the groove. Each of the passage blocks has a gas passage having openings opened at an upper surface at both ends of the block. A plurality of gas control equipments are mounted on adjacent passage blocks. Each of the gas control equipments is installed on the base.

U.S. Pat. No. 6,874,538 to Kevin S. Bennett, issued Apr. 5, 2005 discloses a fluid delivery system, including a mounting structure, a plurality of rows of locator alignment components secured to the mounting structure, and a plurality of rows of fluid connecting pieces, each having inlet and outlet ports and a fluid communication passage interconnecting the ports. The fluid connecting pieces are arranged in pairs, each pair including two of the fluid connecting pieces located next to one another in a respective row of fluid connecting components. The fluid connecting pieces of each pair are releasably held by and aligned relative to one another by a respective one of the locator alignment components. A plurality of manifold pieces extend transversely to the rows of fluid connecting pieces. At least one manifold piece has a manifold passage with a center line crossing over a center line interconnecting to the farthest ports of one of the pairs and is removable without removing the locator alignment component by which the respective pair is held from the mounting structure.

Those skilled in the art recognize a number of issues associated with prior art fluid distribution systems. First, cost of materials is quite high due to the extensive amount of difficult to obtain and costly ultra-pure stainless steel involved in the manufacture of individual operative fluid flow control and filtering devices that make up a gas stick. Additional manufacturing costs for individual operative fluid flow control and filtering devices are quite high due to multiple machining steps and the multiple fittings and pipe sections that need to be welded so that the individual operative fluid flow control and filtering devices can be secured to one another. Similarly the assembly and disassembly of those devices can be relatively labor intensive. This type of design is also prone to leakage due to the loosening of fittings under sustained vibration loads.

Efforts to alleviate these problems have resulted in the use of modular surface mount designs incorporating substrate block systems on which operative fluid flow control and filtering devices are mounted in a serial manner to form individual gas sticks. These designs practically eliminate the need for welding of interconnect fittings by forming a continuous flow channel through the use of metal seals between the substrate blocks and the corresponding surface mounted operative fluid flow control and filtering devices.

Nevertheless, modular surface mount designs continue to incorporate a relatively significant amount of costly ultra-pure stainless steel. Modular surface mount designs also require an inordinate number of parts to complete a gas delivery system. In fact they contain significantly more parts than the prior art systems they are designed to replace. High part count results in significant inventory control problems and possible parts shortages. Also, large number of parts increases the complexity of manufacturing.

Modular surface mount designs also require that all operative fluid flow control and filtering devices be located on the same side of the individual gas sticks for ease of maintenance. This requirement drives costly and more complex designs for gas sticks.

SUMMARY OF THE INVENTION

A fluid delivery system includes a manifold plate having an upper surface, four vertical sides, and a lower surface opposite the upper surface, where the manifold plate includes a gas inlet and a plurality of component receiving stations, one or more component receiving stations located on the upper surface and two or more component receiving stations located on the lower surface. A component receiving station can be configured to have an inlet port, an outlet port, or both an inlet port and an outlet port. The manifold plate also includes a plurality of internal fluid passageways interconnecting the gas inlet and the plurality of component receiving stations. The system also includes a plurality of active fluid components, one active fluid component coupled to a corresponding one component receiving station on the manifold plate. The manifold plate can also include additional component receiving stations to which non-active fluid components can be connected. The fluid delivery system can be configured having a single channel or a dual channel.

When the active fluid components are connected to opposing sides of the manifold plate, each of the active fluid components is connected to a respective receiving station thus completing a sealed interconnection of the respective internal fluid passageways and the active fluid components, thereby forming one or more respective fluid control channels within the manifold plate.

In the dual channel configuration, the manifold plate includes both upstream and downstream channels to which can be attached a primary fluid control device such as a pressure regulator. A preferred use of the present disclosure is to combine the high pressure and low pressure active control components commonly configured on the upstream and downstream side of a gas delivery pressure regulator.

The present disclosure also enables the placement of operative fluid flow control and pressure sensing devices on the front and back sides with the minimal use of difficult to obtain ultrapure stainless steel, minimal machining, minimal part count, and extremely compact size without the need for additional pipe fitting, welding, and plumbing activities, which require special skills and which generate expensive down time. Although prior art modular surface mount designs required that all operative fluid flow control and filtering devices be located on the same side of the individual gas sticks for ease of maintenance, actual experience shows that gas sticks for toxic and inert gasses do not require this access since the operative fluid flow control and filtering devices that form these gas sticks have very high reliability and rarely need to be replaced. Experience also shows that when a gas stick used on a corrosive gas fails, the entire stick is removed as an assembly by the end user instead of their independently replacing individual devices.

The general concepts are applicable to fluid flow systems in general.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIG. 11A shows a top view third embodiment of the present invention fluid delivery system.

FIG. 11B is a side view schematic of a single gas channel of FIG. 11A.

FIG. 17A shows a top view sixth embodiment of the present invention fluid delivery system.

FIG. 17B is a side view schematic of a single gas channel of FIG. 17A.

FIG. 28A, FIG. 28B, FIG. 28C and FIG. 28D show multiple views of an assembled fluid delivery system according to an embodiment of the present invention.

FIG. 30 shows a second embodiment of a dual channel two sided manifold plate of a kind contemplated in the present invention.

DETAILED DESCRIPTION OF THE EMBODIMENTS

Figure 1:
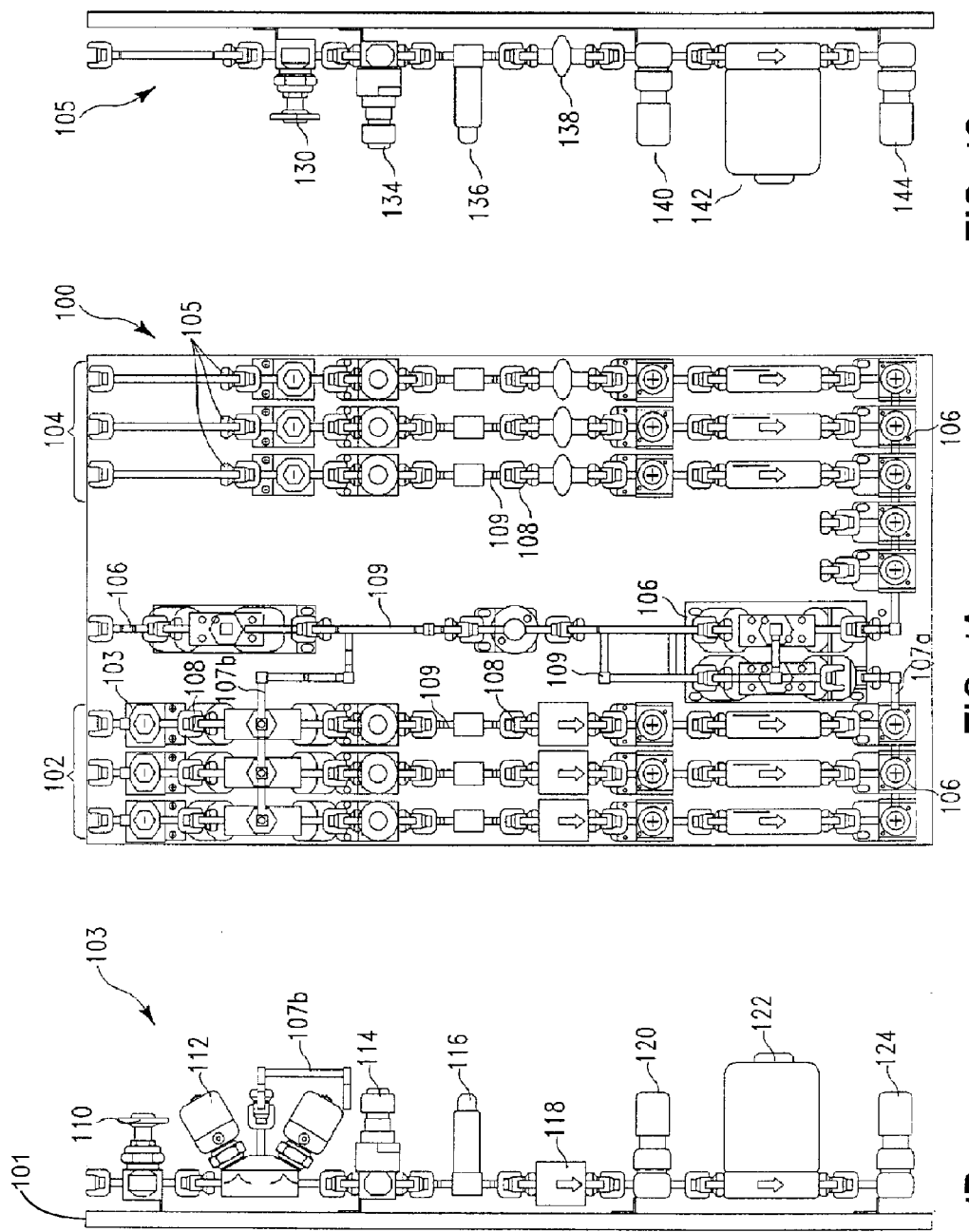
FIG. 1A is a top view schematic of a prior art fluid distribution system mounted on a pallet.
FIG. 1B is a side view schematic of the hazardous gas delivery stick of FIG. 1A.
FIG. 1C is a side view schematic of the inert gas delivery stick of FIG. 1A.

Embodiments of the present application are directed to a fluid delivery system. Those of ordinary skill in the art will realize that the following detailed description of the fluid delivery system is illustrative only and is not intended to be in any way limiting. Other embodiments of the fluid delivery system will readily suggest themselves to such skilled persons having the benefit of this disclosure.

Reference will now be made in detail to implementations of the fluid delivery system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

I. Definitions

As a preface to the detailed description, it should be noted that, as used in this specification and the appended claims, the singular forms of "a", "an", and "the" include plural referents, unless the context clearly dictates otherwise. Thus, for example, the term "a semiconductor" includes a variety of different materials which are known to have the behavioral characteristics of a semiconductor. "A modular/monolithic gas handling system" may be capable of handling one gas or several gases and may comprise one module or several modules combined in a cluster.

Specific terminology of particular importance to the description of the present invention is defined below.

For simplicity, the term "fluid" refers to either a gas, a vapor, or a fluid.

The term "fluid control system" refers to a gas, a vapor, and/or fluid processing system of the kind typically used in the chemical processing industry where gases, vapors, and/or fluids are transported through pressure reduction equipment, filters, mass flow controllers, and mixing equipment.

The term "gas distribution system" refers to an exemplary fluid processing system where the fluid is a gas.

The term "modular" refers to a component or combination of components which make up a unitary structure, where the unitary structure is designed to be arranged or joined to other unitary structures in a variety of ways to create a desired system. In embodiments, a modular fluid distribution system is made up of a combination of fluid handling elements supplied as unitary structures which can be arranged and attached together to form the desired fluid distribution system. A modular fluid distribution system typically includes a series of fluid handling elements, and a common means of providing interconnection of two or more fluid handling elements.

The term "monolithic" refers to something made from a single block of material.

In the present instance, a monolithic fluid distribution system refers to a system comprised of one or more fluid distribution modules where each module includes one or more monolithic conduits for transport of gas, vapor, and/or fluid between operative fluid distribution elements within the module. In some embodiments, a modular/monolithic fluid distribution system includes the placement of lateral monolithic blocks enabling the interconnection of two or more fluid distribution modules which enables the transport of gas, vapor, and/or fluid from the fluid distribution modules to downstream processing equipment either individually or at the same time.

II. Description of Embodiments of Fluid Distribution Systems

The present disclosure enables the placement of operative fluid flow control and filtering devices, collectively referred to as fluid components, on opposing sides of a manifold plate. The opposing sides of the manifold plate are configured with a plurality of component receiving stations, each for receiving a fluid component. The manifold plate is configured with fluid pathways for interconnecting component receiving stations on opposing sides. In some embodiments, a fluid pathway that interconnects a component receiving station on one side of the manifold plate to a component receiving station on an opposing side of the manifold plate is a single axis, straight line pathway. Interconnecting fluid components on opposing sides of the manifold plate and using single axis pathways enables a shorter overall fluid path through the fluid delivery system than conventional configurations, thereby decreasing the necessary size of the manifold block. Further, single axis fluid pathways interconnecting component receiving stations on opposite sides of the manifold plate enables reduced thickness of the manifold plate as compared to conventional V-shaped fluid pathways. As the manifold block is typically made of expensive ultra pure stainless steel, this decrease in size reduces cost. Single axis fluid pathways are also easier and faster to manufacture than conventional V-shaped fluid pathways. Further, single axis pathways eliminate pressure drops associated with bends in fluid pathways, including V-shaped fluid pathways. In general, the fluid delivery system including the manifold plate enables minimal use of difficult to obtain ultra pure stainless steel, minimal machining, minimal part count, and extremely compact size without the need for additional pipe fitting, welding, and plumbing activities which require special skills and which generate expensive down time. The general concepts are applicable to fluid flow systems in general.

The inventive configurable two sided manifold plate for gas and fluid delivery systems is described herein with respect to semiconductor processing apparatus, because this industry is expected to be one of the larger industries in which the configurable two sided manifold plate is used. However, as discussed above, this is not the only technological field which is expected to make use of the system.

As a means of introducing a fluid distribution system in general, FIG. 1A through FIG. 6 show a typical previously known pallet comprising gas handling equipment of the kind used to supply processed gases to a variety of reactor chambers during the processing of semiconductor substrates.

FIG. 1A is a top view schematic of a prior art fluid distribution system mounted on a pallet. This fluid distribution system is of the kind generally used to deliver gases to process chambers in the semiconductor industry. The distribution system includes three inert gas flow lines known to those skilled in the art as "sticks" shown on the right side of FIG. 1A, three corrosive gas sticks shown on the left side of FIG. 1A, and a pump-purge line in the center between the inert gas sticks and the corrosive gas sticks. In this particular design, operative fluid flow control and filtering devices include welded on fittings used to interconnect each device which, in specific combinations, then form individual gas sticks. FIG. 1A is a top view of the pallet 100, including a bank 102 of three hazardous gas sticks 103 and a bank 104 of three non-hazardous, or inert, gas sticks 105. The hazardous gas sticks 103 require pump-purge capability. A vacuum pump (not shown) is applied to a hazardous gas stick 103 to evacuate the hazardous gas and an inert gas such as nitrogen or argon is pressured into the line to purge any remaining hazardous gas. This pump-purge may be repeated several times if necessary to provide for the complete removal of the hazardous gas. The pump-purge process is enabled by a pump-purge system 106 which provides for the removal of hazardous gases from sticks 103 at the end of the gas flow path, at 107a, and which enables the addition of purge gas at double headed valves 112 (FIG. 1B) near the beginning of the flow path at 107b.

FIG. 1A is the extent of the plumbing and pipe fittings necessary to maintain the pallet 100. For example there are a very large number of VCR® fittings, some of which are labeled 108. The VCR® fittings are welded to each respective flow component. In addition, the welding creates a corrosion site at the heat effective zone on each side of a respective fitting. There is also a large amount of tubing (piping), some of which is labeled 109. This tubing is made from difficult to obtain and very costly ultra-pure stainless steel. This tubing is also very labor intensive to fabricate.

FIG. 1B is a side view schematic of the hazardous gas delivery stick 103 of FIG. 1A. A typical hazardous gas stick includes a manual diaphragm valve 110, a two-way double actuator valve 112 used to enable a pump and purge function, a regulator 114, a pressure transducer 116, a filter 118, a pneumatic valve 120, a mass flow controller 122, and a two-way pump-purge system pneumatic valve 124. To minimize corrosion from the hazardous gases, each component in a hazardous gas stick must be fabricated from the same difficult to obtain and very costly ultra-pure stainless steel used in the tubing 109. Corrosion from the hazardous gases can cause the regulators 114 and mass flow controllers 122 to break down and need regular replacement. In addition, the filter 118 needs regular replacement. As a result, maintenance work and down time for a hazardous gas stick 103 is costly and extensive.

FIG. 1C is a side view schematic of the inert gas delivery stick 105 of FIG. 1A. A typical non-hazardous gas stick includes a manual diaphragm valve 130, a regulator 134, a pressure transducer 136, a filter 138, a pneumatic valve 140, a mass flow controller 142, and an additional pneumatic valve 144. The non-hazardous gas sticks 105 do not require purging and therefore do not require a two-way double actuator valve. Many customers require that each component in a non-hazardous gas stick also be fabricated from the same difficult to obtain and very costly ultra-pure stainless steel to allow for commonality in spare parts between hazardous and non-hazardous gas sticks.

Figure 2:
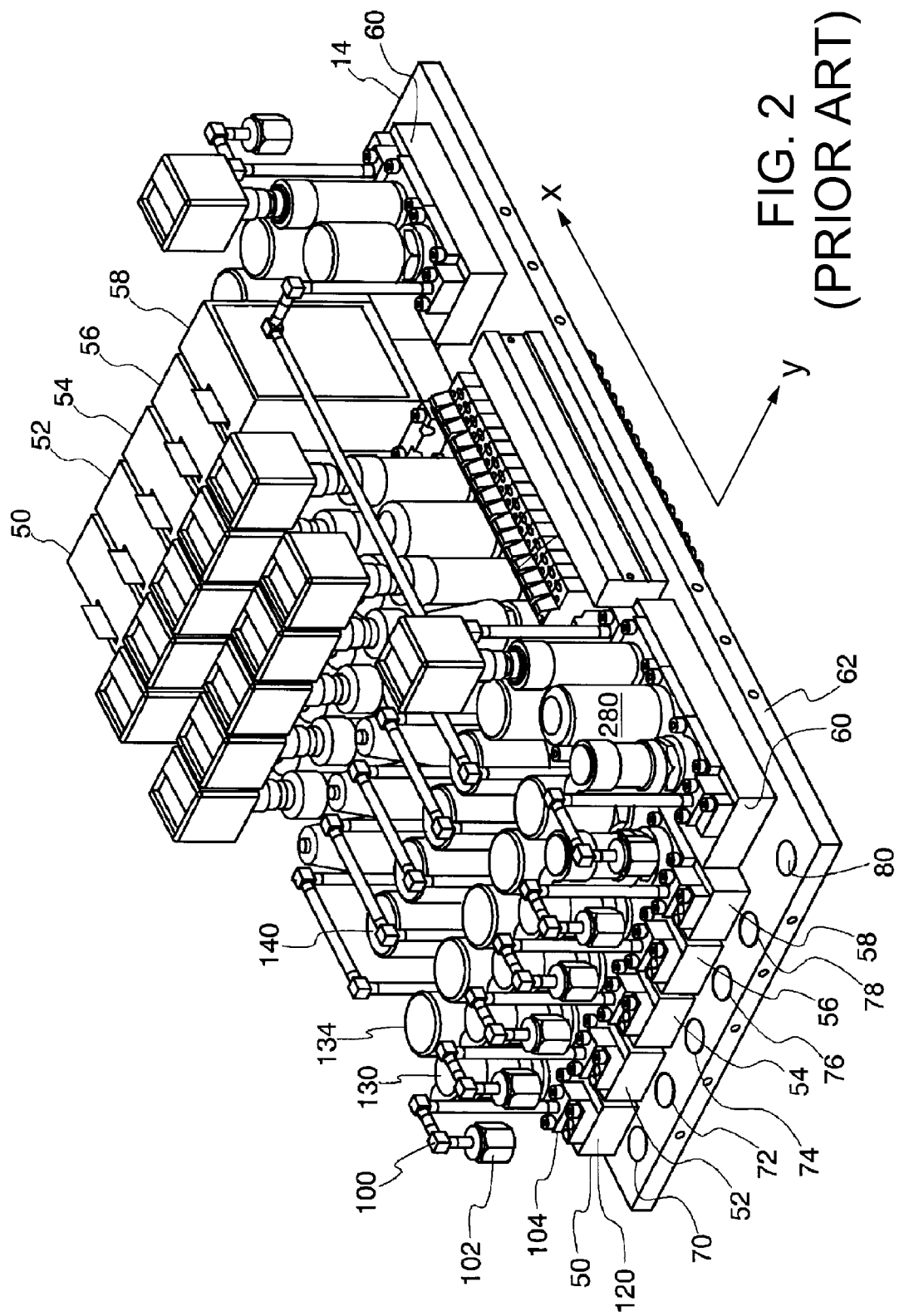
FIG. 2 is a top view schematic of a prior art modular/monolithic fluid distribution system of the kind which is currently used to replace the gas distribution system shown in FIG. 1A.

FIG. 2 is a top view schematic of a prior art modular/monolithic fluid distribution system of the kind which is currently used to replace the gas distribution system shown in FIG. 1A. The system of FIG. 2 includes five fluid control gas sticks whose primary flow path is in the x-direction and is laterally interconnected in the y-direction to a common outlet port to form a complete fluid distribution system. FIG. 2 is a prior art gas panel 14 which has a plurality of process gas sticks or process gas assemblies 50, 52, 54, 56 and 58. A nitrogen purge gas assembly 60 is also positioned on an aluminum platform 62. The aluminum platform 62 has tubing inlet bores 70, 72, 74, 76, and 78 as well as a purge gas bore 80 formed therein for connection to inlets of each of the gas sticks. The process gas sticks 50, 52, 54, 56 and 58 are substantially identical. Each of the gas sticks includes an inlet 100 as is shown in the exemplary gas stick 50. The inlet 100 includes a U-shaped tube having a threaded portion of a VCR® fitting 102 connected thereto. The U-shaped tube 100 is coupled to a tube base 104 which is coupled to an inlet manifold 120. Each of the gas sticks includes a plurality of active devices or gas components.

Figure 3:
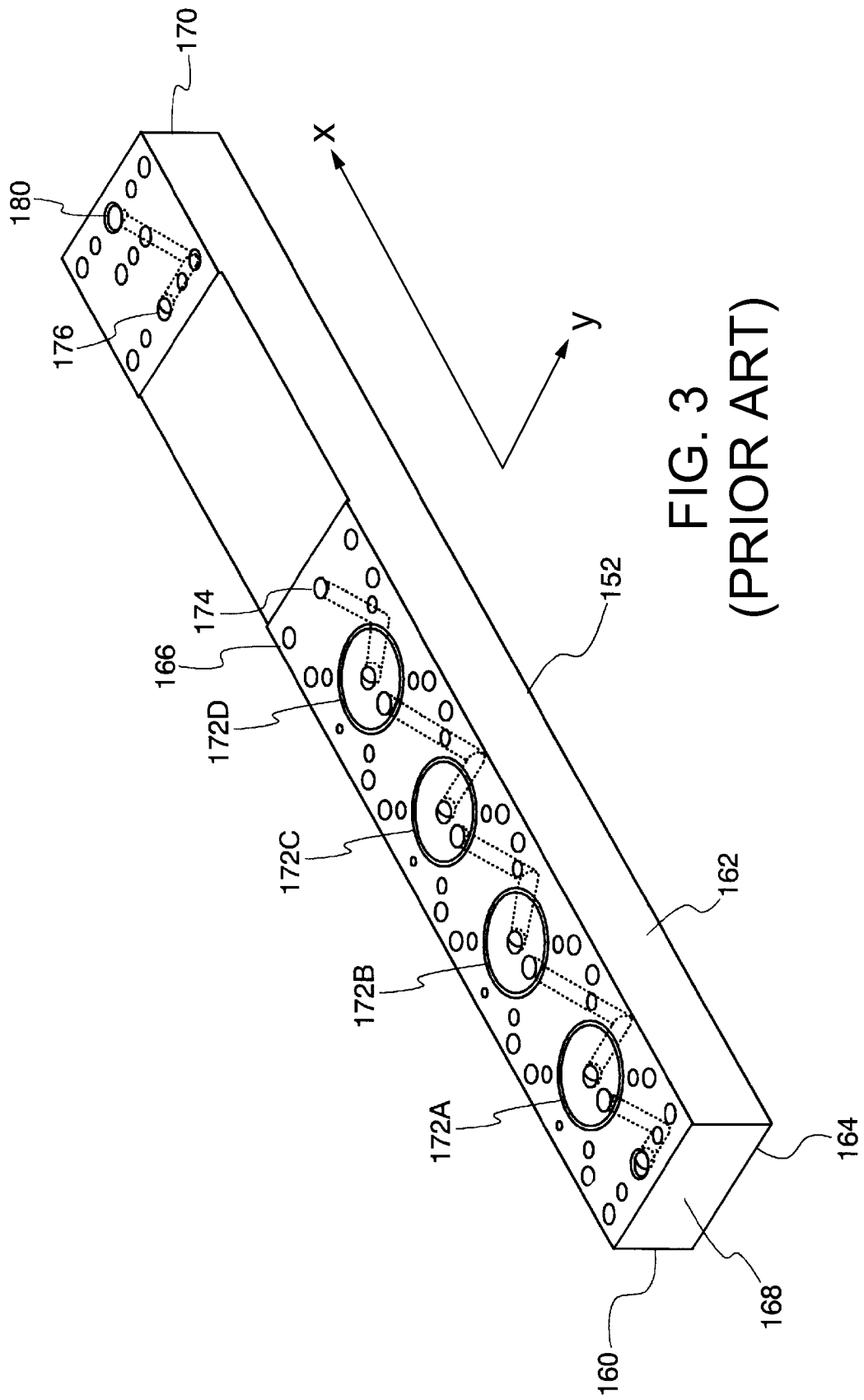
FIG. 3 is a side view of a prior art elongated rectangular manifold fluid control gas stick used to construct a modular/monolithic fluid distribution system.

FIG. 3 is a side view of a prior art elongated rectangular manifold fluid control gas stick used to construct a modular/monolithic fluid distribution system. It is substantially unitary and includes a plurality of active component receiving stations on the upper surface. The elongated rectangular manifold 152 includes a pair of sidewalls 160 and 162, a lateral bottom wall 164, a lateral top wall 166, and end walls 168 and 170. The manifold is substantially unitary and comprises a solid piece defining an inlet station 171 and a plurality of active device stations 172a-172d extending there along, including a mass flow controller station 174, second mass flow controller station 176, and an outlet station 180. It may be appreciated that successive stations are connected by bores drilled into the block or manifold 152.

Figure 4:
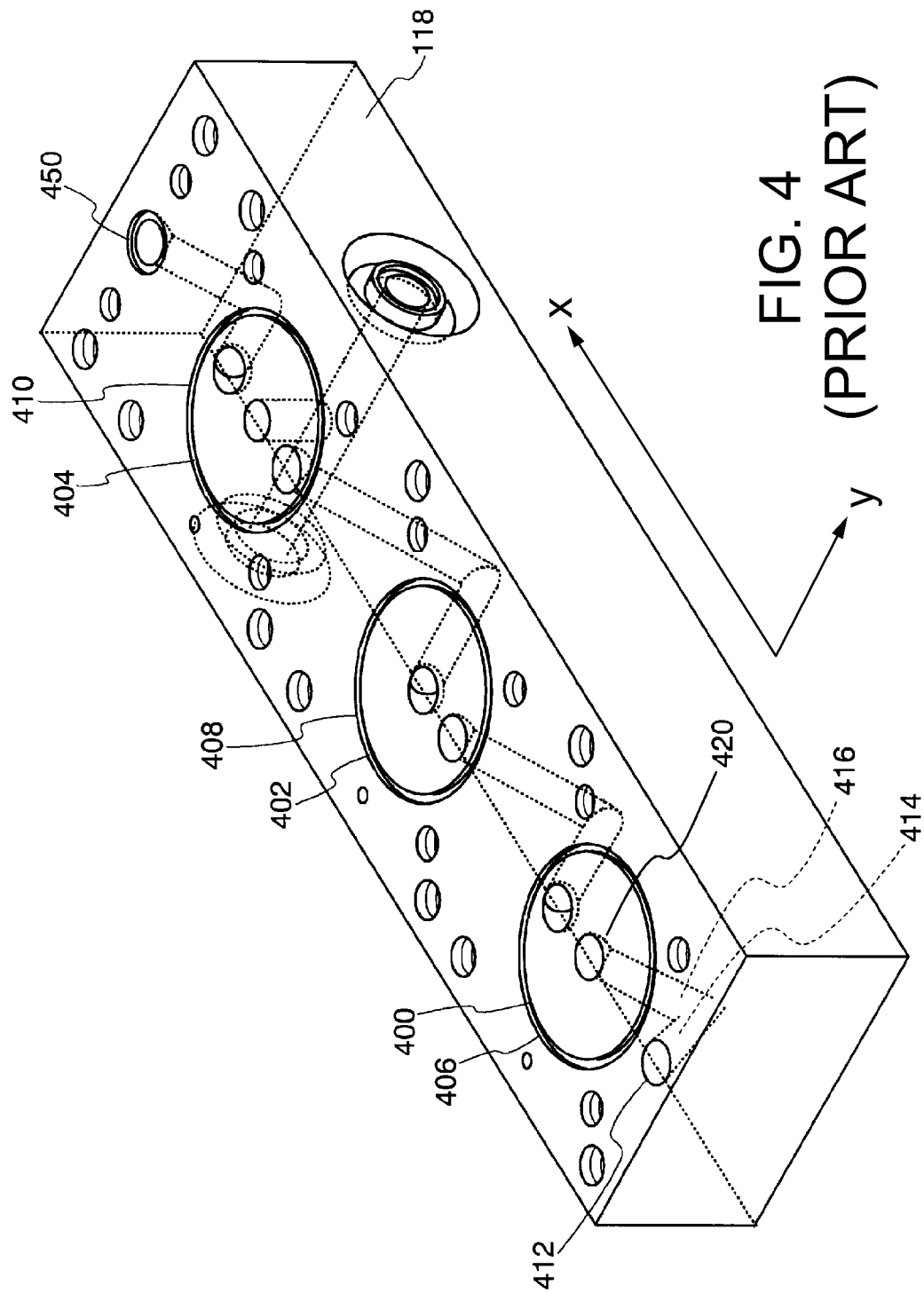
FIG. 4 is a side view of an additional prior art elongated rectangular manifold fluid control gas stick used to construct the modular/monolithic fluid distribution system shown in FIG. 2.

FIG. 4 is a side view of an additional prior art elongated rectangular manifold fluid control gas stick used to construct the modular/monolithic fluid distribution system shown in FIG. 2. It is substantially unitary and includes a plurality of active component receiving stations on the upper surface that enable the pump and purge function of the fluid distribution system. FIG. 4 is an inlet manifold that includes a first active device site 400, a second active device site 402, and a third active device site 404. Each of the sites 400, 402 and 404 includes an outer circumferential ring respectively, 406, 408 and 410 for engagement with an outer edge type connector. The U-tube inlet is connected to an aperture 412 to feed gas through a bore 414 to a second bore 416 which delivers the gas to an inlet 420.

Figure 5:
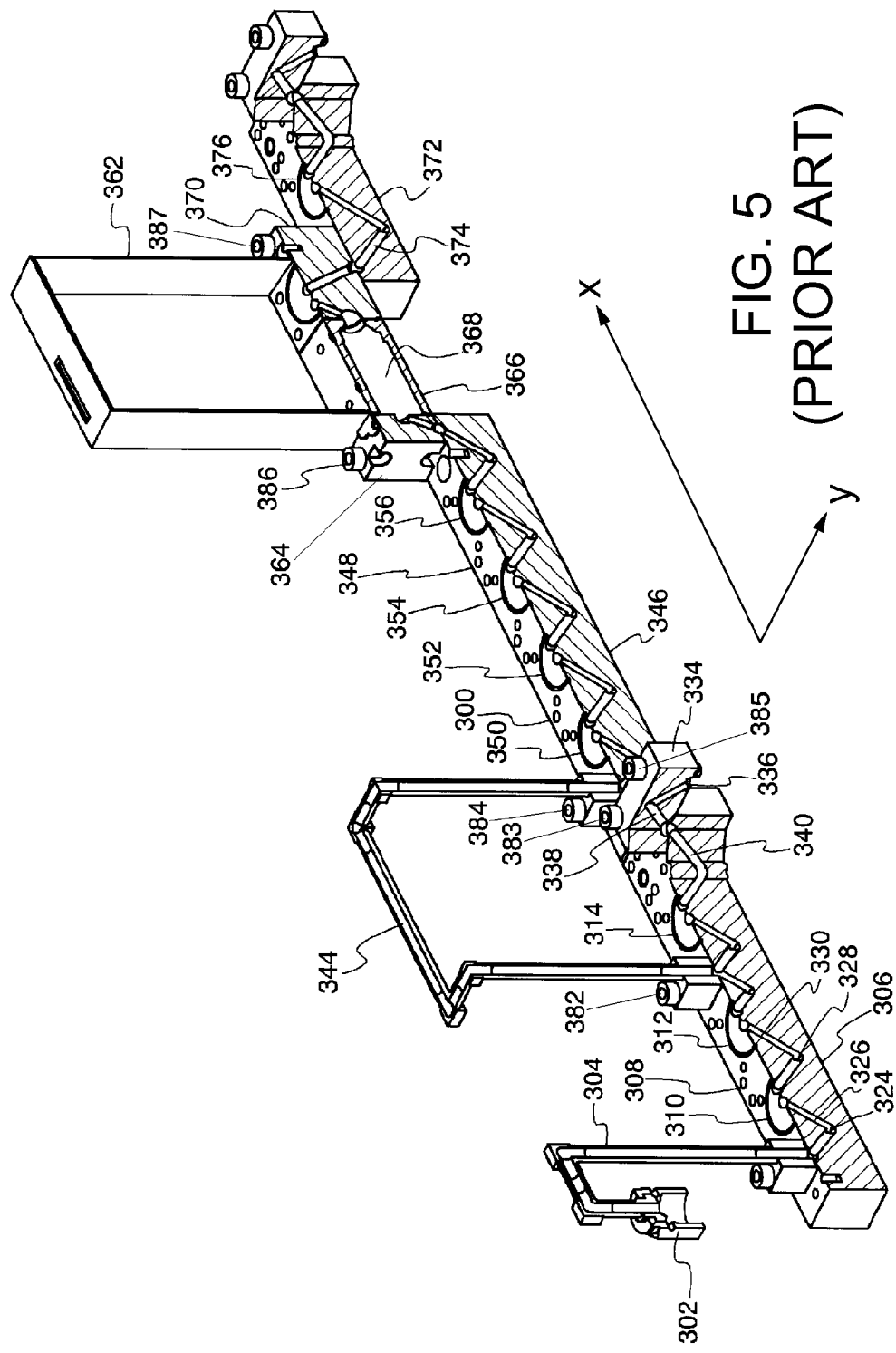
FIG. 5 shows a cross sectional view of the prior art fluid control gas stick shown in FIG. 2.

FIG. 5 is a cross sectional view of the prior art fluid control gas stick shown in FIG. 2 that includes a VCR® inlet 302, which receives gas and sends gas through a jumper 304 to a first gas manifold 306, having a laterally extending upper wall 308 having a plurality of active sites 310, 312 and 314, positioned thereon.

For purposes of showing the geometry of the manifold, the active sites are unpopulated. But for instance, site 310 may connect to a manual valve and sites 312 and 314 may connect to pneumatic valves. The positions between the sites are interconnected by bores. For example, sites 310 and 312 are interconnected by bores 328 and 330. A cross connect 334 (connector block) which receives a gas, such as a purged gas or nitrogen at a bore 336, passes a gas to a second bore 338, and then into a bore 340, which is connected to the active site 314, which is able to route gas to a second (bridging U-tube) jumper 344 coupled to a second gas manifold 346. The cross connect 334 and second jumper 344 are removeably attached to their respective connections using threaded fasteners 382, 383, 384, 385.

The second gas manifold 346 includes an upper wall 348 having a plurality of active sites 350, 352, 354 and 356 coupled by a pair of V-connected bores which are connected to a mass flow controller 362 of which only the blocks and the housing are shown. The mass flow controller has an inlet block 364 connected to receive gas, a first body block 366 having a bypass 368 therein, and a valve or outlet block 370 connected to an outlet manifold 372. The outlet manifold 372 receives regulated gas from the mass flow controller at a bore 374, and passes the gas to an active site 376 which includes a valve or the like. The mass flow controller 362 is removeably attached to the second gas manifold 364 and the outlet manifold 372 using threaded fasteners 386, 387.

Each of the embodiments shown in FIGS. 2-5 include a manifold structure having a single side configured with component receiving locations for receiving fluid components. Fluid pathways formed in the manifold for connecting component receiving stations are V-shaped, which are difficult to manufacture and require a thicker manifold structure to form. Greater thickness results in a greater amount of high cost material used to form the manifold. V-shaped fluid pathways also result in undesirable pressure drops.

Figure 6:
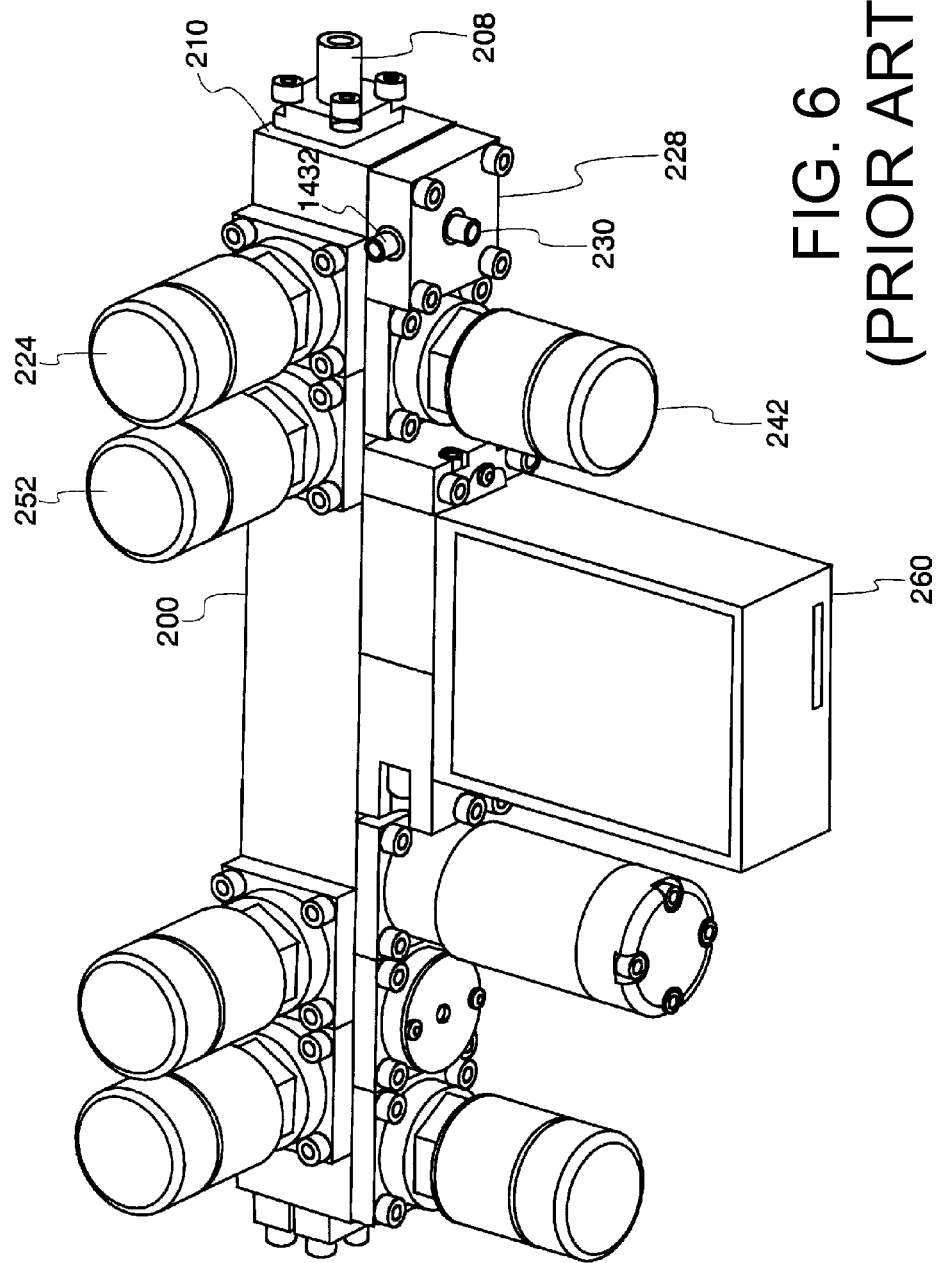
FIG. 6 shows another prior art manifold system.

FIG. 6 shows another prior art manifold system 200 that is specifically adapted for use in a moisture sampling system to determine the levels of trace amounts of moisture carried in a gas or other vapor stream. In operation, gas is flowed into the inlet 208 and is received at a port and is delivered to a first valve station, having a first pneumatic valve 224 mounted thereon. The gas may then be supplied to a moisture scrubber station through the valve 224. The scrubber station has a scrubber connector 228 connected thereto with a pair of tubing stubs 230 and 232 for connection to a moisture scrubber. Connected to the moisture scrubber outlet is a pneumatic valve 242, connected at a pneumatic valve station to receive gas therefrom, which allows dried gas to pass into the mass flow controller 260. A third valve station having a pneumatic valve 252 connected thereto may enable connection between the mass flow controller 260 and untreated sample gas from the inlet 208 containing moisture to be measured. The system shown in FIG. 6 is a manifold having adjacent sides configured with component receiving locations for receiving fluid components. Fluid pathways formed in the manifold for connecting component receiving stations on the same or adjacent side are again V-shaped. FIG. 7A, FIG. 9A, FIG. 11A, FIG. 13A, FIG. 15A, and FIG. 17A show six exemplary embodiments of a fluid delivery system of a kind contemplated in the present invention, which may be used to replace the kind of previously known fluid delivery systems shown in FIG. 1A through FIG. 6. In some embodiments, these fluid delivery systems include gas handling equipment of the kind used to supply process gas to a reactor chamber during the processing of semiconductor substrates. These fluid delivery systems can incorporate one or more process gas channels having a common manifold plate configured for corresponding one or more process gas channels. These channels do not necessarily have to be identical. For the purpose of demonstration, the systems described include five parallel flow channels that are substantially identical. Although subsequent description is directed to "gas" handling equipment and "gas" channels, it is understood that the systems are generally configured for processing fluids. The exemplary embodiments of FIG. 7A, FIG. 9A, FIG. 11A, FIG. 13A, FIG. 15A, and FIG. 17A show a monolithic manifold plate having a plurality of process gas channels. It is understood that the monolithic manifold plates can be configured having one, two, or more process gas channels. It is also understood that a fluid delivery system having a plurality of process gas channels can be configured using multiple manifold plates instead of a single monolithic manifold plate having a plurality of process gas channels. Each manifold plate can be configured to have one, two, or more process gas channels, and the multiple manifold plates are positioned together to form an assembled structure. Although only the embodiment of FIG. 7A is alternatively shown having a single process gas channel configuration (FIG. 8C), it is understood that all embodiments of the manifold plate can be similarly configured.

FIG. 7A is a top view first embodiment of the present invention fluid delivery system showing a plurality of process gas channels incorporated into a common manifold plate. The system can incorporate one or more process gas channels. These channels do not have to be identical. For the purpose of demonstration, the system described includes five parallel flow channels that are substantially identical. Mass flow controllers are used to bridge the gas channels and the common lower manifold to form an operative fluid control system. FIG. 7A shows the embodiment of a first fluid delivery system 700 having a plurality of process gas channels 701, 702, 703, 704, and 705 incorporated into a single manifold plate, and a common lower manifold 706. In this instance the process gas channels 701, 702, 703, 704, and 705 are substantially identical. Each channel includes an inlet 707 as is shown in the exemplary channel 705. The common lower manifold 706 also includes an end wall or face 708 and a common outlet port 709 (FIG. 7B) that is connected to an internal conduit that runs the length of the common lower manifold. Each channel and the common lower manifold include a plurality of active fluid components. As used herein, an "active fluid component" is a component that has more than one mechanical state. Examples of active fluid components include, but are not limited to, a valve, a pressure transducer, a pressure regulator, and a mass flow controller. Filters, tubing, and weldements are not considered active fluid components. Mass flow controllers 710, 711, 712, 713, and 714 are used to bridge the gas channels and the common lower manifold to form an operative fluid control system. Fluid components may be removeably attached to their respective connection locations using threaded fasteners 781, 782, 783, 784, 785, 786, 787, 788 tightened into threaded apertures as shown in the exemplary channel 705, or other known means such as threaded studs with nuts.

Figure 7B:
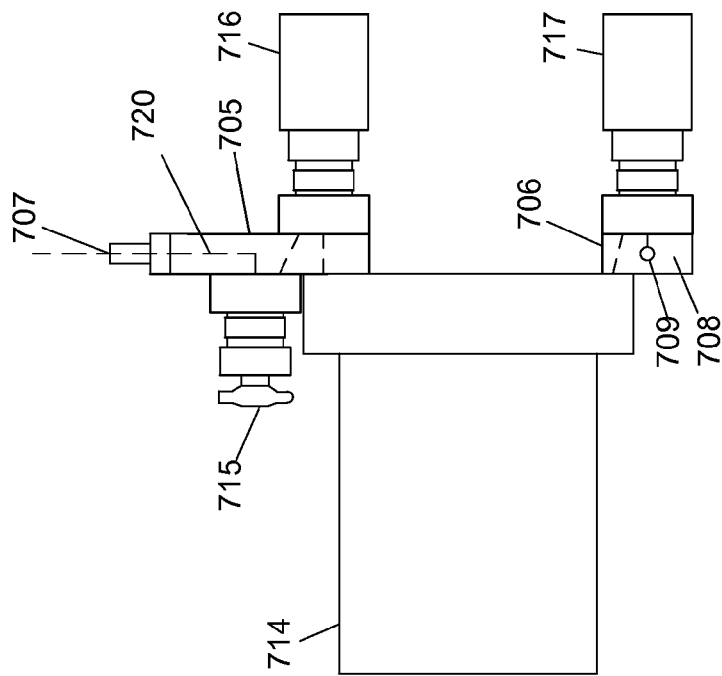
FIG. 7B is a side view schematic of a single gas channel of FIG. 7A.
Figure 7A:
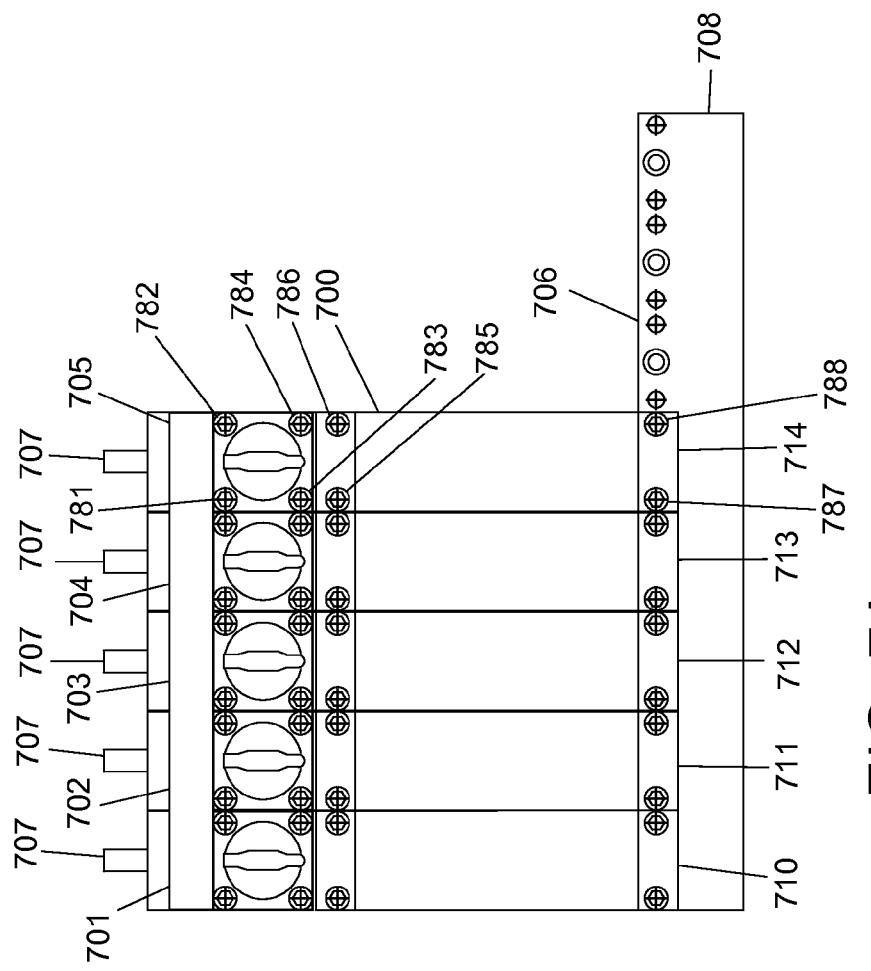
FIG. 7A shows a top view first embodiment of the present invention fluid delivery system.

FIG. 7B is a side view schematic of a single gas channel 705 of FIG. 7A. Gas channel 705 comprises two component receiving stations 808 and 809 (FIG. 8A) for coupling to operational fluid components, the inlet 707, a manual diaphragm valve 715, a pneumatic isolation valve 716, a mass flow controller 714, and a downstream pneumatic isolation valve 717 mounted to the common lower manifold 706. The mass flow controller 714 bridges the upper assemblies of the gas channel 705 and the common lower manifold 706. A fluid flow path through the gas channel 705 is represented by path 720. The path 720 through the upper assembly is shown in more detail in FIG. 8B. The common outlet port 709 is the output of an internal fluid passageway (not shown) that extends lengthwise through the common lower manifold 706. A direction of the internal fluid passageway is along an axis extending out of the page of FIG. 7B at the common outlet port 709. The fluid flow direction through the internal fluid passageway in the common lower manifold 706 is transverse to a general fluid flow direction along the path 720 from the inlet 707 to the outlet of the mass flow controller 714. The path 720 from each channel 701, 702, 703, 704, and 705 connects to the internal fluid passageway within the common lower manifold 706.

Figure 8A:
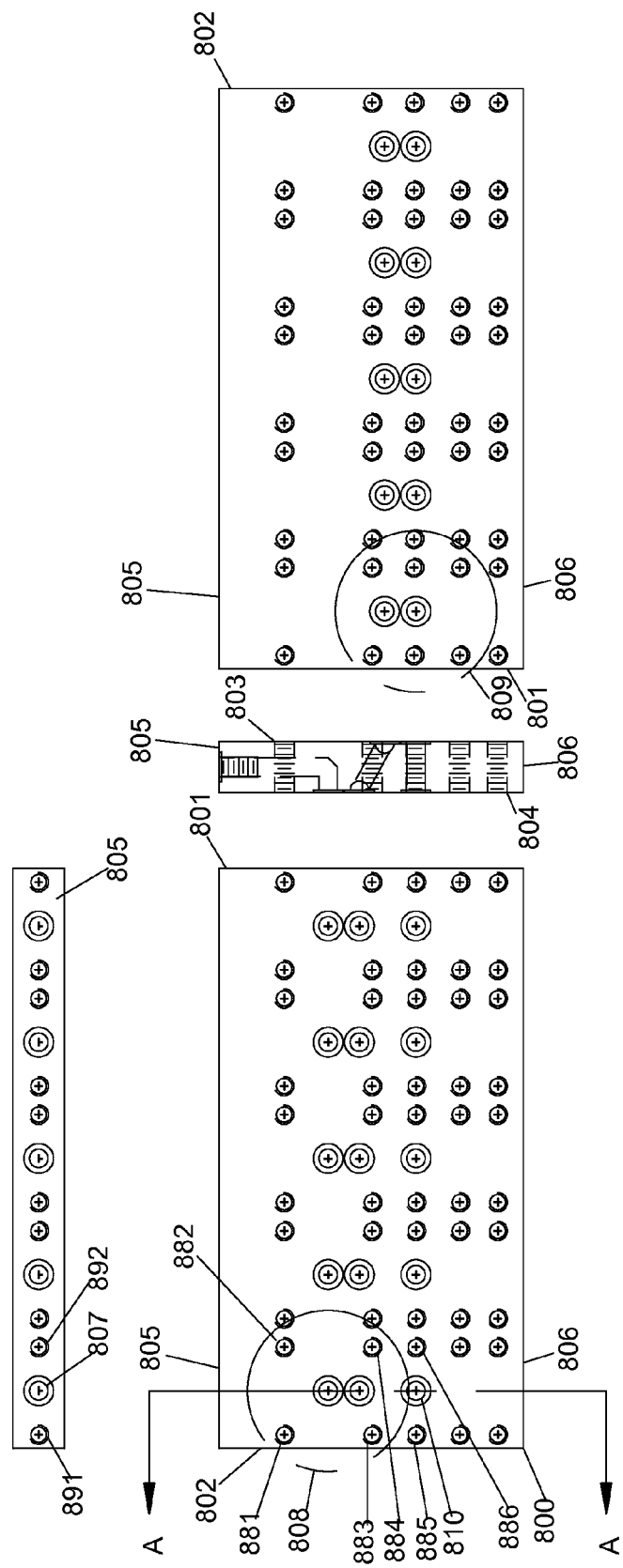
FIG. 8A and FIG. 8B detail a rectangular manifold plate of the kind used to form the gas channels in FIG. 7A and FIG. 7B.
Figure 8B:
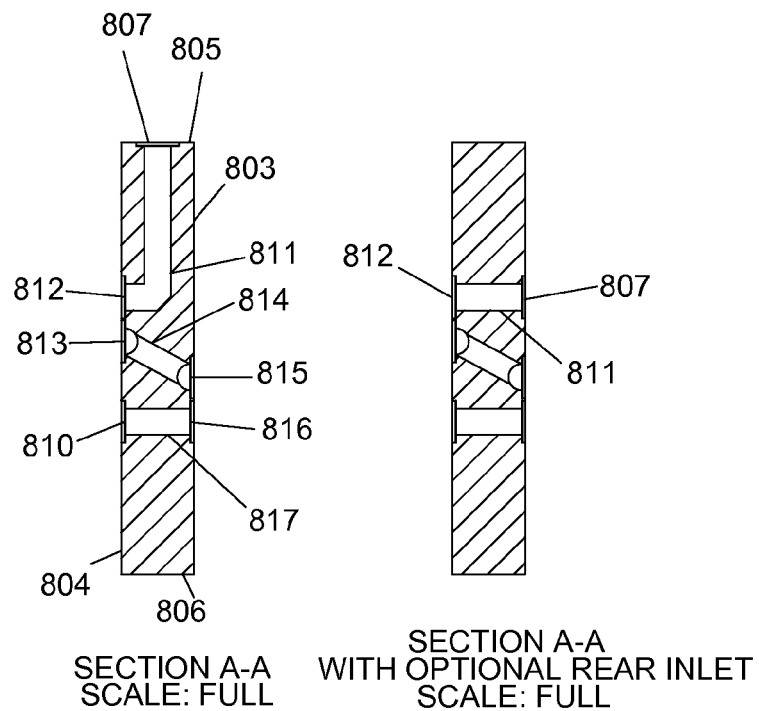

FIG. 8A and FIG. 8B detail a rectangular manifold plate 800 of the kind used to form the gas channels in FIG. 7A-7B. The manifold plate 800 includes a pair of sidewalls 801 and 802, a lateral bottom wall 803, a lateral top wall 804, and end walls 805 and 806. The manifold plate 800 is substantially unitary and comprises a solid piece defining one or more flow channels. In this instance manifold plate 800 comprises five flow channels described by inlets ports 807, two component receiving stations 808 and 809 per channel, and outlets ports 810. As applied to the exemplary embodiment of FIG. 7B, the component receiving station 808 is coupled to the manual diaphragm valve 715, and the component receiving station 809 is coupled to the pneumatic isolation valve 716. In this manner, the manifold plate 800 is configured to connect an active fluid component on each of two opposing sides. Fluid components may be removeably attached using threaded fasteners 781, 782, 783, 784, 785, 786 (FIG. 7A) tightened into corresponding threaded apertures 881, 882, 883, 884, 885, 886 of the manifold plate 800. FIG. 8B is a cross section of a single flow channel. In this instance the inlet port 807 is located on one of the four vertical sides 805 with an internal fluid passageway 811 at 90 degrees in fluid communication with the inlet 812 of the first component receiving station 808 located on the lateral top wall 804 of the same one piece manifold plate. However, in an alternate configuration shown on the right hand side of FIG. 8B, the inlet port 807 can also be located on the lateral bottom wall 803 of the manifold plate 800 directly opposite the inlet 812 on the lateral top wall 804 with internal fluid passageway 811 in direct fluid communication with inlet 812 of the first fluid first component receiving station 808. The outlet 813 from the first component receiving station 808 is connected in fluid communication by a internal fluid passageway 814 with the inlet 815 of the second component receiving station 809 located on the lateral bottom wall 803 of the same one piece manifold plate. In this instance the outlet 816 from the second component receiving station 809 is connected in fluid communication by an internal fluid passageway 817 with an outlet port 810 located on the lateral top wall 804 of the same one piece manifold plate. The internal fluid passageways 814 and 817 form single-axis, straight-line fluid pathways through the manifold plate 800. However, in an alternate configuration that does not require a mass flow controller or other component bridging to a common lower manifold, the outlet port 810 can also be located on the end wall 806 with internal fluid passageway 817 at 90 degrees in fluid communication with outlet port 810. As applied to the exemplary embodiment of FIG. 7B, the outlet port 810 is coupled to the mass flow controller 714 while the inlet port 807 is connected to the inlet 707 using threaded fasteners (not illustrated) tightened into corresponding threaded apertures 891, 892 shown in FIG. 8A. Included are holes (not shown) running the length of the rectangular manifold plate 800 to accommodate heater rods that allow for heating of the gas, manifold, and attached operational fluid components.

Figure 8C:
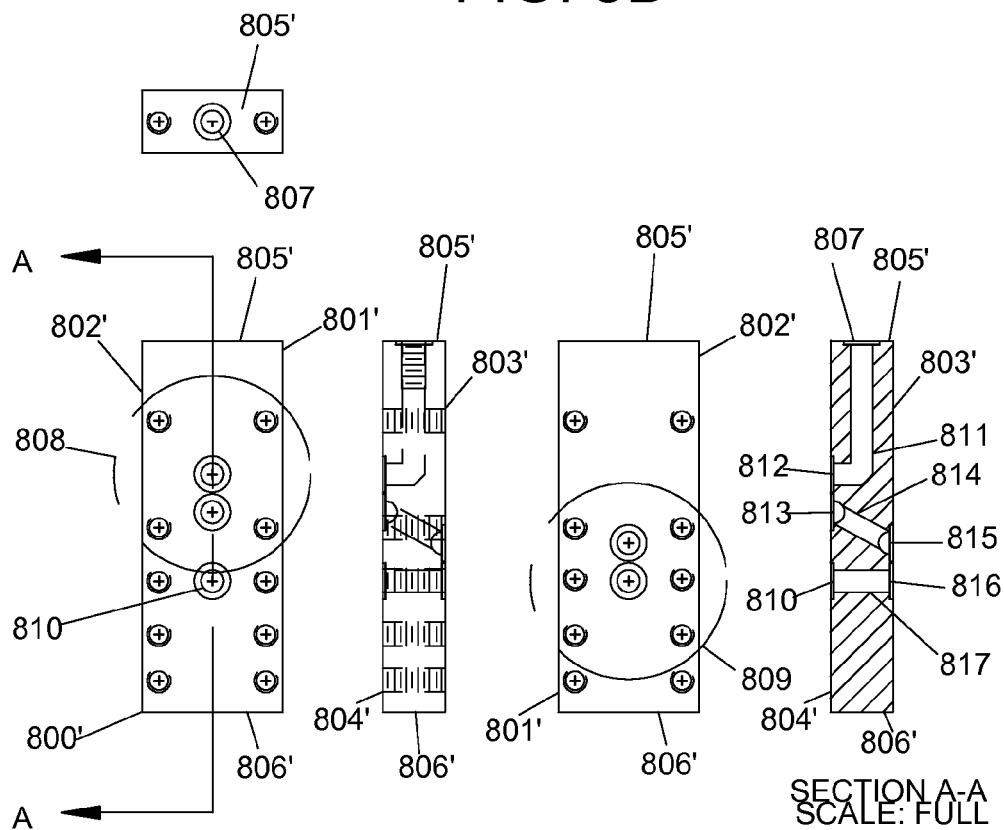
FIG. 8C details a rectangular manifold plate of the kind used to form a single gas channel.

FIG. 8C details a rectangular manifold plate of the kind used to form a single gas channel. The gas channel formed within the manifold plate 800' of FIG. 8C is configured similarly as the gas channel described in relation to the manifold plate 800 of FIG. 8A and FIG. 8B except the manifold plate 800' is configured having a single gas channel, whereas the manifold plate 800 of FIG. 8A and FIG. 8B are configured as a monolithic manifold plate having a plurality of gas channels. Multiple manifold plates of the type shown in FIG. 8C can be assembled together and coupled to a common manifold to form a fluid delivery system having similarly functionality to that shown in FIG. 8A and FIG. 8B.

Figure 9B:
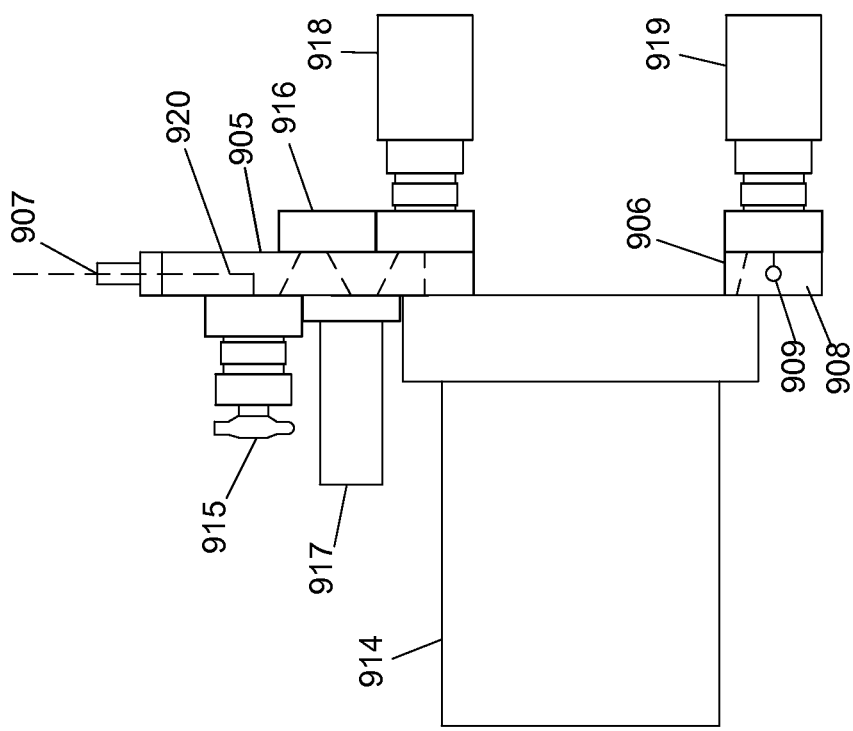
FIG. 9B is a side view schematic of a single gas channel of FIG. 9A.
Figure 9A:
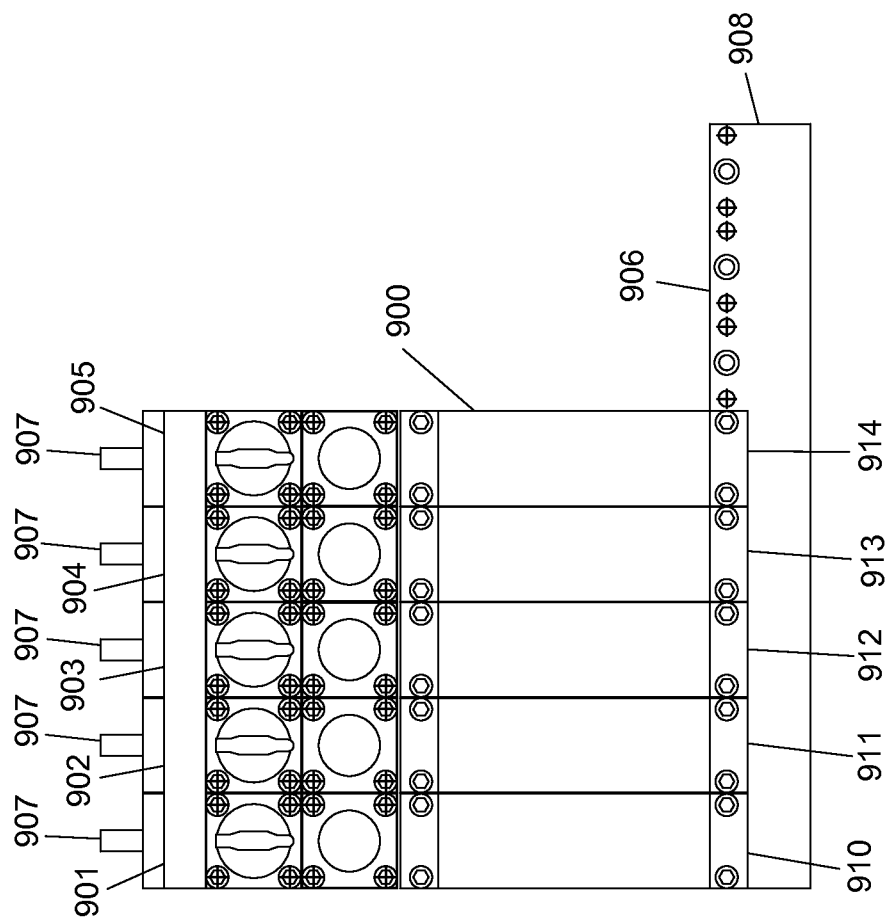
FIG. 9A shows a top view second embodiment of the present invention fluid delivery system.

FIG. 9A is a top view second embodiment of the present invention fluid delivery system showing a plurality of process gas channels incorporated into a common manifold plate. The system can incorporate one or more process gas channels. These channels do not have to be identical. For the purpose of demonstration, the system described includes five parallel flow channels that are substantially identical. Mass flow controllers are used to bridge the gas channels and the common lower manifold to form an operative fluid control system. FIG. 9A shows a second fluid delivery system 900 having a plurality of process gas channels 901, 902, 903, 904, 905 incorporated into a single manifold plate, and a common lower manifold 906. In this instance the process gas channels 901, 902, 903, 904, and 905 are substantially identical. Each channel includes an inlet 907 as is shown in the exemplary channel 905. The common lower manifold 906 also includes an end wall or face 908 and a common outlet port 909 (FIG. 9B) that is connected to an internal conduit that runs the length of the common lower manifold. Each channel and the common lower manifold include a plurality of active fluid components. Mass flow controllers 910, 911, 912, 913, and 914 are used to bridge the gas channels and the common lower manifold to form an operative fluid control system FIG. 9B is a side view schematic of a gas channel 905 of FIG. 9A. Gas channel 905 comprises four receiving stations 1008, 1009, 1010, and 1011 (FIG. 10A) for coupling to operational fluid components, the inlet 907, a manual diaphragm valve 915, a jumper block 916, a filter 917, a pneumatic isolation valve 918, a mass flow controller 914, and a downstream pneumatic isolation valve 919 mounted to the common lower manifold 906. The mass flow controller 914 bridges the upper assemblies of the gas channel 905 and the common lower manifold 906. A fluid flow path through the gas channel 905 is represented by path 920. The path 920 through the upper assembly is shown in more detail in FIG. 10B. The common outlet port 909 is the output of an internal fluid passageway (not shown) that extends lengthwise through the common lower manifold 906. A direction of the internal fluid passageway is along an axis extending out of the page of FIG. 9B at the common outlet port 909. The fluid flow direction through the internal fluid passageway in the common lower manifold 906 is transverse to a general fluid flow direction along the path 920 from the inlet 907 to the outlet of the mass flow controller 914. The path 920 from each channel 901, 902, 903, 904, and 905 connects to the internal fluid passageway within the common lower manifold 906.

Figure 10A:
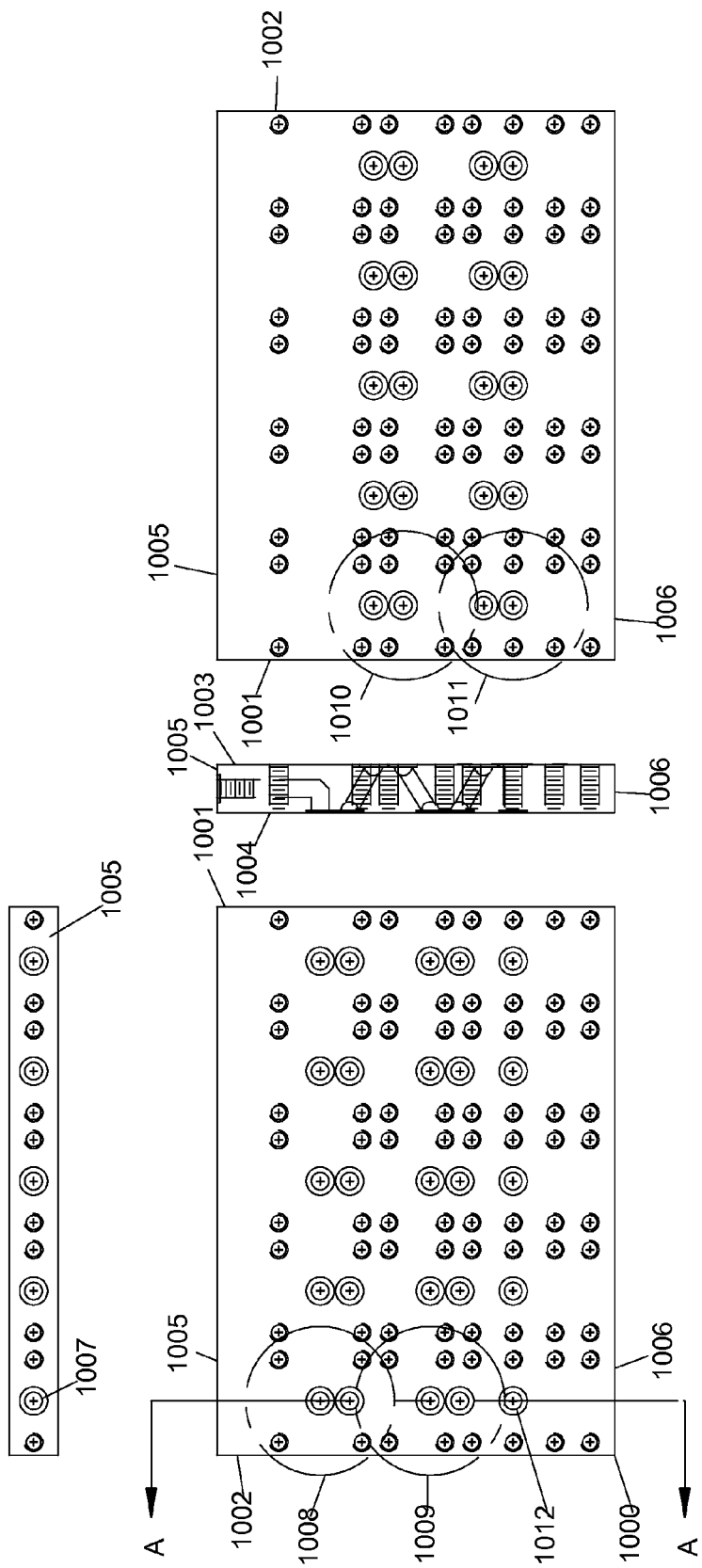
FIG. 10A and FIG. 10B show a rectangular manifold plate of the kind used to form the gas channels in FIG. 9A and FIG. 9B.
Figure 10B:
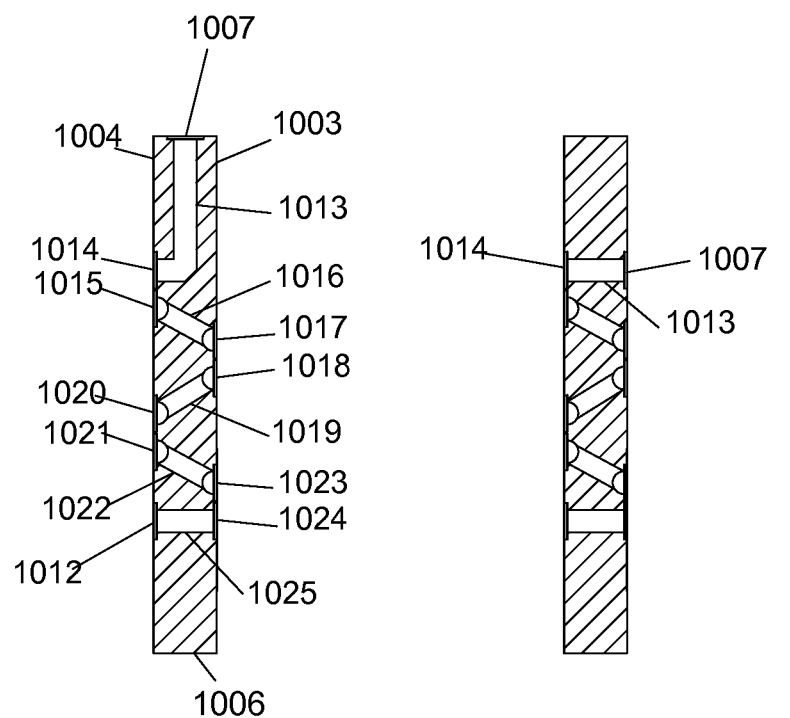

FIG. 10A and FIG. 10B detail a rectangular manifold plate 1000 of the kind used to form the gas channels in FIG. 9A-9B. Manifold plate 1000 includes a pair of sidewalls 1001 and 1002, a lateral bottom wall 1003, a lateral top wall 1004, and end walls 1005 and 1006. The manifold plate 1000 is substantially unitary and comprising a solid piece defining one or more flow channels. In this instance manifold plate 1000 comprises of five flow channels described by inlets 1007, four component receiving stations 1008, 1009, 1010, and 1011 per channel, and outlets 1012. As applied to the exemplary embodiment of FIG. 9B, the component receiving station 1008 is coupled to the manual diaphragm valve 915, the component receiving station 1009 is coupled to the filter 917, the component receiving station 1010 is coupled to the jumper block 916, and the component receiving station 1011 is coupled to the pneumatic isolation valve 918. The jumper block 916 functions as a passive flow-through component and is not considered an active fluid component. In this manner, the manifold plate 1000 is configured to connect an active fluid component on each opposing side of the manifold plate. FIG. 10B is a cross section of a single flow channel. In this instance the inlet 1007 is located on one of the four vertical sides 1005 with an internal fluid passageway 1013 at 90 degrees in fluid communication with the inlet 1014 of the first component receiving station 1008 located on the lateral top wall 1004 of the same one piece manifold plate. However, in an alternate configuration shown in the right hand side of FIG. 10B, the inlet 1007 can also be located on the lateral bottom wall 1003 of the manifold plate 1000 directly opposite the inlet 1014 on the lateral top wall 1004 with internal fluid passageway 1013 in direct fluid communication with inlet 1014 of the first component receiving station 1008. An outlet 1015 from the first component receiving station 1008 is connected in fluid communication by an internal fluid passageway 1016 with an inlet 1017 of the second component receiving station 1010 located on the lateral bottom wall 1003 of the same one piece manifold plate. An outlet 1018 from the second component receiving station 1010 is connected in fluid communication by an internal fluid passageway 1019 with an inlet 1020 of the third component receiving station 1009 located on the lateral top wall 1004 of the same one piece manifold plate. An outlet 1021 from the third component receiving station 1009 is connected in fluid communication by an internal fluid passageway 1022 with an inlet 1023 of the fourth component receiving station 1011 located on the lateral bottom wall 1003 of the same one piece manifold plate. In this instance the outlet 1024 from the fourth component receiving station 1011 is connected in fluid communication by an internal fluid passageway 1025 with an outlet port 1012 located on the lateral top wall 1004 of the same one piece manifold plate. The internal fluid passageways 1016, 1019, 1022, and 1025 form single-axis, straight-line fluid pathways through the manifold plate 1000. However, in an alternate configuration that does not require a mass flow controller or other component bridging to a common lower manifold, the outlet port 1012 can also be located on the end wall 1006 with internal fluid passageway 1025 at 90 degrees in fluid communication with outlet port 1012. As applied to the exemplary embodiment of FIG. 9B, the outlet port 1012 is coupled to the mass flow controller 914. Included are holes (not shown) running the length of the rectangular manifold plate 1000 to accommodate heater rods that allow for heating of the gas, manifold, and attached operational fluid components.

FIG. 11A shows a top view third embodiment of the present invention fluid delivery system showing a plurality of process gas channels incorporated into a common manifold plate. The system can incorporate one or more process gas channels. These channels do not have to be identical. For the purpose of demonstration, the system described includes five parallel flow channels that are substantially identical. Mass flow controllers are used to bridge the gas channels and the common lower manifold to form an operative fluid control system. FIG. 11A shows a third fluid control system 1100 having a plurality of process gas channels 1101, 1102, 1103, 1104, 1105 incorporated into a single manifold plate, and a common lower manifold 1106. In this instance the process gas channels 1101, 1102, 1103, 1104, and 1105 are substantially identical. Each of the channels includes an inlet 1107 as is shown in the exemplary channel 1105. The common lower manifold 1106 also includes an end wall or face 1108 and a common outlet port 1109 (FIG. 11B) that is connected to an internal conduit that runs the length of the common lower manifold. Each channel and the lower manifold include a plurality of active fluid components. Mass flow controllers 1110, 1111, 1112, 1113, and 1114 are used to bridge the gas channels and the common lower manifold to form an operative fluid control system.

FIG. 11B is a side view schematic of the gas channel 1105 of FIG. 11A. Gas channel 1105 comprises six receiving stations 1208, 1209, 1210, 1211, 1212, and 1213 for coupling to operational fluid components, the inlet 1107, a manual diaphragm valve 1115, a jumper block 1116, a regulator 1117, a pressure transducer 1118, a filter 1119, a pneumatic isolation valve 1120, a mass flow controller 1114, and a downstream pneumatic isolation valve 1121 mounted to the common lower manifold 1106. The mass flow controller 1114 bridges the upper assemblies of the gas channel 1105 and the common lower manifold 1106. A fluid flow path through the gas channel 1105 is represented by path 1122. The path 1122 through the upper assembly is shown in more detail in FIG. 12B. The common outlet port 1109 is the output of an internal fluid passageway (not shown) that extends lengthwise through the common lower manifold 1106. A direction of the internal fluid passageway is along an axis extending out of the page of FIG. 11B at the common outlet port 1109. The fluid flow direction through the internal fluid passageway in the common lower manifold 1106 is transverse to a general fluid flow direction along the path 1122 from the inlet 1107 to the outlet of the mass flow controller 1114. The path 1122 from each channel 1101, 1102, 1103, 1104, and 1105 connects to the internal fluid passageway within the common lower manifold 1106.

Figure 12A:
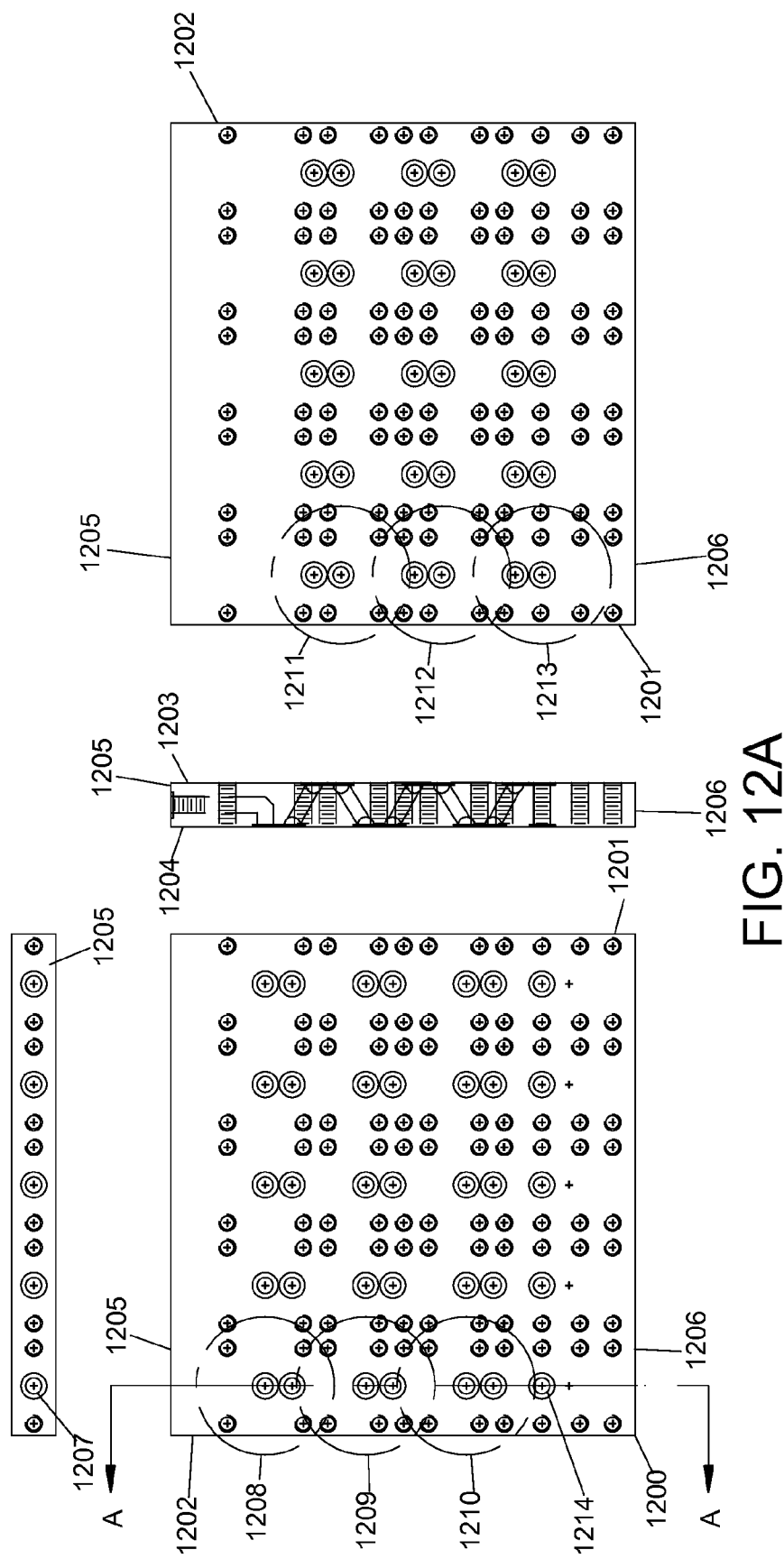
FIG. 12A and FIG. 12B show a rectangular manifold plate of the kind used to form the gas channels in FIG. 11A and FIG. 11B.
Figure 12B:
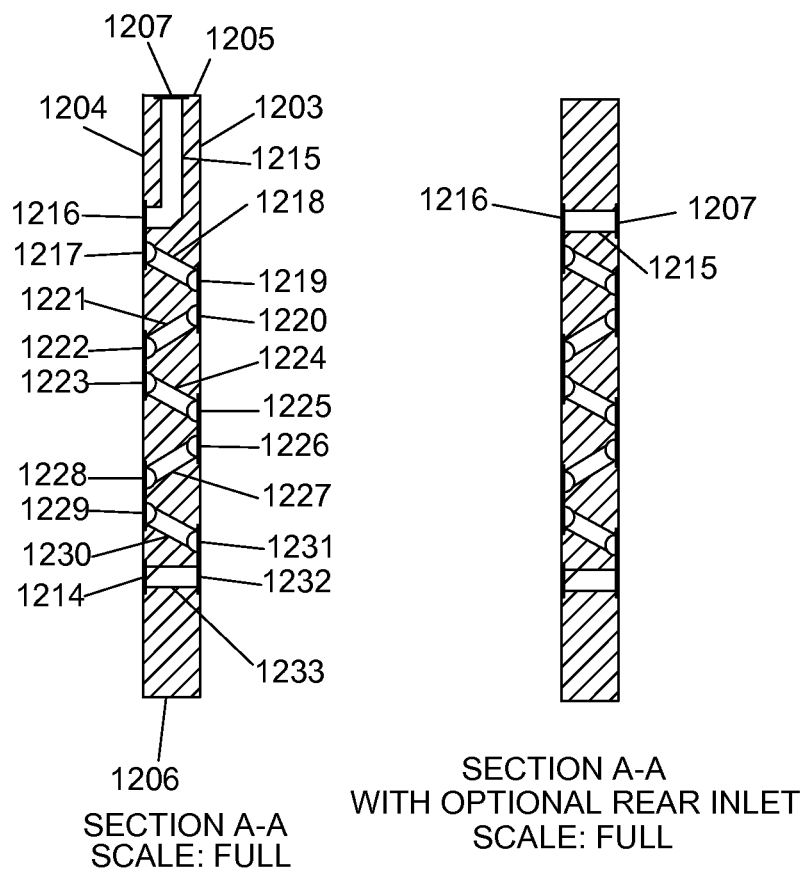

FIG. 12A and FIG. 12B detail a rectangular manifold plate 1200 of the kind used to form the gas channels in FIG. 11A-11B. Rectangular manifold plate 1200 includes a pair of sidewalls 1201 and 1202, a lateral bottom wall 1203, a lateral top wall 1204, and end walls 1205 and 1206. The manifold plate 1200 is substantially unitary and comprising a solid piece defining one or more flow channels. In this instance manifold plate 1200 comprises five flow channels described by inlets 1207, six component receiving stations 1208, 1209, 1210, 1211, 1212, and 1213 per channel, and outlets 1214. As applied to the exemplary embodiment of FIG. 11B, the component receiving station 1208 is coupled to the manual diaphragm valve 1115, the component receiving station 1209 is coupled to the regulator 1117, the component receiving station 1210 is coupled to the filter 1119, the component receiving station 1211 is coupled to the jumper block 1116, the component receiving station 1212 is coupled to the pressure transducer 1118, and the component receiving station 1213 is coupled to the pneumatic isolation valve 1120. In this manner, a plurality of active fluid components are coupled to each of two opposing sides of the manifold plate. FIG. 12B is a cross section of a single flow channel. In this instance the inlet 1207 is located on one of the four vertical sides 1205 with an internal fluid passageway 1215 at 90 degrees in fluid communication with an inlet 1216 of the first component receiving station 1208 located on the lateral top wall 1204 of the same one piece manifold plate. However, in an alternate configuration shown in the right hand side of FIG. 12B, the inlet 1207 can also be located on the lateral bottom wall 1203 of the manifold plate 1200 directly opposite the inlet 1216 on the lateral top wall 1204 with internal passageway 1215 in direct fluid communication with inlet 1216 of the first component receiving station 1208. An outlet 1217 from the first component receiving station 1208 is connected in fluid communication by an internal fluid passageway 1218 with an inlet 1219 of the second component receiving station 1211 located on the lateral bottom wall 1203 of the same one piece manifold plate. An outlet 1220 from the second component receiving station 1211 is connected in fluid communication by an internal fluid passageway 1221 with an inlet 1222 of the third component receiving station 1209 located on the lateral top wall 1204 of the same one piece manifold plate. An outlet 1223 from the third component receiving station 1209 is connected in fluid communication by an internal fluid passageway 1224 with an inlet 1225 of the fourth component receiving station 1212 located on the lateral bottom wall 1203 of the same one piece manifold plate. An outlet 1226 from the fourth component receiving station 1212 is connected in fluid communication by an internal fluid passageway 1227 with an inlet 1228 of the fifth component receiving station 1210 located on the lateral top wall 1204 of the same one piece manifold plate. An outlet 1229 from the fifth component receiving station 1210 is connected in fluid communication by an internal fluid passageway 1230 with an inlet 1231 of the sixth component receiving station 1213 located on the lateral bottom wall 1203 of the same one piece manifold plate. In this instance the outlet 1232 from the sixth component receiving station 1213 is connected in fluid communication by an internal fluid passageway 1233 with the outlet port 1214 located on the lateral top wall 1204 of the same one piece manifold plate. The internal fluid passageways 1218, 1221, 1224, 1227, 1230, and 1233 form single-axis, straight-line fluid pathways through the manifold plate 1200. However, in an alternate configuration that does not require a mass flow controller or other component bridging to a common lower manifold, the outlet port 1214 can also be located on the end wall 1206 with internal fluid passageway 1233 at 90 degrees in fluid communication with outlet port 1214. As applied to the exemplary embodiment of FIG. 11B, the outlet port 1214 is coupled to the mass flow controller 1114. Included are holes (not shown) running the length of the rectangular manifold plate 1200 to accommodate heater rods that allow for heating of the gas, manifold, and attached operational fluid components.

Figures 13A, 13B:
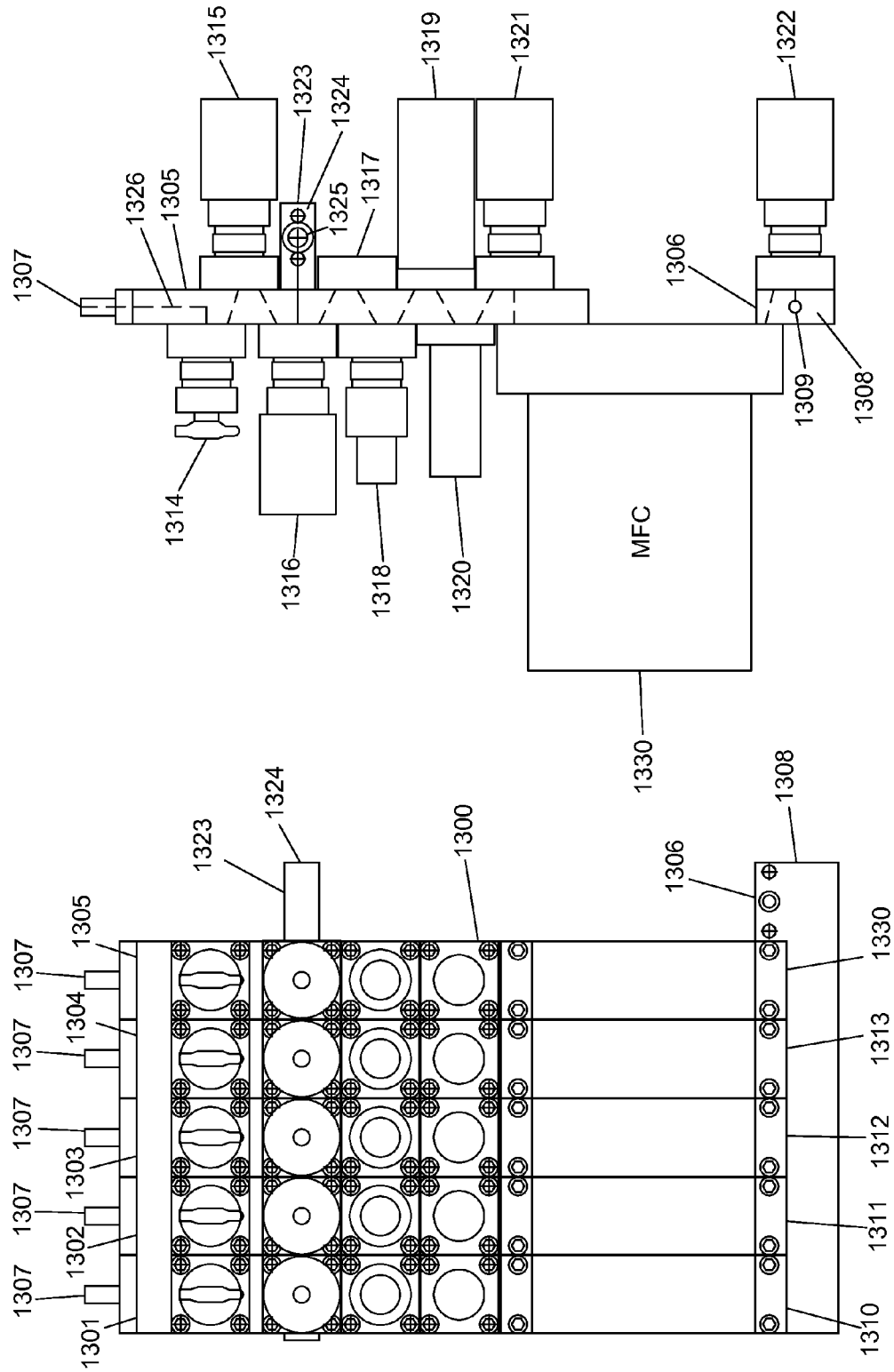
FIG. 13A shows a top view fourth embodiment of the present invention fluid delivery system.
FIG. 13B is a side view schematic of a single gas channel of FIG. 13A.

FIG. 13A shows a top view fourth embodiment of the present invention fluid delivery system showing a plurality of process gas channels incorporated into a common manifold plate. The system can incorporate one or more process gas channels. These channels do not have to be identical. For the purpose of demonstration, the system described includes five parallel flow channels that are substantially identical. Mass flow controllers are used to bridge the gas channels and the common lower manifold to form an operative fluid control system. This particular configuration includes filtration, pressure regulation, and pressure sensing, and includes a pump and purge function desired on systems used for the delivery of toxic and corrosive gases. FIG. 13A shows the embodiment of a fourth fluid delivery system 1300 having a plurality of process gas channels 1301, 1302, 1303, 1304, and 1305 incorporated into a single manifold plate, and a common lower manifold 1306 and an upper common manifold 1323. In this instance the process gas channels 1301, 1302, 1303, 1304 and 1305 are substantially identical. Each channel includes an inlet 1307 as is shown in the exemplary channel 1305. The common lower manifold 1306 also includes an end wall or face 1308 and a common outlet port 1309 (FIG. 13B) that is connected to an internal conduit that runs the length of the common lower manifold.

These particular gas channels include pump-purge capability and are thus interconnected by a centrally located upper manifold 1323 and the common lower manifold 1306. In an alternate configuration, the centrally located upper manifold can be replaced by a transverse bore drilled through the manifold plate. A vacuum pump (not shown) applies a vacuum to the top and bottom of each gas channel through the upper and lower common manifolds to evacuate the process gas and an inert gas, such as nitrogen or argon, is pressurized into the line to purge any remaining process gas. This pump-purge process is repeated several times if necessary to provide for the complete removal of the process gas. This pump-purge design is not mutually exclusive to the fluid delivery system shown in FIG. 13A and can also be applied to the previous fluid control systems shown in FIG. 7A, FIG. 9A, and FIG. 11A.

Thus the common lower manifold 1306 serves two functions. Its primary function is to interconnect the gas channels to the final delivery vessel or process chamber. Its secondary function is to isolate the final delivery vessel or process chamber to allow for pump purge capability at the lower end of each channel. The upper manifold 1323 is a common conduit that has the singular function of enabling the upstream portion of the pump and purge function. It includes an end face 1324 and a common pump/purge port 1325 (FIG. 13B) that is fluidly connected to an internal conduit that runs the length of the manifold. In an alternate configuration, the common pump/purge port 1325 can be fluidly connected to a transverse bore drilled through the manifold plate.

Each channel and the common lower manifold include a plurality of active fluid components. Mass flow controllers 1310, 1311, 1312, 1313 and 1330 are used to bridge the gas channels and the common lower manifold 1306 to form an operative fluid control system.

FIG. 13B is a side view schematic of the gas channel 1305 of FIG. 13A. Gas channel 1305 comprises eight receiving stations 1408, 1409, 1410, 1411, 1412, 1413, 1414, and 1415 for coupling to operational fluid components, the inlet 1307, a manual diaphragm valve 1314, a pneumatic isolation valve 1315, a three way pneumatic valve 1316 to allow for pump and purge, a jumper block 1317, a regulator 1318, a pressure transducer 1319, a filter 1320, a pneumatic isolation valve 1321, a mass flow controller 1330, a downstream pneumatic isolation valve 1322 mounted to the common lower manifold 1306, and the upper manifold 1323. The mass flow controller 1330 bridges the upper assemblies of the gas channel 1305 and the common lower manifold 1306. A fluid flow path through the gas channel 1305 is represented by path 1326. The path 1326 through the upper assembly is shown in more detail in FIG. 14B. The common outlet port 1309 is the output of an internal fluid passageway (not shown) that extends lengthwise through the common lower manifold 1306. A direction of the internal fluid passageway is along an axis extending out of the page of FIG. 13B at the common outlet port 1309.

The fluid flow direction through the internal fluid passageway in the common lower manifold 1306 is transverse to a general fluid flow direction along the path 1326 from the inlet 1307 to the outlet of the mass flow controller 1330. The path 1326 from each channel 1301, 1302, 1303, 1304, and 1305 connects to the internal fluid passageway within the common lower manifold 1306. Not shown are the pneumatic valves mounted to the common lower manifold that allow for pump purge capability downstream of the mass flow controller. The pump and purge function of this design allows for the evacuation of the gas downstream of the pneumatic valve 1315 to allow for removal of components, particularly the regulator 1318, filter 1320, and mass flow controller 1330, that may fail when the system is used for long term delivery of corrosive gases. Purging the gas channel is an additional safety feature that replaces the gas evacuated from the stick with an inert gas such as argon or nitrogen. Additionally, the purge gas can be left flowing out the ports of a vacated component receiving station during the removal of the corresponding component to prevent moist ambient air from entering the channel.

Figure 14A:
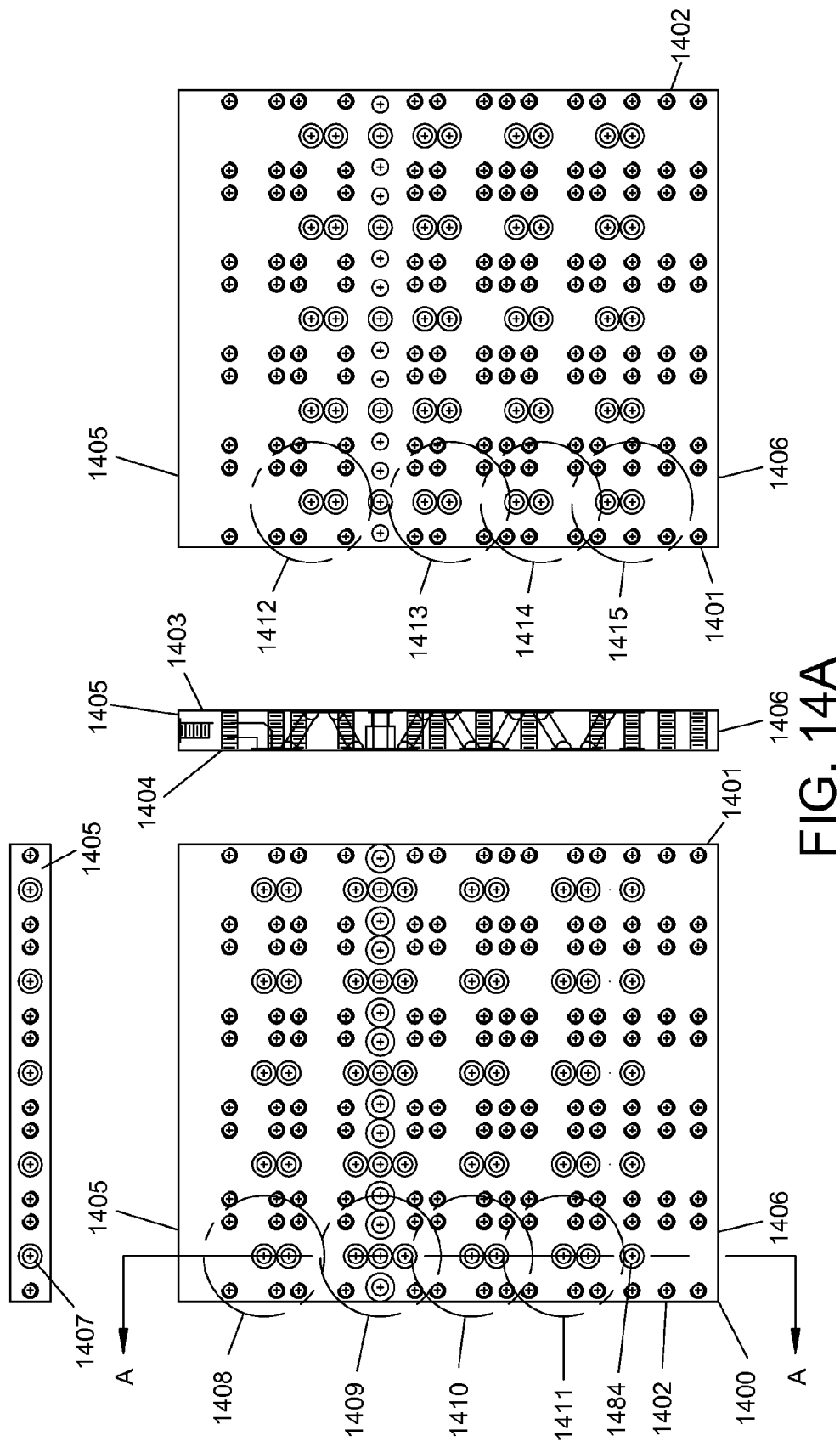
FIG. 14A and FIG. 14B show a rectangular manifold plate of the kind used to form the gas channels in FIG. 13A and FIG. 13B.
Figure 14B:
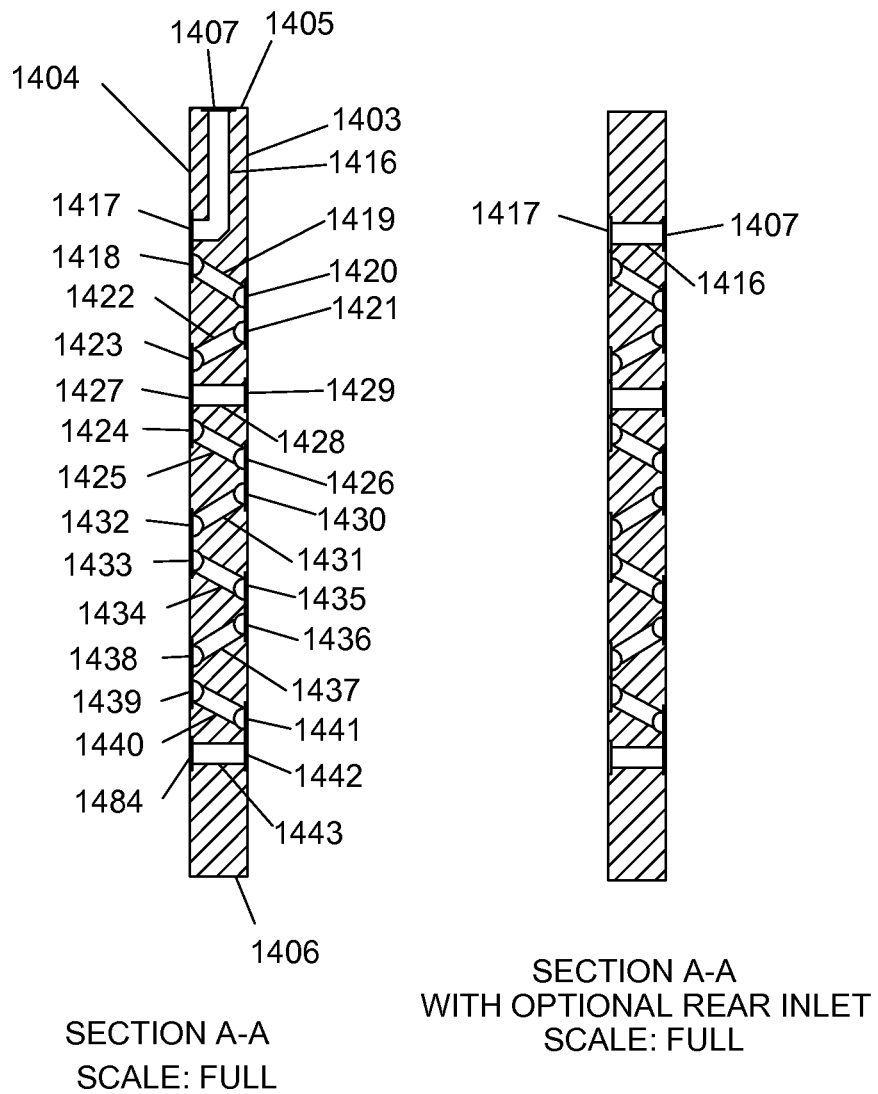

FIG. 14A and FIG. 14B detail a rectangular manifold plate 1400 of the kind used to form the gas channels in FIG. 13A-13B. Rectangular manifold plate 1400 includes a pair of sidewalls 1401 and 1402, a lateral bottom wall 1403, a lateral top wall 1404, and end walls 1405 and 1406. The manifold plate 1400 is substantially unitary and comprising a solid piece defining one or more flow channels. In this instance manifold plate 1400 comprises five flow channels described by inlets 1407, eight component receiving stations 1408, 1409, 1410, 1411, 1412, 1413, 1414, and 1415 per channel, and outlets 1484. As applied to the exemplary embodiment of FIG. 13B, the component receiving station 1408 is coupled to the manual diaphragm valve 1314, the component receiving station 1409 is coupled to the three way pneumatic valve 1316, the component receiving station 1410 is coupled to the regulator 1318, the component receiving station 1411 is coupled to the filter 1320, the component receiving station 1412 is coupled to the pneumatic isolation valve 1315, the component receiving station 1413 is coupled to the jumper block 1317, the component receiving station 1414 is coupled to the pressure transducer 1319 and, the component receiving station 1415 is coupled to the pneumatic isolation valve 1321. In this manner, a plurality of active fluid components are coupled to each of two opposing sides of the manifold plate. FIG. 14B is a cross section of a single flow channel. In this instance the inlet 1407 is located on one of the four vertical sides 1405 with an internal fluid passageway 1416 at 90 degrees in fluid communication with an inlet 1417 of the first component receiving station 1408 located on the lateral top wall 1404 of the same one piece manifold plate. However, in an alternate configuration shown in the right hand side of FIG. 14B, the inlet 1407 can also be located on the lateral bottom wall 1403 of the manifold plate 1400 directly opposite the inlet 1417 on the lateral top wall 1404 with internal passageway 1416 in direct fluid communication with inlet 1417 of the first component receiving station 1408. An outlet 1418 from the first component receiving station 1408 is connected in fluid communication by an internal fluid passageway 1419 with an inlet 1420 of the second component receiving station 1412 located on the lateral bottom wall 1403 of the same one piece manifold plate. An outlet 1421 from the second component receiving station 1412 is connected in fluid communication by an internal fluid passageway 1422 with an inlet 1423 of the third component receiving station 1409 located on the lateral top wall 1404 of the same one piece manifold plate. An outlet 1424 from the third component receiving station 1409 is connected in fluid communication by an internal fluid passageway 1425 with an inlet 1426 of the fourth component receiving station 1413 located on the lateral bottom wall 1403 of the same one piece manifold plate. In this instance, the third component receiving station 1409 has an additional outlet 1427 in fluid communication by an internal fluid passageway 1428 with an additional separate inlet 1429 located on the lateral bottom wall 1403 of the same one piece manifold plate. This additional outlet/inlet combination allows for pump and purge capability. An outlet 1430 from the fourth component receiving station 1413 is connected in fluid communication by an internal fluid passageway 1431 with an inlet 1432 of the fifth component receiving station 1410 located on the lateral top wall 1404 of the same one piece manifold plate. An outlet 1433 from the fifth component receiving station 1410 is connected in fluid communication by an internal fluid passageway 1434 with an inlet 1435 of the sixth component receiving station 1414 located on the lateral bottom wall 1403 of the same one piece manifold plate. An outlet 1436 from the sixth component receiving station 1414 is connected in fluid communication by an internal fluid passageway 1437 with an inlet 1438 of the seventh component receiving station 1411 located on the lateral top wall 1404 of the same one piece manifold plate. An outlet 1439 from the seventh component receiving station 1411 is connected in fluid communication by an internal fluid passageway 1440 with an inlet 1441 of the eighth component receiving station 1415 located on the lateral bottom wall 1403 of the same one piece manifold plate. In this instance an outlet 1442 from the eighth component receiving station 1415 is connected in fluid communication by an internal fluid passageway 1443 with the outlet port 1484 located on the lateral top wall 1404 of the same one piece manifold plate. The internal fluid passageways 1419, 1422, 1428, 1425, 1431, 1434, 1437, 1440, and 1443 form single-axis, straight-line fluid pathways through the manifold plate 1400. However, in an alternate configuration that does not require a mass flow controller or other component bridging to a common lower manifold, the outlet port 1484 can also be located on the end wall 1406 with internal fluid passageway 1443 at 90 degrees in fluid communication with outlet port 1484. As applied to the exemplary embodiment of FIG. 13B, the outlet port 1484 is coupled to the mass flow controller 1330. Included are holes (not shown) running the length of the rectangular manifold plate 1400 to accommodate heater rods that allow for heating of the gas, manifold, and attached operational fluid components. An additional alternate configuration does not include inlets 1429. In this instance the outlets 1427 are in fluid communication by internal fluid passageways 1428 to a transverse channel internal to the manifold plate that laterally interconnects to a common port on either vertical face 1401 or 1402 that enables the pump purge function without the need for a separate upper transverse manifold.

Figures 15A, 15B:
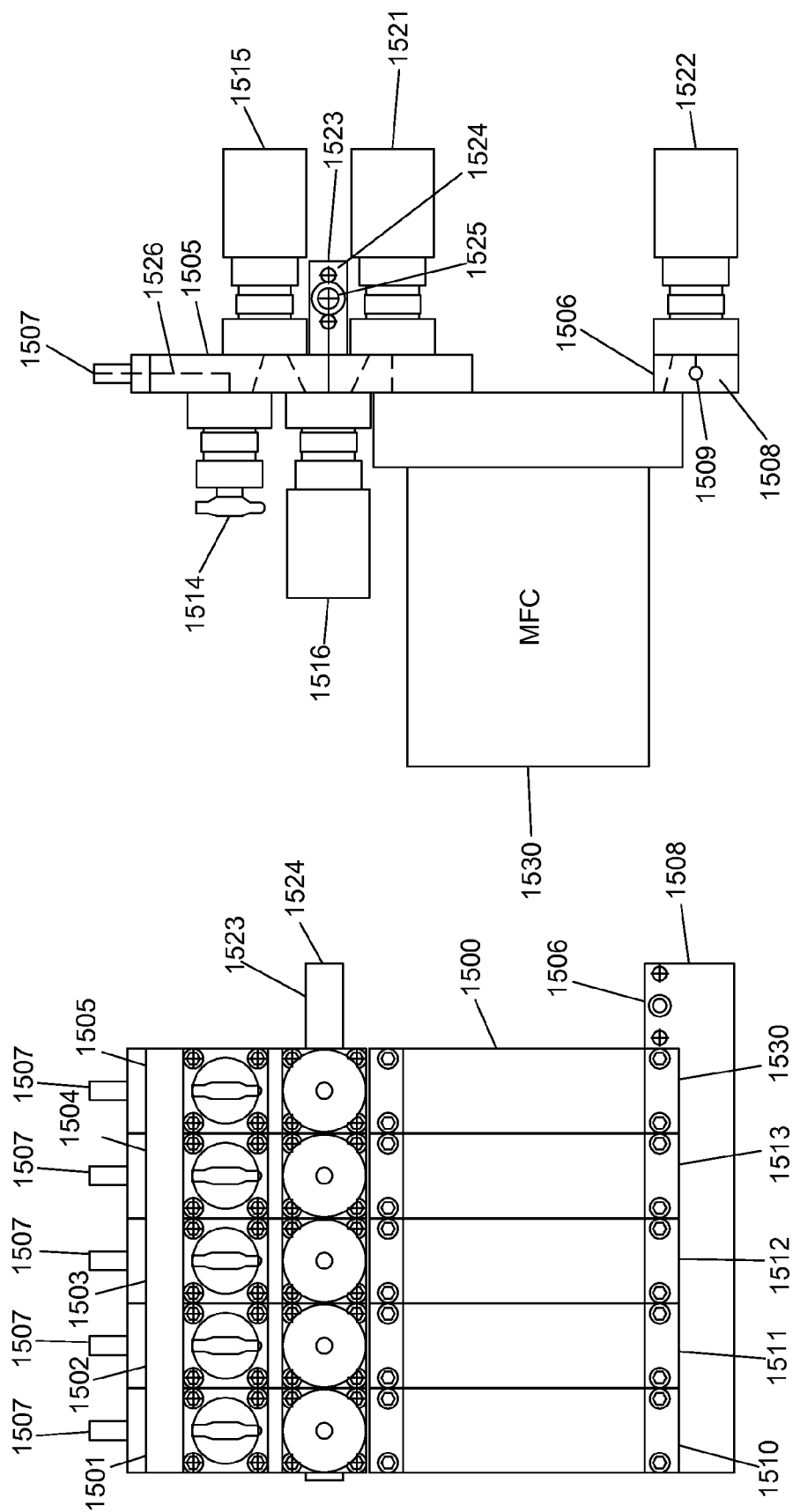
FIG. 15A shows a top view fifth embodiment of the present invention fluid delivery system.
FIG. 15B is a side view schematic of a single gas channel of FIG. 15A.

FIG. 15A shows a top view fifth embodiment of the present invention fluid delivery system showing a plurality of process gas channels incorporated into a common manifold plate. The system can incorporate one or more process gas channels. These channels do not have to be identical. For the purpose of demonstration, the system described includes five parallel flow channels that are substantially identical. Mass flow controllers are used to bridge the gas channels and the common lower manifold to form an operative fluid control system. This particular configuration does not require filtration, pressure regulation, nor pressure sensing and includes a pump and purge function desired on systems used for the delivery of toxic and corrosive gases. FIG. 15A shows the embodiment of a fifth fluid delivery system 1500 having a plurality of process gas channels 1501, 1502, 1503, 1504, and 1505 incorporated into a single manifold plate, and a common lower manifold 1506 and an upper common lower manifold 1523. In this instance the process gas channels 1501, 1502, 1503, 1504 and 1505, are substantially identical. Each channel includes an inlet 1507 as is shown in the exemplary channel 1505. The lower manifold 1506 also includes an end wall or face 1508 and a common outlet port 1509 (FIG. 15B) that is connected to an internal conduit that runs the length of the common lower manifold.

These particular gas channels include pump-purge capability and are thus interconnected by a centrally located upper manifold 1523 and the common lower manifold 1506. In an alternate configuration, the centrally located upper manifold can be replaced by a transverse bore drilled through the manifold plate. A vacuum pump (not shown) applies a vacuum to the top and bottom of each gas channel through the upper and lower common manifolds to evacuate the process gas and an inert gas, such as nitrogen or argon, is pressurized into the line to purge any remaining process gas. This pump-purge process is repeated several times if necessary to provide for the complete removal of the process gas. This pump-purge design is not mutually exclusive to the fluid delivery system shown in FIG. 15A and can also be applied to the previous fluid control systems shown in FIG. 7A, FIG. 9A, and FIG. 11A.

Thus the common lower manifold 1506 serves two functions. Its primary function is to interconnect the gas channels to the final delivery vessel or process chamber. Its secondary function is to isolate the final delivery vessel or process chamber to allow for pump purge capability at the lower end of each channel. The upper manifold 1523 is a common conduit that has the singular function of enabling the upstream portion of the pump and purge function. It includes an end face 1524 and a common pump/purge port 1525 (FIG. 15B) that is fluidly connected to an internal conduit that runs the length of the manifold. In an alternate configuration, the common pump/purge port 1525 can be fluidly connected to a transverse bore drilled through the manifold plate.

Each channel and the common lower manifold include a plurality of active fluid components. Mass flow controllers 1510, 1511, 1512, 1513 and 1530, are used to bridge the gas channels and the common lower manifold to form an operative fluid control system.

Figure 16A:
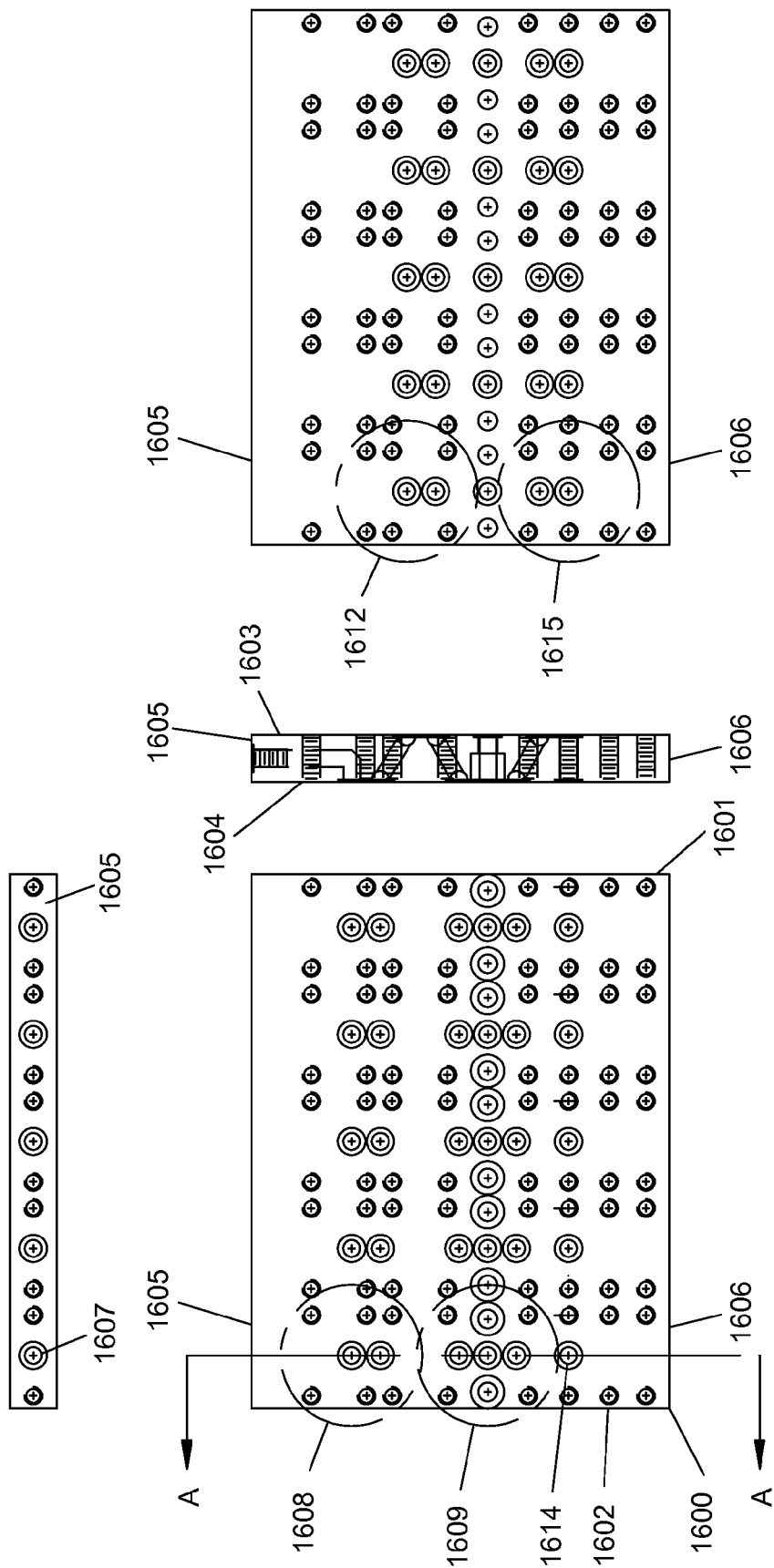
FIG. 16A and FIG. 16B show a rectangular manifold plate of the kind used to form the gas channels in FIG. 15A and FIG. 15B.
Figure 16B:
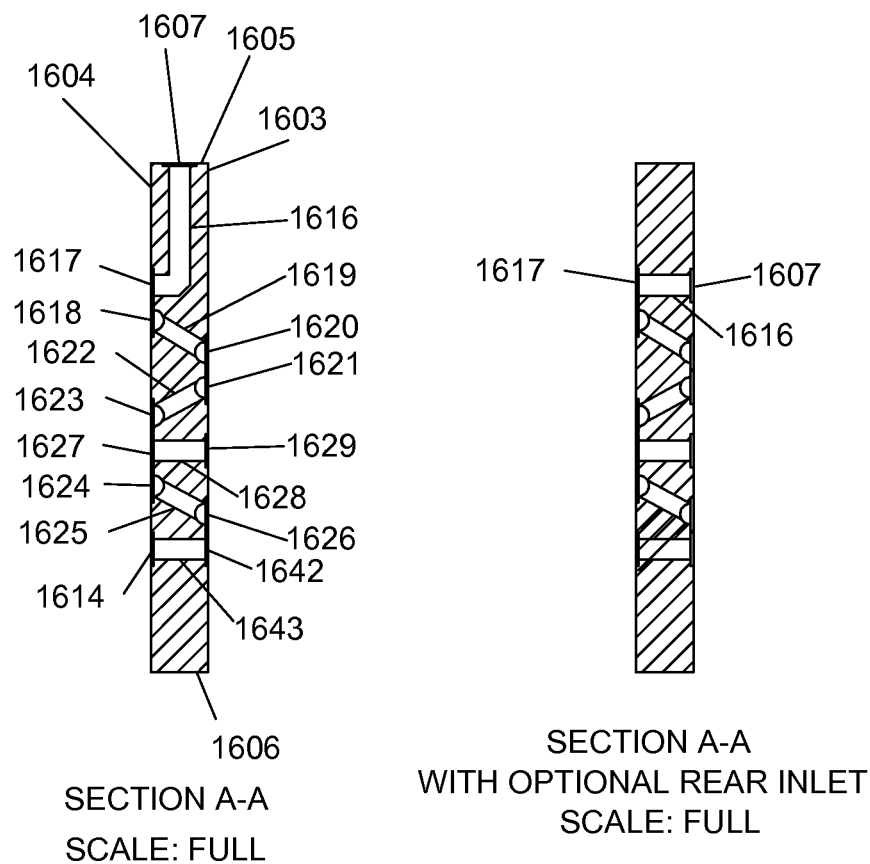

FIG. 15B is a side view schematic of the gas channel 1505 of FIG. 15A. Gas channel 1505 comprises four receiving stations 1608, 1609, 1612, and 16151645 for coupling to operational fluid components, the inlet 1507, a manual diaphragm valve 1514, a pneumatic isolation valve 1515, a three way pneumatic valve 1516 to allow for pump and purge, a pneumatic isolation valve 1521, a mass flow controller 1530, and a downstream pneumatic isolation valve 1522 mounted to the common lower manifold 1506. The mass flow controller 1530 bridges the upper assemblies of the gas channel 1505 and the common lower manifold 1506. A fluid flow path through the gas channel 1505 is represented by path 1526. The path 1526 through the upper assembly is shown in more detail in FIG. 16B. The common outlet port 1509 is the output of an internal fluid passageway (not shown) that extends lengthwise through the common lower manifold 1506. A direction of the internal fluid passageway is along an axis extending out of the page of FIG. 15B at the common outlet port 1509. The fluid flow direction through the internal fluid passageway in the common lower manifold 1506 is transverse to a general fluid flow direction along the path 1526 from the inlet 1507 to the outlet of the mass flow controller 1530. The path 1526 from each channel 1501, 1502, 1503, 1504, and 1505 connects to the internal fluid passageway within the common lower manifold 1506. Not shown are the pneumatic valves mounted to the common lower manifold that allow for pump purge capability downstream of the mass flow controller. The pump and purge function of this design allows for the evacuation of the gas downstream of the pneumatic valve 1515 to allow for removal of components, particularly the mass flow controller 1530 that may fail when the system is used for long term delivery of corrosive gases. Purging the gas channel is an additional safety feature that replaces the gas evacuated from the channel with an inert gas such as argon or nitrogen. Additionally, the purge gas can be left flowing out the ports of a vacated component receiving station during the removal of the corresponding component to prevent moist ambient air from entering the channel. FIG. 16A and FIG. 16B detail a rectangular manifold plate 1600 of the kind used to form the gas channels in FIGS. 15A-15B. Rectangular manifold plate 1600 includes a pair of sidewalls 1601 and 1602, a lateral bottom wall 1603, a lateral top wall 1604, and end walls 1605 and 1606. The manifold plate 1600 is substantially unitary and comprising a solid piece defining one or more flow channels. In this instance manifold plate 1600 comprises five flow channels described by inlets 1607, four component receiving stations 1608, 1609, 1612, and 1615 per channel, and outlets 1614. As applied to the exemplary embodiment of FIG. 15B, the component receiving station 1608 is coupled to the manual diaphragm valve 1514, the component receiving station 1609 is coupled to the three way pneumatic valve 1516, the component receiving station 1612 is coupled to the pneumatic isolation valve 1515, and the component receiving station 1615 is coupled to the pneumatic isolation valve 1521. In this manner, a plurality of active fluid components are coupled to each of two opposing sides of the manifold plate. FIG. 16B is a cross section of a single flow channel. In this instance the inlet 1607 is located on one of the four vertical sides 1605 with an internal fluid passageway 1616 at 90 degrees in fluid communication with an inlet 1617 of the first component receiving station 1608 located on the lateral top wall 1604 of the same one piece manifold plate. However, in an alternate configuration shown in the right hand side of FIG. 16B, the inlet 1607 can also be located on the lateral bottom wall 1603 of the manifold plate 1600 directly opposite the inlet 1617 on the lateral top wall 1604 with internal passageway 1616 in direct fluid communication with inlet 1617 of the first component receiving station 1608. An outlet 1618 from the first component receiving station 1608 is connected in fluid communication by an internal fluid passageway 1619 with an inlet 1620 of the second component receiving station 1612 located on the lateral bottom wall 1603 of the same one piece manifold plate. An outlet 1621 from the second component receiving station 1612 is connected in fluid communication by an internal fluid passageway 1622 with an inlet 1623 of the third component receiving station 1609 located on the lateral top wall 1604 of the same one piece manifold plate. An outlet 1624 from the third component receiving station 1609 is connected in fluid communication by an internal fluid passageway 1625 with an inlet 1626 of the fourth component receiving station 1615 located on the lateral bottom wall 1603 of the same one piece manifold plate. In this instance, the third component receiving station 1609 has an additional outlet 1627 in fluid communication by an internal fluid passageway 1628 with an additional separate inlet 1629 located on the lateral bottom wall 1603 of the same one piece manifold plate. This additional outlet/inlet combination allows for pump and purge capability. In this instance an outlet 1642 from the fourth component receiving station 1615 is connected in fluid communication by an internal fluid passageway 1643 with an outlet port 1614 located on the lateral top wall 1604 of the same one piece manifold plate. The internal fluid passageways 1619, 1622, 1628, 1625, and 1643 form single-axis, straight-line fluid pathways through the manifold plate 800. However, in an alternate configuration that does not require a mass flow controller or other component bridging to a common lower manifold, the outlet port 1614 can also be located on the end wall 1606 with internal fluid passageway 1643 at 90 degrees in fluid communication with outlet port 1614. As applied to the exemplary embodiment of FIG. 15B, the outlet port 1614 is coupled to the mass flow controller 1530. Included are holes (not shown) running the length of the rectangular manifold plate 1600 to accommodate heater rods that allow for heating of the gas, manifold, and attached operational fluid components. An additional alternate configuration does not include inlets 1629. In this instance the outlets 1627 are in fluid communication by internal fluid passageways 1628 to a transverse channel internal to the manifold plate that laterally interconnects to a common port on either vertical face 1601 or 1602 that enables the pump purge function without the need for a separate upper transverse manifold.

FIG. 17A shows a top view of a sixth embodiment of the present invention fluid delivery system showing a plurality of process gas channels incorporated into a common manifold plate. The system can incorporate one or more process gas channels. These channels do not have to be identical. For the purpose of demonstration, the system described includes five parallel flow channels that are substantially identical. Mass flow controllers are used to bridge the gas channels and the common lower manifold to form an operative fluid control system. This particular configuration includes filtration and includes a pump and purge function desired on systems used for the delivery of toxic and corrosive gases. FIG. 17A shows the embodiment of a sixth fluid delivery system 1700 having a plurality of process gas channels 1701, 1702, 1703, 1704 and 1705 incorporated into a single manifold plate, and a common lower manifold 1706 and an upper common manifold 1723. In this instance the process gas channels 1701, 1702, 1703, 1704, and 1705, are substantially identical. Each channel includes an inlet 1707 as is shown in the exemplary channel 1705. The common lower manifold 1706 also includes an end wall or face 1708 and a common outlet port 1709 (FIG. 17B) that is connected to an internal conduit that runs the length of the common lower manifold.

These particular gas channels include pump-purge capability and are thus interconnected by a centrally located upper manifold 1723 and the lower manifold 1706. In an alternate configuration, the centrally located upper manifold can be replaced by a transverse bore drilled through the manifold plate. A vacuum pump (not shown) applies a vacuum to the top and bottom of each gas channel through the upper and lower common manifolds to evacuate the process gas and an inert gas, such as nitrogen or argon, is pressurized into the line to purge any remaining process gas. This pump-purge process is repeated several times if necessary to provide for the complete removal of the process gas. This pump-purge design is not mutually exclusive to the fluid delivery system shown in FIG. 17A and can also be applied to the previous fluid control systems shown in FIG. 7A, FIG. 9A, and FIG. 11A.

Thus the common lower manifold 1706 serves two functions. Its primary function is to interconnect the gas channels to the final delivery vessel or process chamber. Its secondary function is to isolate from the final delivery vessel or process chamber to allow for pump purge capability at the lower end of each channel. The upper manifold 1723 is a common conduit that has the singular function of enabling the upstream portion of the pump and purge function. It includes an end face 1724 and a common pump/purge port 1725 (FIG. 17B) that is fluidly connected to an internal conduit that runs the length of the manifold. In an alternate configuration, the common pump/purge port 1725 can be fluidly connected to a transverse bore drilled through the manifold plate.

Each channel and the lower manifold include a plurality of active fluid components. Mass flow controllers 1710, 1711, 1712, 1713 and 1730 are used to bridge the gas channels and the common lower manifold to form an operative fluid control system.

Figure 18A:
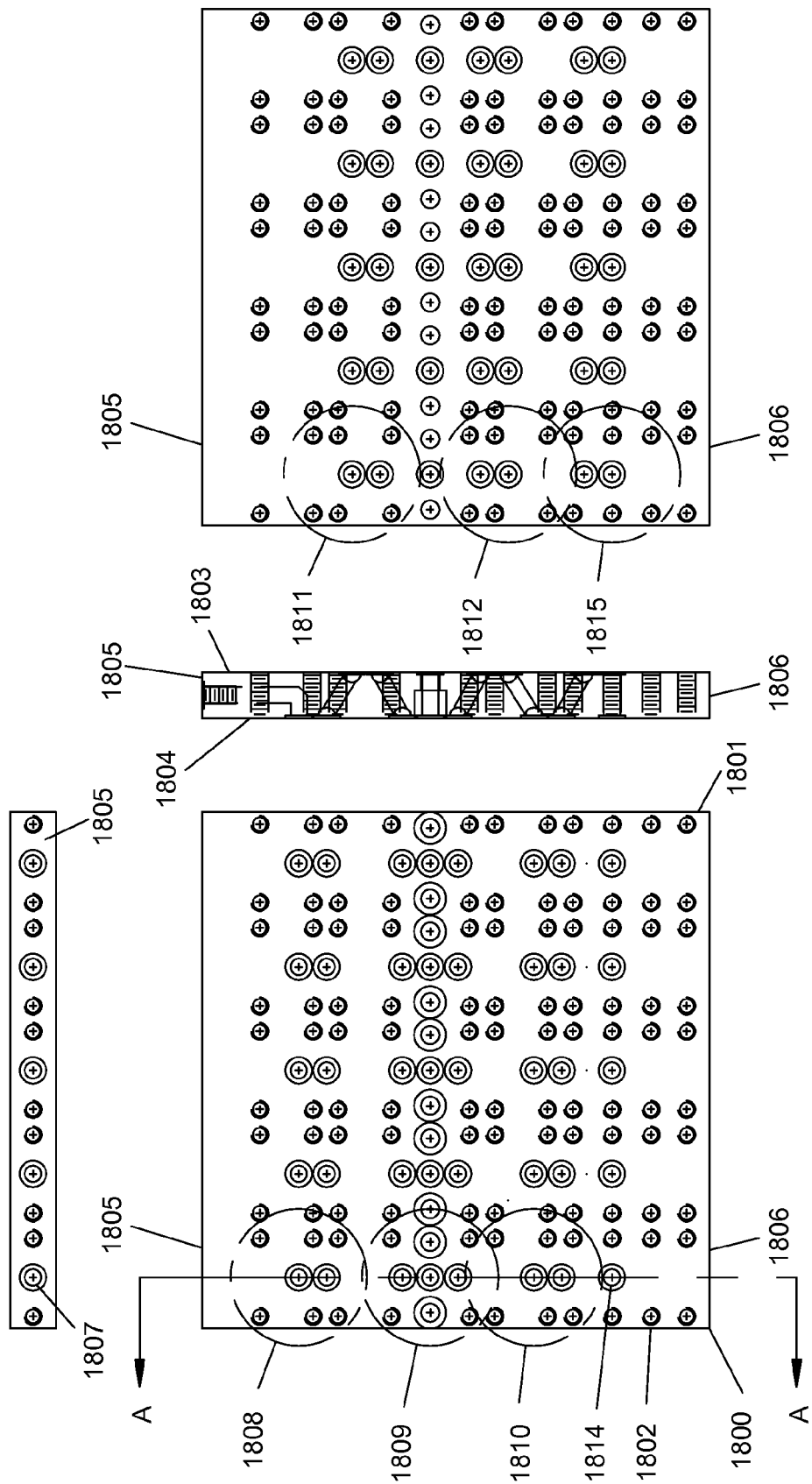
FIG. 18A and FIG. 18B show a rectangular manifold plate of the kind used to form the gas channels in FIG. 17A and FIG. 17B.
Figure 18B:
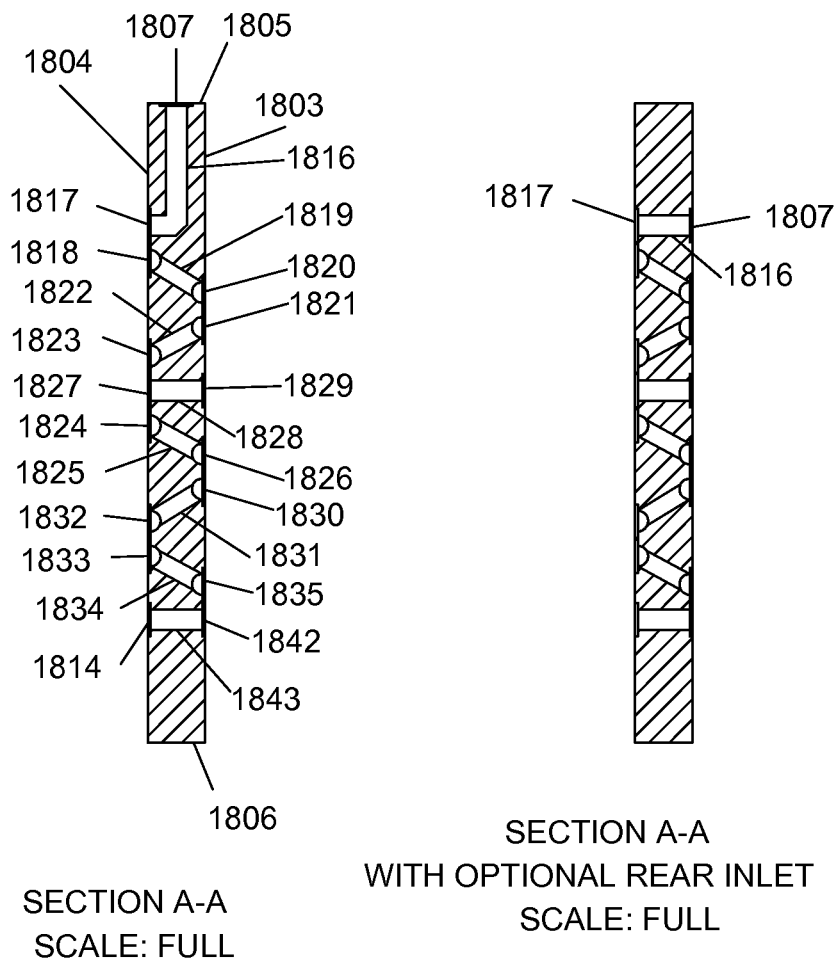

FIG. 17B is a side view schematic of the gas channel 1705 of FIG. 17A. It is a typical gas channel comprised of six receiving stations 1808, 1809, 1810, 1811, 1812, and 1815 for coupling to operational fluid components, the inlet fitting 1707, a manual diaphragm valve 1714, a pneumatic isolation valve 1715, a three way pneumatic valve 1716 to allow for pump and purge, a jumper block 1717, a filter 1720, a pneumatic isolation valve 1721, a mass flow controller 1730, and a downstream pneumatic isolation valve 1722 mounted to the common lower manifold 1706. The mass flow controller 1730 bridges the upper assemblies of the gas channel 1705 and the common lower manifold 1706. A fluid flow path through the gas channel 1705 is represented by path 1726. The path 1726 through the upper assembly is shown in more detail in FIG. 18B. The common outlet port 1709 is the output of an internal fluid passageway (not shown) that extends lengthwise through the common lower manifold 1706. A direction of the internal fluid passageway is along an axis extending out of the page of FIG. 17B at the common outlet port 1709. The fluid flow direction through the internal fluid passageway in the common lower manifold 1706 is transverse to a general fluid flow direction along the path 1726 from the inlet 1707 to the outlet of the mass flow controller 1730. The path 1726 from each channel 1701, 1702, 1703, 1704, and 1705 connects to the internal fluid passageway within the common lower manifold 1706. Not shown are the pneumatic valves mounted to the common lower manifold that allow for pump purge capability downstream of the mass flow controller. The pump and purge function of this design allows for the evacuation of the gas downstream of the pneumatic valve 1715 to allow for removal of components, particularly the filter 1720, and mass flow controller 1730, that may fail when the system is used for long term delivery of corrosive gases. Purging the gas channel is an additional safety feature that replaces the gas evacuated from the channel with an inert gas such as argon or nitrogen. Additionally, the purge gas can be left flowing out the ports of a vacated component receiving station during the removal of the corresponding component to prevent moist ambient air from entering the channel, FIG. 18A and FIG. 18B detail a rectangular manifold plate 1800 of the kind used to form the gas channels in FIGS. 17A-17B. Rectangular manifold plate 1800 includes a pair of sidewalls 1801 and 1802, a lateral bottom wall 1803, a lateral top wall 1804, and end walls 1805 and 1806. The manifold plate 1800 is substantially unitary and comprises a solid piece defining one or more flow channels. In this instance manifold plate 1800 comprises five flow channels described by inlets 1807, six component receiving stations 1808, 1809, 1810, 1811, 1812, and 1815 per channel, and outlets 1814. As applied to the exemplary embodiment of FIG. 17B, the component receiving station 1808 is coupled to the manual diaphragm valve 1714, the component receiving station 1809 is coupled to the three way pneumatic valve 1716, the component receiving station 1810 is coupled to the filter 1720, the component receiving station 1811 is coupled to the pneumatic isolation valve 1715, the component receiving station 1812 is coupled to the jumper block 1717, and the component receiving station 1815 is coupled to the pneumatic isolation valve 1721. In this manner, a plurality of active fluid components are coupled to each of two opposing sides of the manifold plate. FIG. 18B is a cross section of a single flow channel. In this instance the inlet 1807 is located on one of the four vertical sides with an internal fluid passageway 1816 at 90 degrees in fluid communication with an inlet 1817 of the first component receiving station 1808 located on the lateral top wall 1804 of the same one piece manifold plate. However, in an alternate configuration shown in the right hand side of FIG. 18B, the inlet 1807 can also be located on the lateral bottom wall 1803 of the manifold plate 1800 directly opposite the inlet 1817 on the lateral top wall 1804 with internal passageway 1816 in direct fluid communication with inlet 1817 of the first component receiving station 1808. An outlet 1818 from the first component receiving station 1808 is connected in fluid communication by an internal fluid passageway 1819 with an inlet 1820 of the second component receiving station 1811 located on the lateral bottom wall 1803 of the same one piece manifold plate. An outlet 1821 from the second component receiving station 1811 is connected in fluid communication by an internal fluid passageway 1822 with an inlet 1823 of the third component receiving station 1809 located on the lateral top wall 1804 of the same one piece manifold plate. An outlet 1824 from the third component receiving station 1809 is connected in fluid communication by an internal fluid passageway 1825 with an inlet 1826 of the fourth component receiving station 1812 located on the lateral bottom wall 1803 of the same one piece manifold plate. In this instance, the third component receiving station 1809 has an additional outlet 1827 in fluid communication by an internal fluid passageway 1828 with an additional separate inlet 1829 located on the lateral bottom wall 1803 of the same one piece manifold plate. This additional outlet/inlet combination allows for pump and purge capability. An outlet 1830 from the fourth component receiving station 1812 is connected in fluid communication by an internal fluid passageway 1831 with an inlet 1832 of the fifth component receiving station 1810 located on the lateral top wall 1804 of the same one piece manifold plate. An outlet 1833 from the fifth component receiving station 1810 is connected in fluid communication by an internal fluid passageway 1834 with an inlet 1835 of the sixth component receiving station 1815 located on the lateral bottom wall 1803 of the same one piece manifold plate. In this instance an outlet 1842 from the sixth component receiving station 1815 is connected in fluid communication by an internal fluid passageway 1843 with an outlet port 1814 located on the lateral top wall 1804 of the same one piece manifold plate. The internal fluid passageways 1819, 1822, 1828, 1825, 1831, 1834, and 1843 form single-axis, straight-line fluid pathways through the manifold plate 1800. However, in an alternate configuration that does not require a mass flow controller or other component bridging to a common lower manifold, the outlet port 1814 can also be located on the end wall 1806 with internal fluid passageway 1843 at 90 degrees in fluid communication with outlet port 1814. As applied to the exemplary embodiment of FIG. 17B, the outlet port 1814 is coupled to the mass flow controller 1730. Included are holes (not shown) running the length of the rectangular manifold plate 1800 to accommodate heater rods that allow for heating of the gas, manifold, and attached operational fluid components. An additional alternate configuration does not include inlets 1829. In this instance the outlets 1827 are in fluid communication by internal fluid passageways 1828 to a transverse channel internal to the manifold plate that laterally interconnects to a common port on either vertical face 1801 or 1802 that enables the pump purge function without the need for a separate upper transverse manifold.

Embodiments of the fluid delivery described above are directed to a manifold plate having one or more gas channels, where active fluid components are coupled to the manifold plate. Alternatively, a multiple pieces assembly is configured where a manifold plate is configured as a common rail plate mounting structure having one or more channels into each of which a fluid delivery rail insert is positioned. The active fluid components are aligned with component receiving station ports of the fluid delivery rail inserts and the active fluid components are connected to the common rail plate to thereby compress sealing gaskets between the components and the inserts.

Figure 19:
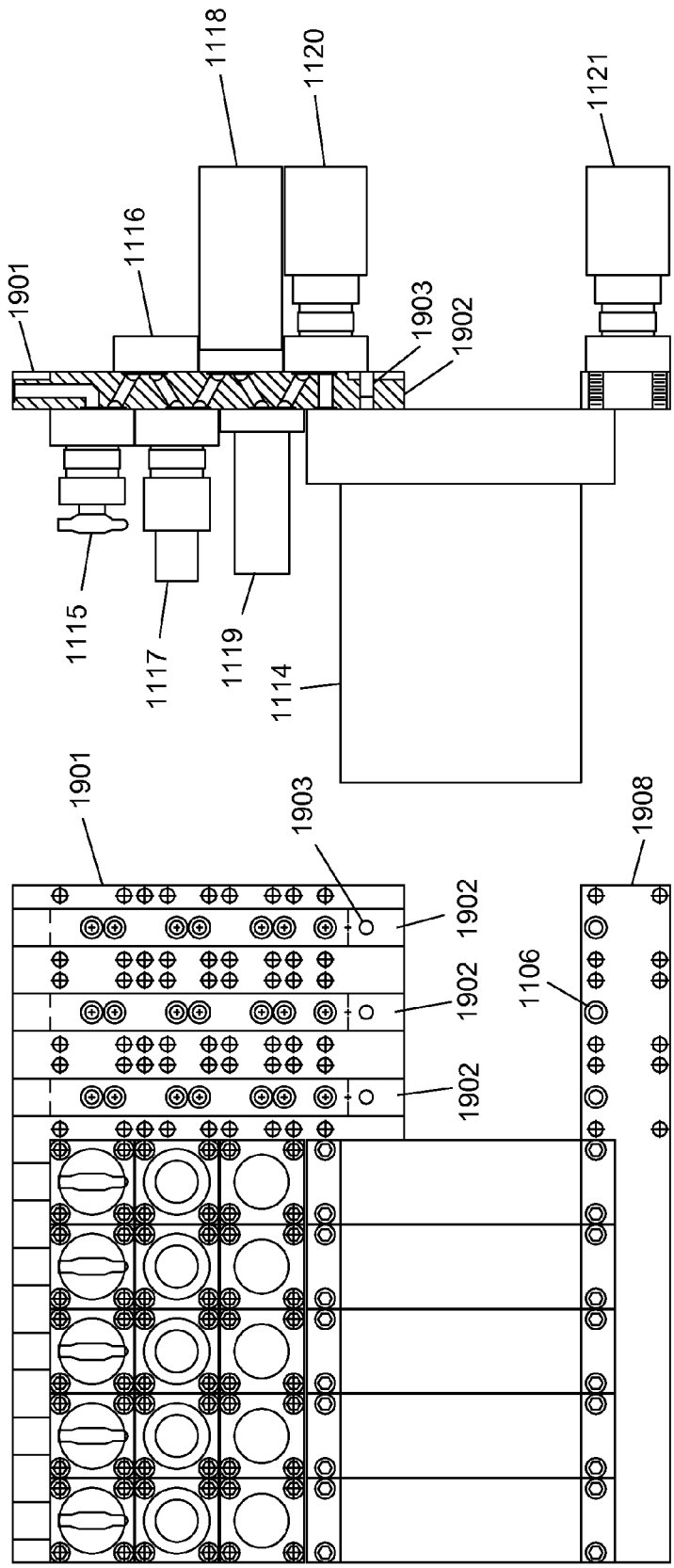
FIG. 19 shows a top view seventh embodiment of the present invention fluid delivery system.

FIG. 19 shows a top view seventh embodiment of the present invention fluid delivery system showing a plurality of process fluid delivery rail inserts 1902 incorporated into a common rail plate 1901. The system can incorporate one or more process fluid delivery rail inserts. These channel rail inserts are made of high purity stainless steel and do not have to be identical. The common rail plate 1901 may conveniently be made of material other than high purity stainless steel. For the purpose of demonstration, the system described incorporates eight rail inserts 1902, three of which are exposed without connected fluid components in FIG. 19, and is a direct replacement for the fluid delivery system described in FIG. 11A, and FIG. 11B. The fluid components 1114, 1115, 1116, 1117, 1118, 1119, and 1120 are held in place by fasteners to the common rail plate 1901. A fluid conduit is formed by placing seals between the fluid components and the rail inserts 1902. Mass flow controllers 1114 are used to bridge the fluid delivery rail inserts 1902 and the common lower manifold 1908 to form an operative fluid control system. Alignment between the common rail plate 1901 and the rail inserts 1902 is maintained by a dowel pin and or an alignment key 1903.

FIG. 20A, FIG. 20B, FIG. 20C, and FIG. 20D show various embodiments of two sided rectangular common rail plates used to construct fluid delivery systems similar to the fluid delivery system described in FIG. 19. The rectangular common rail plates are substantially unitary and comprise one or more parallel channels to accept the modular fluid delivery rail inserts described in FIG. 21 through FIG. 26. For the purpose of demonstration the rectangular common rail plate shown in FIG. 20A includes five parallel channels sized to accept a two position fluid delivery rail inserts, which is a fluid delivery rail insert configured with two component receiving stations, as shown in FIG. 21. The rectangular common rail plate 2000 shown in FIG. 20A includes a pair of sidewalls 2001 and 2002, a lateral bottom wall 2003, a lateral top wall 2004, and end walls 2005 and 2006. The common rail plate 2000 is substantially unitary and comprises a solid piece defining one or more channels 2020. In this instance manifold plate 2000 comprises five parallel channels 2020 each sized to accept a two position fluid delivery rail insert as shown in FIG. 21. Alignment between the common rail plate 2000 and the rail inserts is maintained by dowel pin 2098 or other alignment device.

Figure 20A:
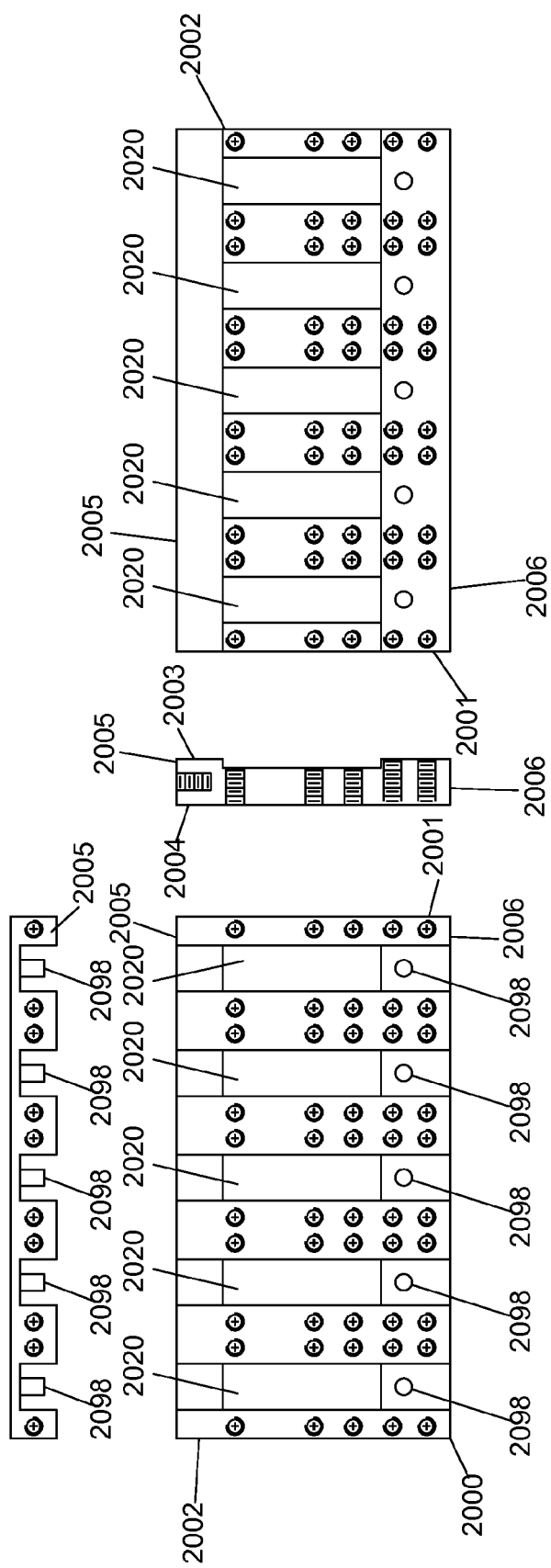
FIG. 20A, FIG. 20B, FIG. 20C, and FIG. 20D show various embodiments of two sided rectangular manifold plates used to construct fluid delivery systems similar to the fluid delivery system described in FIG. 19.
Figure 20B:
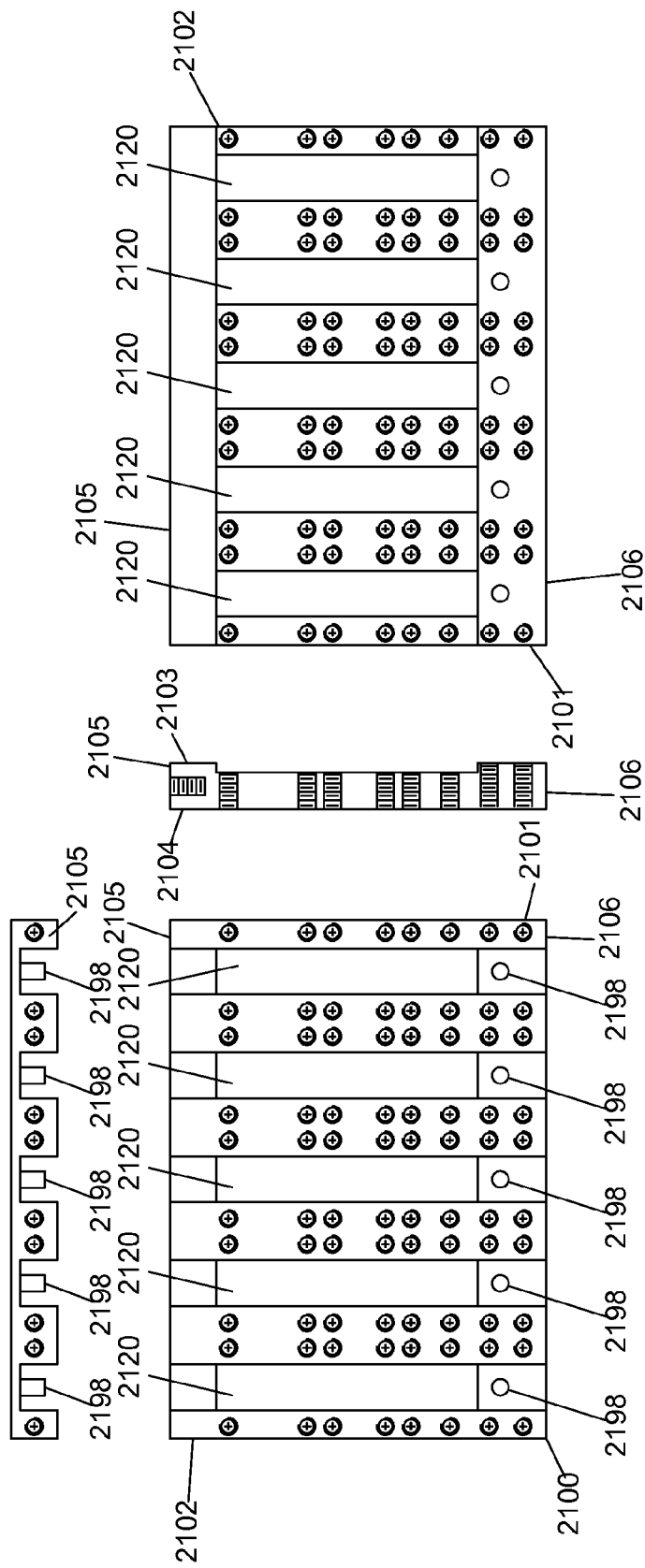
Figure 21:
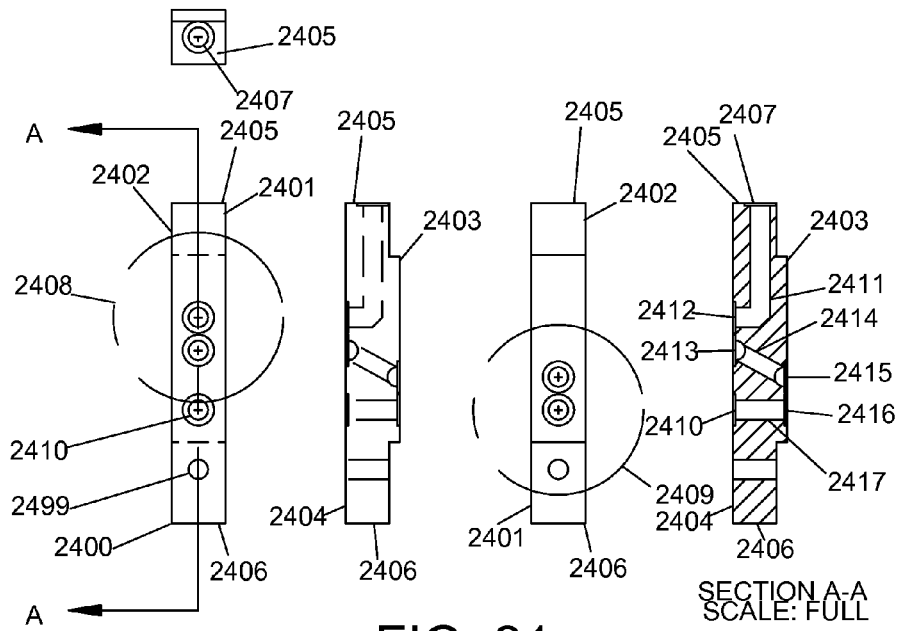
FIGS. 21-26 show various embodiments of modular fluid delivery rail inserts.
Figure 22:
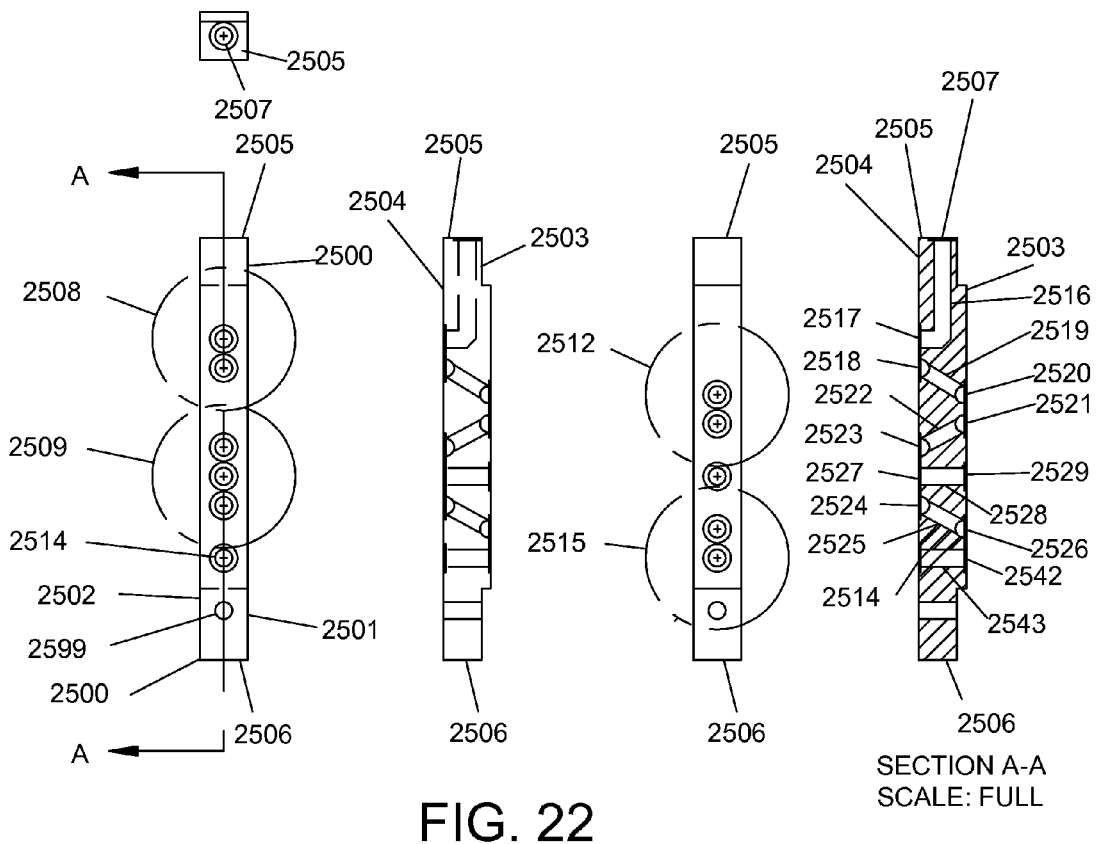
Figure 23:
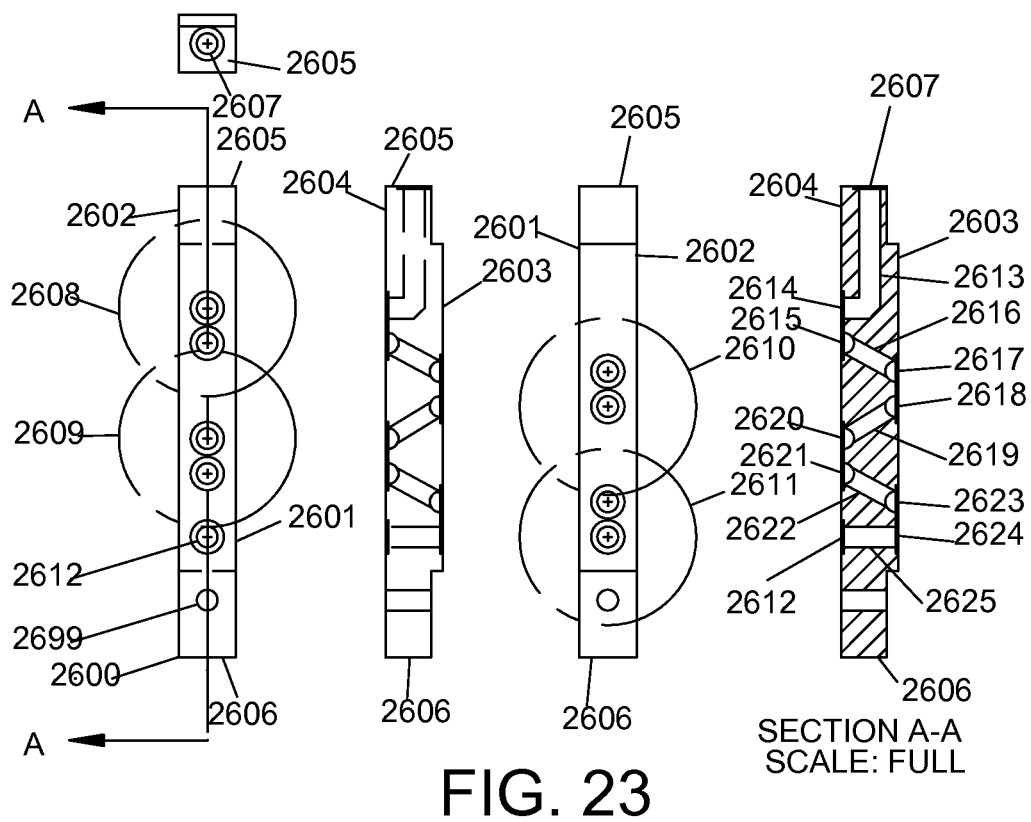

For the purpose of demonstration the rectangular common rail plate shown in FIG. 20B includes five parallel channels sized to accept three and four position fluid delivery rail inserts as shown in FIG. 22 and FIG. 23. The rectangular common rail plate 2100 shown in FIG. 20B includes a pair of sidewalls 2101 and 2102, a lateral bottom wall 2103, a lateral top wall 2104, and end walls 2105 and 2106. The common rail plate 2100 is substantially unitary and comprises a solid piece defining one or more channels 2120. In this instance the common rail plate 2100 comprises five parallel channels 2120 each sized to accept the three and four position fluid delivery rail inserts as shown in FIG. 22 and FIG. 23. Alignment between the common rail plate 2100 and the rail inserts is maintained by dowel pin 2198 or other alignment device.

Figure 20C:
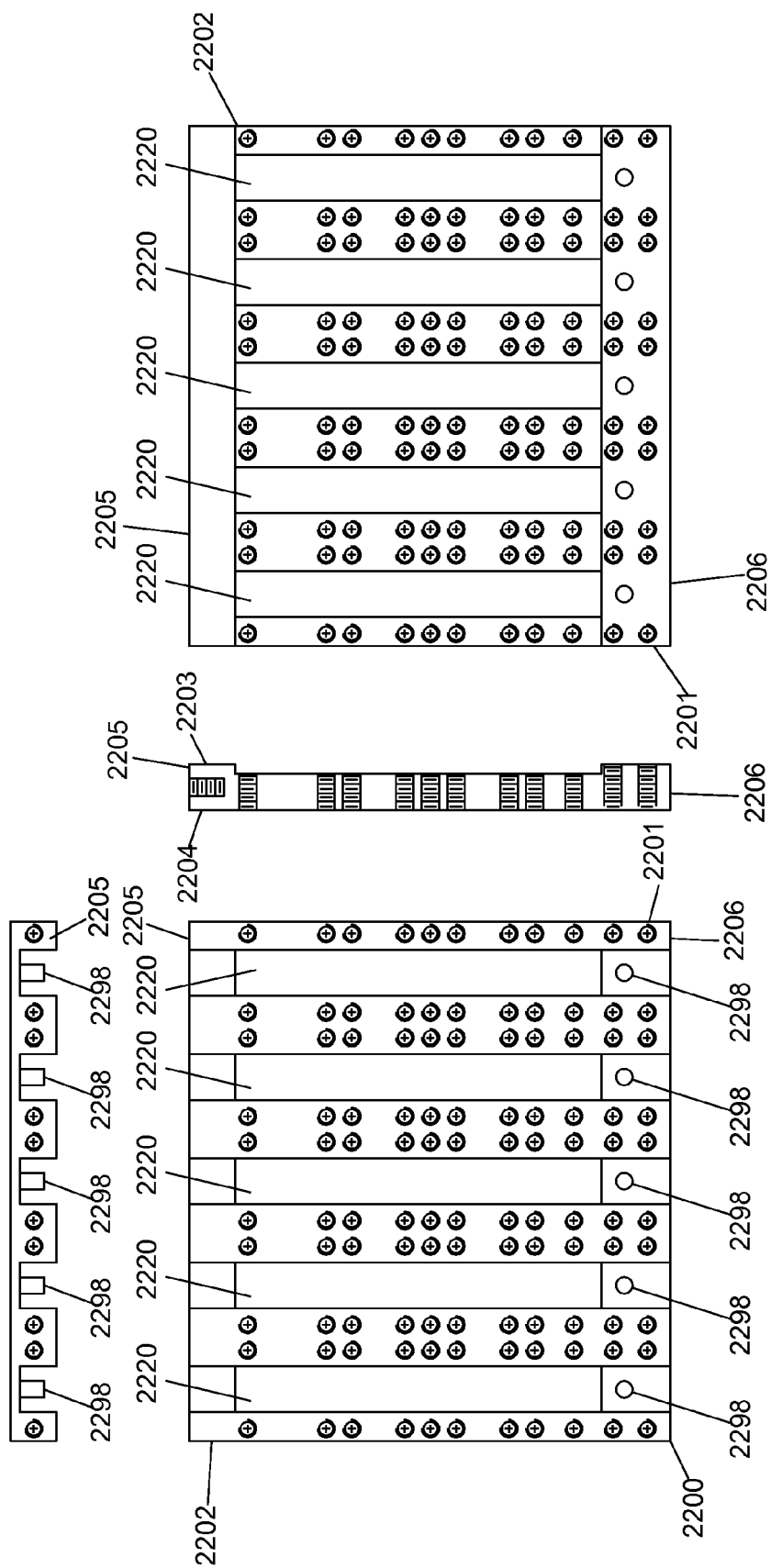
Figure 24:
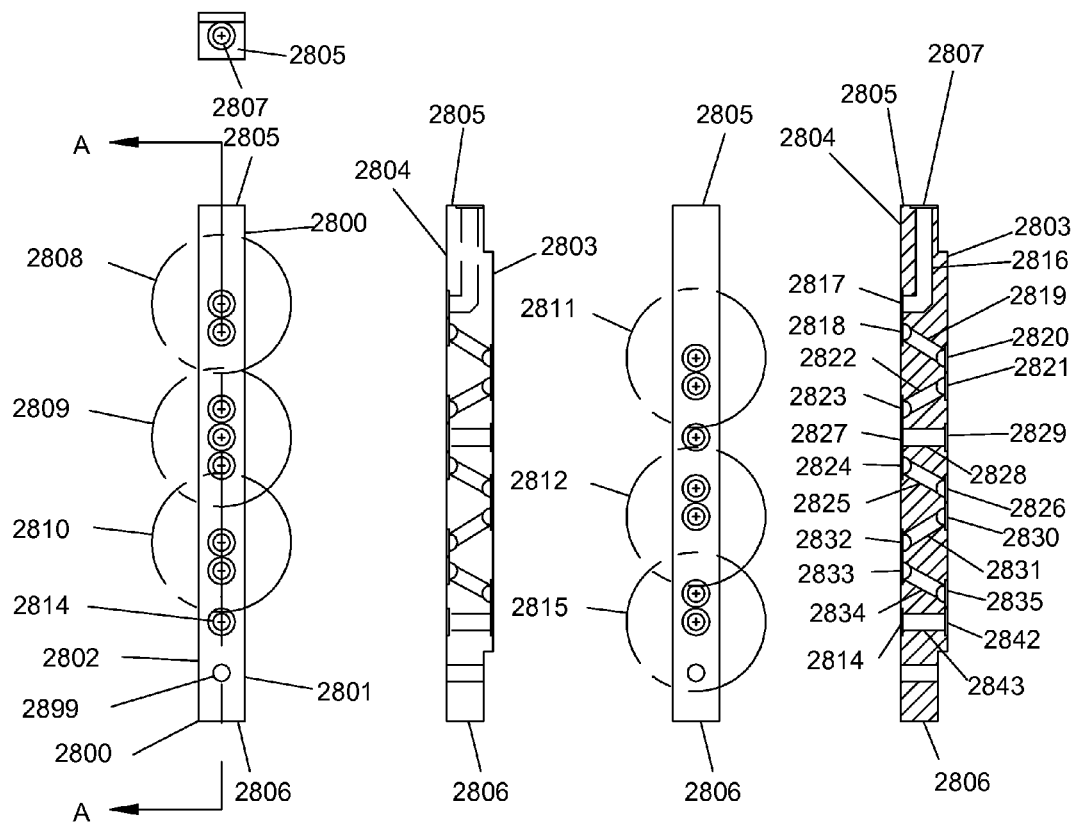
Figure 25:
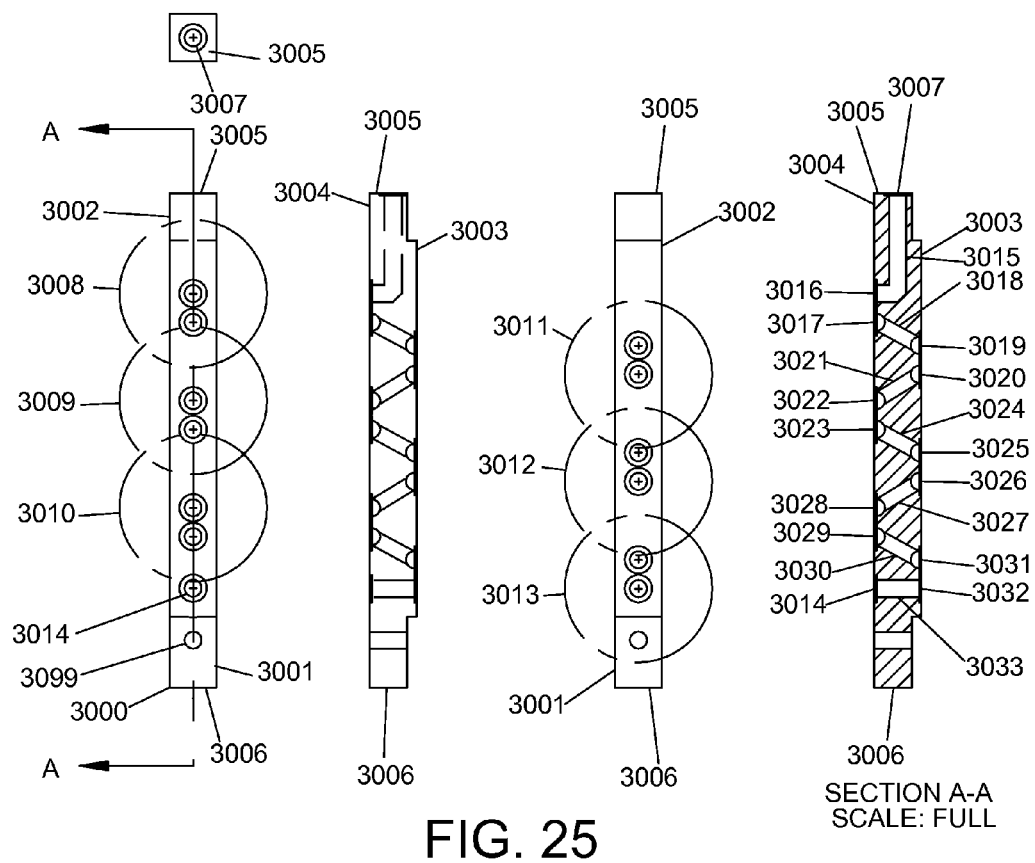

For the purpose of demonstration the rectangular common rail plate shown in FIG. 20C includes five parallel channels sized to accept the five and six position fluid delivery rail inserts as shown in FIG. 24 and FIG. 25. The rectangular common rail plate 2200 shown in FIG. 20C includes a pair of sidewalls 2201 and 2202, a lateral bottom wall 2203, a lateral top wall 2204, and end walls 2205 and 2206. The common rail plate 2200 is substantially unitary and comprises a solid piece defining one or more channels 2220. In this instance manifold plate 2200 comprises five parallel channels 2220 each sized to accept the five and six position fluid delivery rail inserts as shown in FIG. 24 and FIG. 25. Alignment between the common rail plate 2200 and the rail inserts is maintained by dowel pin 2298 or other alignment device.

Figure 20D:
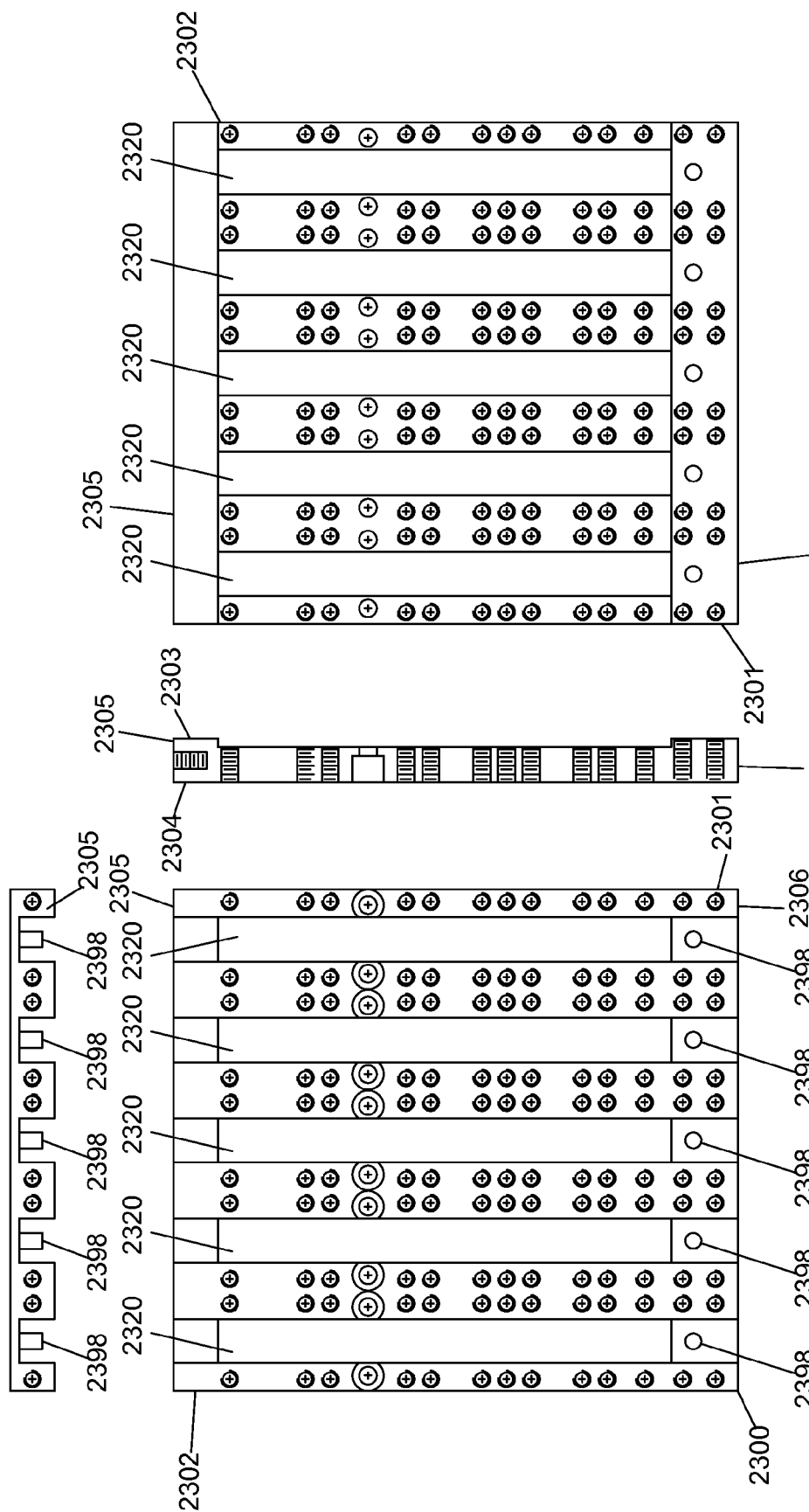
Figure 26:
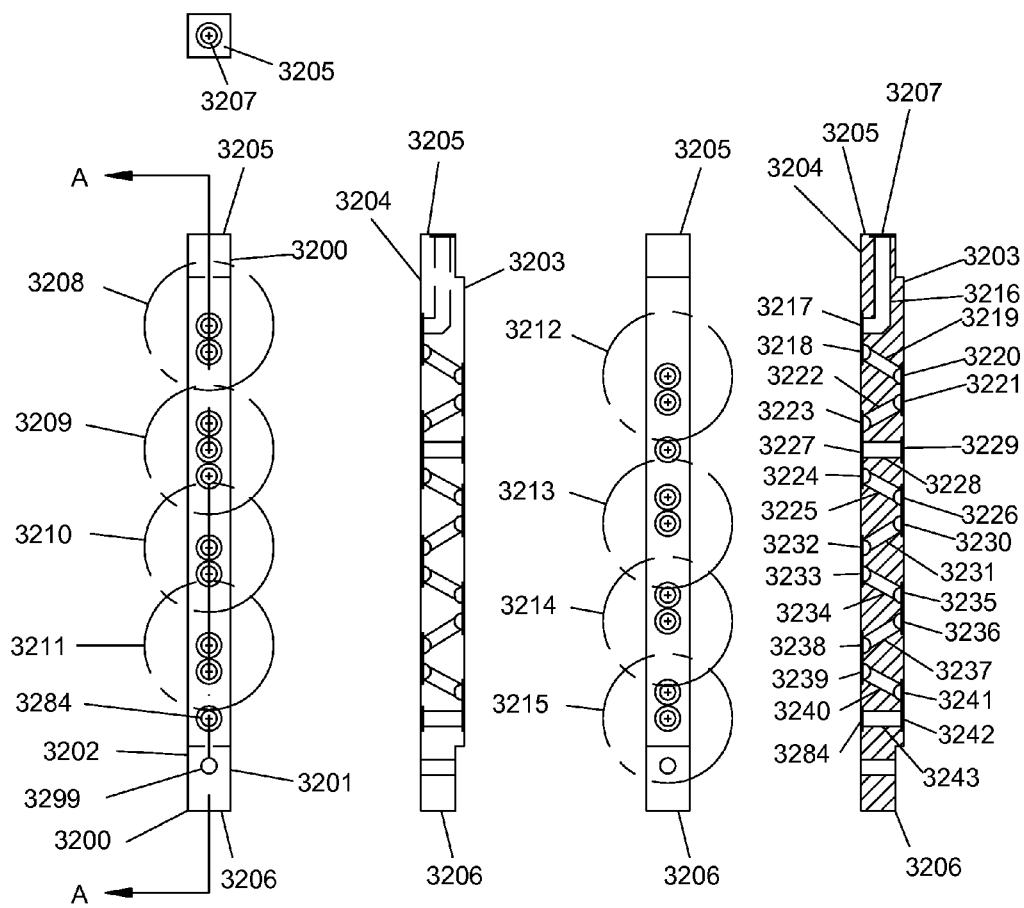

For the purpose of demonstration the rectangular common rail plate shown in FIG. 20D includes five parallel channels sized to accept the seven and eight position fluid delivery rail inserts as shown in FIG. 26. The rectangular common rail plate 2300 shown in FIG. 20D includes a pair of sidewalls 2301 and 2302, a lateral bottom wall 2303, a lateral top wall 2304, and end walls 2305 and 2306. The common rail plate 2300 is substantially unitary and comprises a solid piece defining one or more channels 2320. In this instance the common rail plate 2300 is comprises five parallel channels 2320 each sized to accept the seven and eight position fluid delivery rail insert as shown in FIG. 26. Alignment between the common rail plate 2300 and the rail inserts is maintained by dowel pin 2398 or other alignment device.

FIG. 21 details a fluid delivery rail insert 2400 that includes a pair of sidewalls 2401 and 2402, a lateral bottom wall 2403, a lateral top wall 2404, and end walls 2405 and 2406. The fluid delivery rail insert 2400 is substantially unitary and comprises a solid piece defining one flow channel. Fluid delivery rail insert 2400 comprises inlet 2407, two component receiving stations 2408 and 2409, and outlet 2410. In this manner, the fluid delivery rail insert 2400 is configured to connect an active fluid component on each of two opposing sides. The inlet 2407 is located on one of the four vertical sides 2405 with an internal fluid passageway 2411 at 90 degrees in fluid communication with an inlet 2412 of the first component receiving station 2408 located on the lateral top wall 2404 of the same one piece fluid delivery rail insert. However, in an alternate configuration, the inlet 2407 can also be located on the lateral bottom wall 2403 of the fluid delivery rail insert 2400 directly opposite the inlet 2412 on the lateral top wall 2404 with internal passageway 2411 in direct fluid communication with inlet 2412 of the first fluid first component receiving station 2408. An outlet 2413 from the first component receiving station 2408 is connected in fluid communication by an internal fluid passageway 2414 with an inlet 2415 of the second component receiving station 2409 located on the lateral bottom wall 2403 of the same one piece fluid delivery rail insert. In this instance an outlet 2416 from the second component receiving station 2409 is connected in fluid communication by an internal fluid passageway 2417 with an outlet port 2410 located on the lateral top wall 2404 of the same one piece fluid delivery rail insert. The internal fluid passageways 2414 and 2417 form single-axis, straight-line fluid pathways through the fluid delivery rail insert 2400. However, in an alternate configuration that does not require a mass flow controller or other component bridging to a common lower manifold, the outlet port 2410 can also be located on the end wall 2406 with internal fluid passageway 2417 at 90 degrees in fluid communication with outlet port 2410.

FIG. 22 details a fluid delivery rail insert 2500 that includes a pair of sidewalls 2501 and 2502, a lateral bottom wall 2503, a lateral top wall 2504, and end walls 2505 and 2506. The fluid delivery rail insert 2500 is substantially unitary and comprises a solid piece defining one flow channel. Fluid delivery rail insert 2500 comprises inlet 2507, four component receiving stations 2508 and 2509, 2512, and 2515, and outlet 2514. In this manner, one or more active fluid components are coupled to each of two opposing sides of the fluid delivery rail insert. The inlet 2507 is located on one of the four vertical sides 2505 with an internal fluid passageway 2516 at 90 degrees in fluid communication with the inlet 2517 of the first component receiving station 2508 located on the lateral top wall 2504 of the same one piece fluid delivery rail insert. However, in an alternate configuration, the inlet 2507 can also be located on the lateral bottom wall 2503 of the fluid delivery rail insert 2500 directly opposite the inlet 2517 on the lateral top wall 2404 with internal fluid passageway 2516 in direct fluid communication with inlet 2517 of the first component receiving station 2508. An outlet 2518 from the first component receiving station 2508 is connected in fluid communication by an internal fluid passageway 2519 with an inlet 2520 of the second component receiving station 2512 located on the lateral bottom wall 2503 of the same one piece fluid delivery rail insert. An outlet 2521 from the second component receiving station 2512 is connected in fluid communication by an internal fluid passageway 2522 with an inlet 2523 of the third component receiving station 2509 located on the lateral top wall 2504 of the same one piece fluid delivery rail insert. An outlet 2524 from the third component receiving station 2509 is connected in fluid communication by an internal fluid passageway 2525 with an inlet 2526 of the fourth component receiving station 2515 located on the lateral bottom wall 2503 of the same one piece fluid delivery rail insert. In this instance, the third component receiving station 2509 has an additional outlet 2527 in fluid communication by an internal fluid passageway 2528 with an additional separate inlet 2529 located on the lateral bottom wall 2503 of the same one piece fluid delivery rail insert. This additional outlet/inlet combination allows for pump and purge capability. In this instance an outlet 2542 from the fourth component receiving station 2515 is connected in fluid communication by an internal fluid passageway 2543 with the outlet port 2514 located on the lateral top wall 2504 of the same one piece fluid delivery rail insert. The internal fluid passageways 2519, 2522, 2528, 2525, and 2543 form single-axis, straight-line fluid pathways through the fluid delivery rail insert 2500. However, in an alternate configuration that does not require a mass flow controller or other component bridging to a common lower manifold, the outlet port 2514 can also be located on the end wall 2506 with internal fluid passageway 2543 at 90 degrees in fluid communication with outlet port 2514.

FIG. 23 details a fluid delivery rail insert 2600 that includes a pair of sidewalls 2601 and 2602, a lateral bottom wall 2603, a lateral top wall 2604, and end walls 2605 and 2606. The fluid delivery rail insert 2600 is substantially unitary and comprises a solid piece defining one flow channel. Fluid delivery rail insert 2600 comprises inlet 2607, four component receiving stations 2608, 2609, 2610, and 2611, and outlet 2612. In this manner, one or more active fluid components are coupled to each of two opposing sides of the manifold plate. The inlet 2607 is located on one of the four vertical sides 2605 with an internal fluid passageway 2613 at 90 degrees in fluid communication with the inlet 2614 of the first component receiving station 2608 located on the lateral top wall 2604 of the same one piece fluid delivery rail insert. However, in an alternate configuration, the inlet 2607 can also be located on the lateral bottom wall 2603 of the fluid delivery rail insert 2600 directly opposite the inlet 2614 on the lateral top wall 2604 with internal fluid passageway 2613 in direct fluid communication with inlet 2614 of the first component receiving station 2608. An outlet 2615 from the first component receiving station 2608 is connected in fluid communication by an internal fluid passageway 2616 with an inlet 2617 of the second component receiving station 2610 located on the lateral bottom wall 2603 of the same one piece fluid delivery rail insert. An outlet 2618 from the second component receiving station 2610 is connected in fluid communication by an internal fluid passageway 2619 with an inlet 2620 of the third component receiving station 2609 located on the lateral top wall 2604 of the same one piece fluid delivery rail insert. An outlet 2621 from the third component receiving station 2609 is connected in fluid communication by an internal fluid passageway 2622 with an inlet 2623 of the fourth component receiving station 2611 located on the lateral bottom wall 2603 of the same one piece fluid delivery rail insert. In this instance an outlet 2624 from the fourth component receiving station 2611 is connected in fluid communication by an internal fluid passageway 2625 with an outlet port 2612 located on the lateral top wall 2604 of the same one piece fluid delivery rail insert. The internal fluid passageways 2616, 2619, 2622, and 2625 form single-axis, straight-line fluid pathways through the fluid delivery rail insert 2600. However, in an alternate configuration that does not require a mass flow controller or other component bridging to a common lower manifold, the outlet port 2612 can also be located on the end wall 2606 with internal fluid passageway 2625 at 90 degrees in fluid communication with outlet port 2612.

FIG. 24 details a fluid delivery rail insert 2800 that includes a pair of sidewalls 2801 and 2802, a lateral bottom wall 2803, a lateral top wall 2804, and end walls 2805 and 2806. The fluid delivery rail insert 2800 is substantially unitary and comprises a solid piece defining one flow channel. Fluid delivery rail insert 2800 comprises inlet 2807, six component receiving stations 2808, 2809, 2810, 2811, 2812, and 2815 and outlet 2814. In this manner, one or more active fluid components are coupled to each of two opposing sides of the manifold plate. The inlet 2807 is located on one of the four vertical sides with an internal fluid passageway 2816 at 90 degrees in fluid communication with an inlet 2817 of the first component receiving station 2808 located on the lateral top wall 2804 of the same one piece fluid delivery rail insert. However, in an alternate configuration, the inlet 2807 can also be located on the lateral bottom wall 2803 of the fluid delivery rail insert 2800 directly opposite the inlet 2817 on the lateral top wall 2804 with internal fluid passageway 2816 in direct fluid communication with inlet 2817 of the first component receiving station 2808. An outlet 2818 from the first component receiving station 2808 is connected in fluid communication by an internal fluid passageway 2819 with an inlet 2820 of the second component receiving station 2811 located on the lateral bottom wall 2803 of the same one piece fluid delivery rail insert. An outlet 2821 from the second component receiving station 2811 is connected in fluid communication by an internal fluid passageway 2822 with an inlet 2823 of the third component receiving station 2809 located on the lateral top wall 2804 of the same one piece fluid delivery rail insert. An outlet 2824 from the third component receiving station 2809 is connected in fluid communication by an internal fluid passageway 2825 with an inlet 2826 of the fourth component receiving station 2812 located on the lateral bottom wall 2803 of the same one piece fluid delivery rail insert. In this instance, the third component receiving station 2809 has an additional outlet 2827 in fluid communication by an internal fluid passageway 2828 with an additional separate inlet 2829 located on the lateral bottom wall 2803 of the same one piece fluid delivery rail insert. This additional outlet/inlet combination allows for pump and purge capability. An outlet 2830 from the fourth component receiving station 2812 is connected in fluid communication by an internal fluid passageway 2831 with an inlet 2832 of the fifth component receiving station 2810 located on the lateral top wall 2804 of the same one piece fluid delivery rail insert. An outlet 2833 from the fifth component receiving station 2810 is connected in fluid communication by an internal fluid passageway 2834 with an inlet 2835 of the sixth component receiving station 2815 located on the lateral bottom wall 2803 of the same one piece fluid delivery rail insert. In this instance an outlet 2842 from the sixth component receiving station 2815 is connected in fluid communication by an internal fluid passageway 2843 with an outlet port 2814 located on the lateral top wall 2804 of the same one piece fluid delivery rail insert. The internal fluid passageways 2819, 2822, 2828, 2825, 2831, 2834, and 2843 form single-axis, straight-line fluid pathways through the fluid delivery rail insert 2800. However, in an alternate configuration that does not require a mass flow controller or other component bridging to a common lower manifold, the outlet port 2814 can also be located on the end wall 2806 with internal fluid passageway 2843 at 90 degrees in fluid communication with outlet port 2814.

FIG. 25 details a fluid delivery rail insert 3000 that includes a pair of sidewalls 3001 and 3002, a lateral bottom wall 3003, a lateral top wall 3004, and end walls 3005 and 3006. The fluid delivery rail insert 3000 is substantially unitary and comprises a solid piece defining one flow channel. Fluid delivery rail insert 3000 comprises inlet 3007, six component receiving stations 3008, 3009, 3010, 3011, 3012, and 3013, and outlet 3014. In this manner, one or more active fluid components are coupled to each of two opposing sides of the manifold plate. The inlet 3007 is located on one of the four vertical sides 3005 with an internal fluid passageway 3015 at 90 degrees in fluid communication with an inlet 3016 of the first component receiving station 3008 located on the lateral top wall 3004 of the same one piece fluid delivery rail insert. However, in an alternate configuration, the inlet 3007 can also be located on the lateral bottom wall 3003 of the fluid delivery rail insert 3000 directly opposite the inlet 3016 on the lateral top wall 3004 with internal passageway 3015 in direct fluid communication with inlet 3016 of the first component receiving station 3008. An outlet 3017 from the first component receiving station 3008 is connected in fluid communication by an internal fluid passageway 3018 with an inlet 3019 of the second component receiving station 3011 located on the lateral bottom wall 3003 of the same one piece fluid delivery rail insert. An outlet 3020 from the second component receiving station 3011 is connected in fluid communication by an internal fluid passageway 3021 with an inlet 3022 of the third component receiving station 3009 located on the lateral top wall 3004 of the same one piece fluid delivery rail insert. An outlet 3023 from the third component receiving station 3009 is connected in fluid communication by an internal fluid passageway 3024 with an inlet 3025 of the fourth component receiving station 3012 located on the lateral bottom wall 3003 of the same one piece fluid delivery rail insert. An outlet 3026 from the fourth component receiving station 3012 is connected in fluid communication by an internal fluid passageway 3027 with an inlet 3028 of the fifth component receiving station 3010 located on the lateral top wall 3004 of the same one piece fluid delivery rail insert. An outlet 3029 from the fifth component receiving station 3010 is connected in fluid communication by an internal fluid passageway 3030 with an inlet 3031 of the sixth component receiving station 3013 located on the lateral bottom wall 3003 of the same one piece fluid delivery rail insert. In this instance an outlet 3032 from the sixth component receiving station 3013 is connected in fluid communication by an internal fluid passageway 3033 with the outlet port 3014 located on the lateral top wall 3004 of the same one piece fluid delivery rail insert. The internal fluid passageways 3018, 3021, 3024, 3027, 3030, 3033 form single-axis, straight-line fluid pathways through the fluid delivery rail insert 3000. However, in an alternate configuration that does not require a mass flow controller or other component bridging to a common lower manifold, the outlet port 3014 can also be located on the end wall 3006 with internal fluid passageway 3033 at 90 degrees in fluid communication with outlet port 3014.

FIG. 26 details a fluid delivery rail insert 3200 that includes a pair of sidewalls 3201 and 3202, a lateral bottom wall 3203, a lateral top wall 3204, and end walls 3205 and 3206. The fluid delivery rail insert 3200 is substantially unitary and comprises a solid piece defining one flow channel. Fluid delivery rail insert 3200 comprises inlet 3207, eight component receiving stations 3208, 3209, 3210, 3211, 3212, 3213, 3214, and 3215, and outlet 3284. In this manner, one or more active fluid components are coupled to each of two opposing sides of the manifold plate. The inlet 3207 is located on one of the four vertical sides 3205 with an internal fluid passageway 3216 at 90 degrees in fluid communication with an inlet 3217 of the first component receiving station 3208 located on the lateral top wall 3204 of the same one piece fluid delivery rail insert. However, in an alternate configuration, the inlet 3207 can also be located on the lateral bottom wall 3203 of the fluid delivery rail insert 3200 directly opposite the inlet 3217 on the lateral top wall 3204 with internal passageway 3216 in direct fluid communication with inlet 3217 of the first component receiving station 3208. An outlet 3218 from the first component receiving station 3208 is connected in fluid communication by an internal fluid passageway 3219 with an inlet 3220 of the second component receiving station 3212 located on the lateral bottom wall 3203 of the same one piece fluid delivery rail insert. An outlet 3221 from the second component receiving station 3212 is connected in fluid communication by an internal fluid passageway 3222 with an inlet 3223 of the third component receiving station 3209 located on the lateral top wall 3204 of the same one piece fluid delivery rail insert. An outlet 3224 from the third component receiving station 3209 is connected in fluid communication by an internal fluid passageway 3225 with an inlet 3226 of the fourth component receiving station 3213 located on the lateral bottom wall 3203 of the same one piece fluid delivery rail insert. In this instance, the third component receiving station 3209 has an additional outlet 3227 in fluid communication by an internal fluid passageway 3228 with an additional separate inlet 3229 located on the lateral bottom wall 3203 of the same one piece fluid delivery rail insert. This additional outlet/inlet combination allows for pump and purge capability. An outlet 3230 from the fourth component receiving station 3213 is connected in fluid communication by an internal fluid passageway 3231 with an inlet 3232 of the fifth component receiving station 3210 located on the lateral top wall 3204 of the same one piece fluid delivery rail insert. An outlet 3233 from the fifth component receiving station 3210 is connected in fluid communication by an internal fluid passageway 3234 with an inlet 3235 of the sixth component receiving station 3214 located on the lateral bottom wall 3203 of the same one piece fluid delivery rail insert. An outlet 3236 from the sixth component receiving station 3214 is connected in fluid communication by an internal fluid passageway 3237 with an inlet 3238 of the seventh component receiving station 3211 located on the lateral top wall 3204 of the same one piece fluid delivery rail insert. An outlet 3239 from the seventh component receiving station 3211 is connected in fluid communication by an internal fluid passageway 3240 with an inlet 3241 of the eighth component receiving station 3215 located on the lateral bottom wall 3203 of the same one piece fluid delivery rail insert. In this instance an outlet 3242 from the eighth component receiving station 3215 is connected in fluid communication by an internal fluid passageway 3243 with the outlet port 3284 located on the lateral top wall 3204 of the same one piece fluid delivery rail insert. The internal fluid passageways 3219, 3222, 3228, 3225, 3231, 3234, 3237, 3240, and 3243 form single-axis, straight-line fluid pathways through the fluid delivery rail insert 3200. However, in an alternate configuration that does not require a mass flow controller or other component bridging to a common lower manifold, the outlet port 3284 can also be located on the end wall 3206 with internal fluid passageway 3243 at 90 degrees in fluid communication with outlet port 3284.

Embodiments of the fluid delivery system described above are directed to a single channel configuration. Dual channel embodiments are also contemplated. A single channel embodiment is defined as a system wherein all components between the system inlet and outlet have substantially the same maximum allowable operating pressure range. A dual channel embodiment is defined as a system having a low-pressure channel and a high-pressure channel wherein the low-pressure channel components would not function properly, and might be damaged or catastrophically fail, when used according to conditions present in the high-pressure channel. The two channels are separated by a pressure regulator.

In an exemplary application, the dual channel fluid delivery system is implemented within a gas cabinet that supplies gas to a gas panel on a process tool used for flow control into a gas processing chamber such as that used to process semiconductor wafers. In general, the dual channel fluid delivery system can be implemented in those applications that use two channels.

Figure 27A:
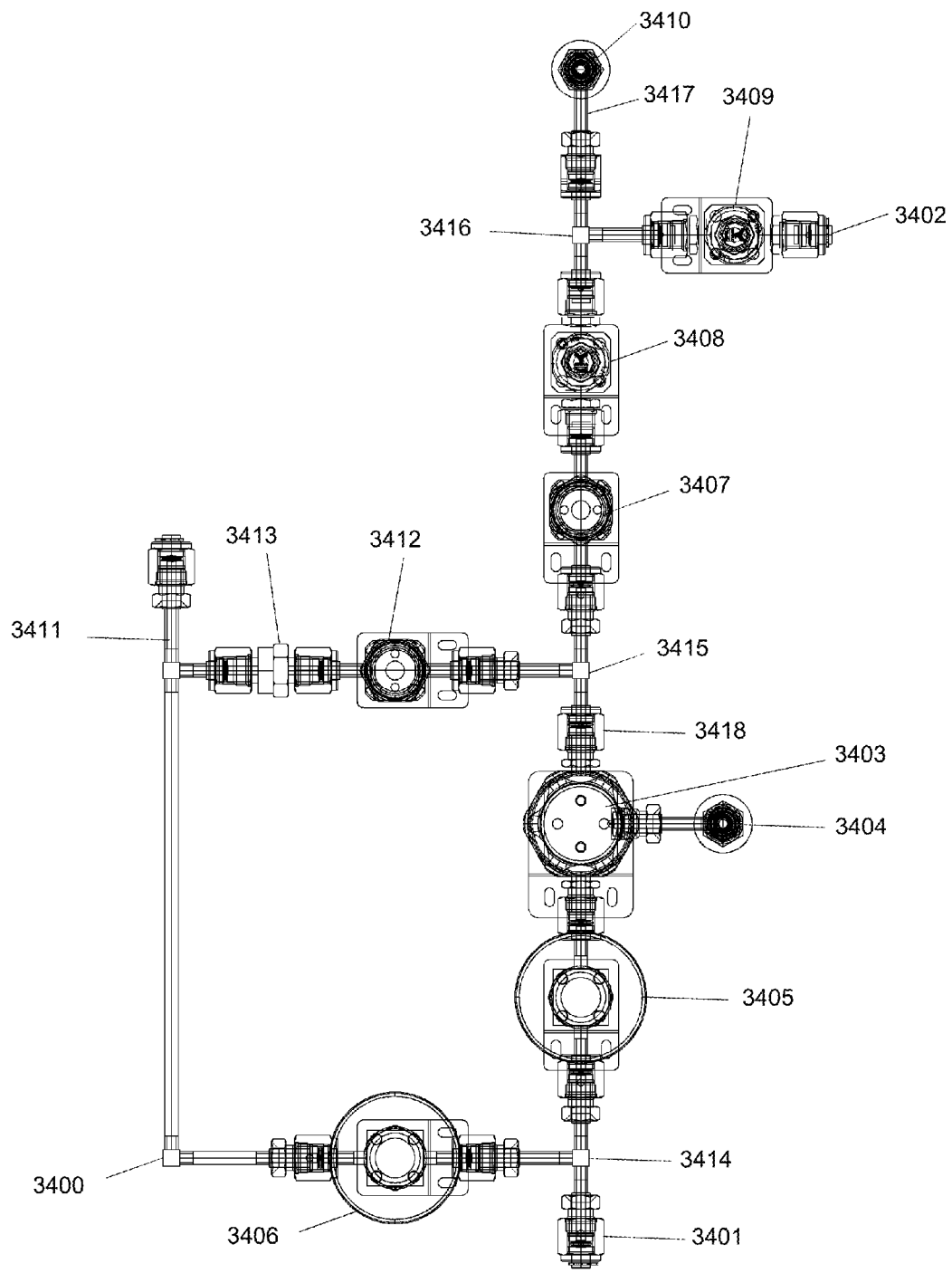
FIG. 27A shows a top view schematic of a prior art fluid delivery system for use in delivering regulated process gas from a gas cylinder to a process chamber used in the semiconductor industry.
Figure 27B:
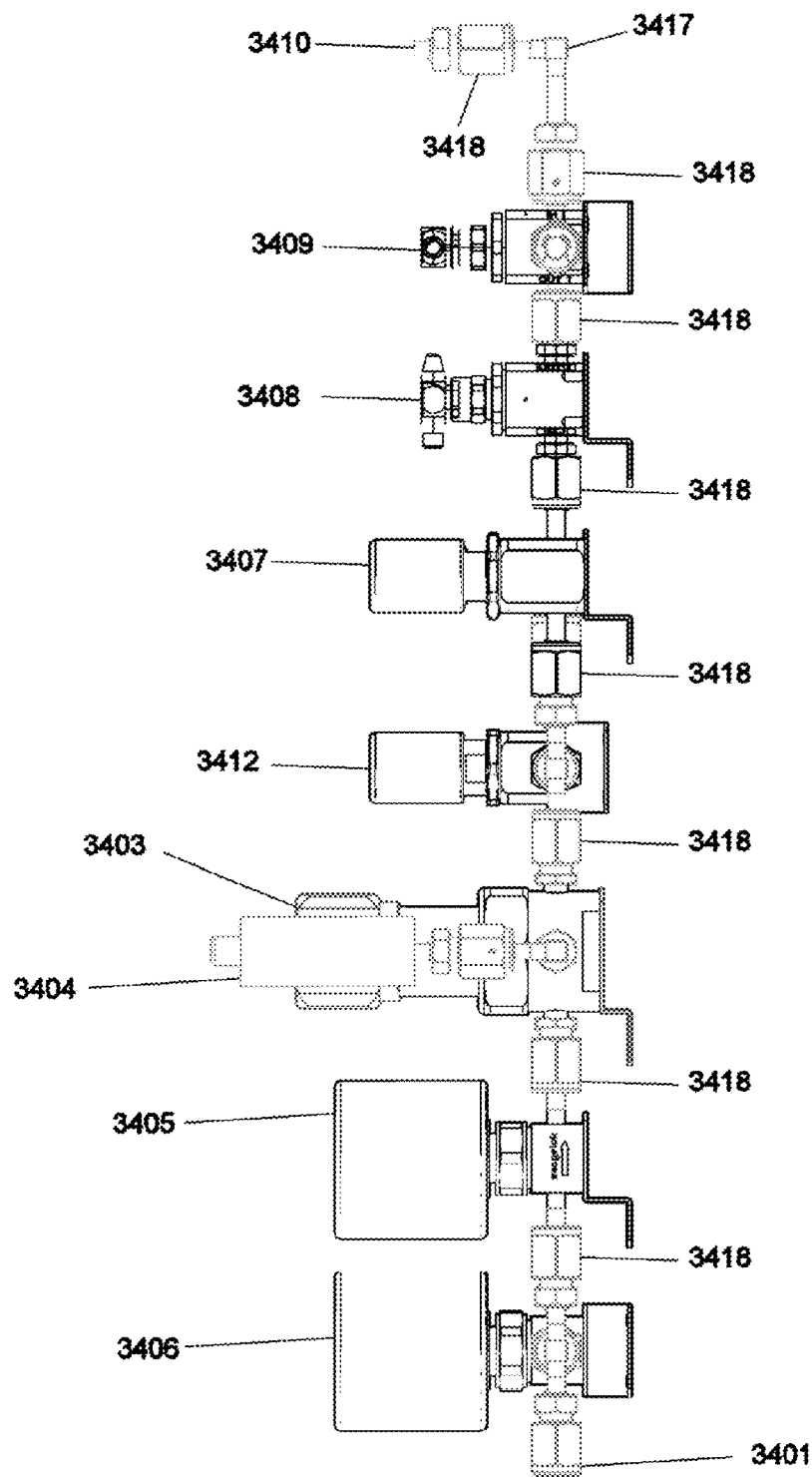
FIG. 27B shows a side view schematic of a prior art fluid delivery system shown in FIG. 31A.
Figure 28D:
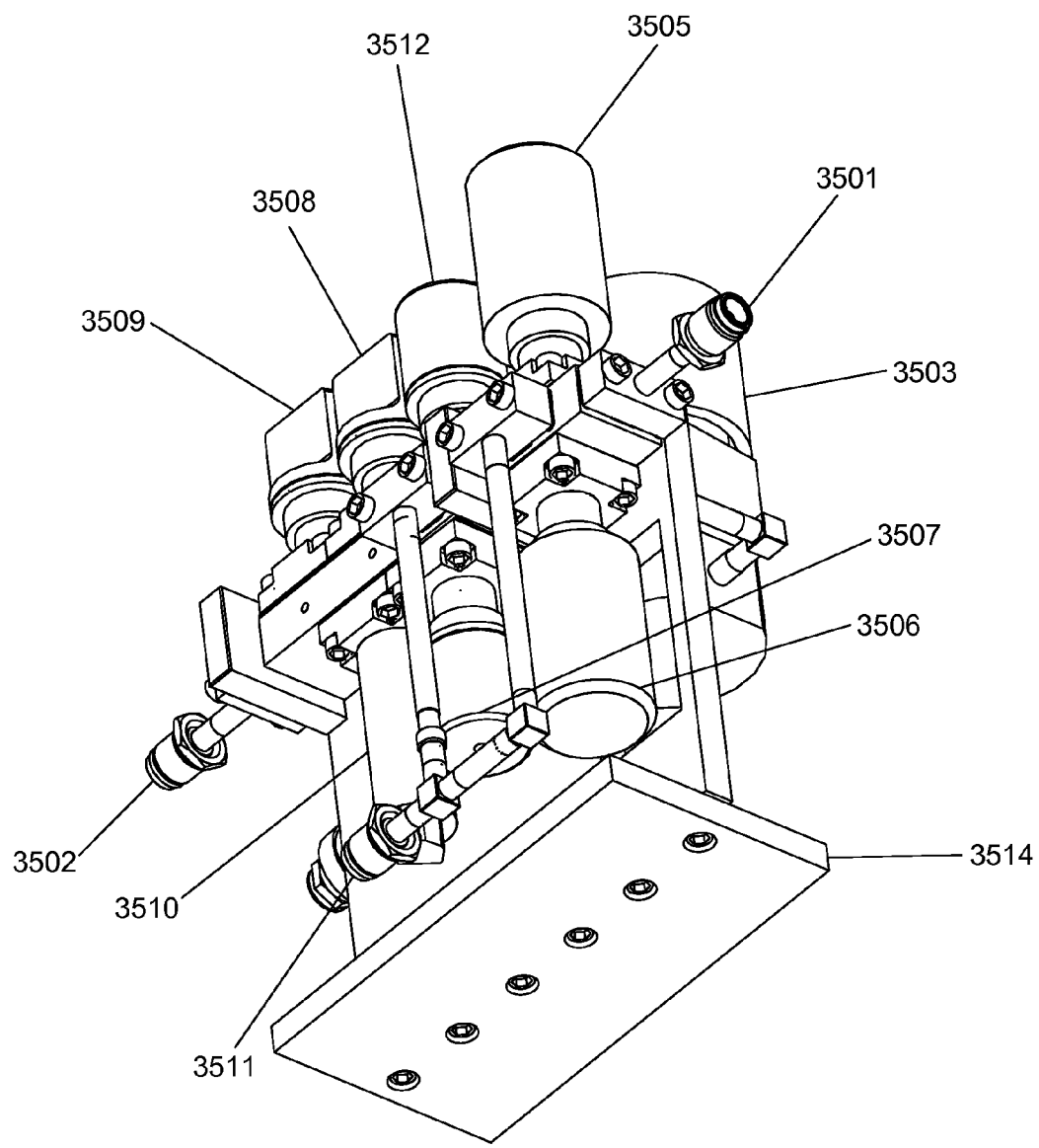

As a means of introducing a dual channel fluid delivery system in general, FIGS. 27A and 27B show a typical previously known gas delivery system of the kind used to supply processed gases from a gas bottle (high pressure gas storage cylinder) to a variety of reactor chambers during the processing of semiconductor substrates.

FIG. 27A shows a top view schematic of a prior art fluid delivery system 3400 for use in delivering regulated process gas from a gas cylinder to a process chamber used in the semiconductor industry. The fluid delivery system includes a pressure regulator as a primary component. Upstream of the regulator are two high pressure pneumatically controlled shut off valves. One shut off valve is for primary control and the other provides isolation from a bypass line. Downstream of the regulator are manual valves, pneumatic valves and pressure sensing equipment used to control the low pressure delivery of gas from the regulator. Specifically, FIG. 27A shows the extent of the plumbing and pipe fittings necessary to maintain fluid delivery system 3400 which includes a primary inlet 3401 and a primary outlet 3402. The primary component is a pressure regulator 3403. Mounted to the pressure regulator 3403 is a device 3404 used to sense pressure on the downstream low pressure side of the pressure regulator 3403. Upstream of the pressure regulator 3403 are two high pressure pneumatically controlled shut off valves 3405 and 3406. High pressure valve 3405 is used to isolate the pressure regulator 3403 from the gas cylinder normally pressurized to 3000 psig. High pressure valve 3406 is used to isolate the upstream high pressure side of the pressure regulator 3403 from a bypass line 3411. The downstream side of the pressure regulator 3403 is usually set to 150 psig. This downstream gas flow is controlled by pneumatic valve 3407 and manual valves 3408 and 3409. To verify that the downstream system is pressurized, an additional pressure sensing device 3410 is included. An additional pneumatic valve 3412 and one way check valve 3413 provide isolation from the bypass line 3411. The pressure regulator 3403 has a much higher failure rate than the other components in the fluid delivery system. The bypass line 3411 is connected to a pump/purge system used to evacuate the process gas from both sides of the regulator 3403 when it needs to be replaced. In addition to the bypass line 3411, are hand-made interconnect tubing weldments 3414, 3415, 3416, and 3417. These weldments are labor intensive to fabricate and are made from difficult to obtain and costly ultra-pure stainless steel. Included are a large number of VCR® fittings 3418. The VCR® fittings 3418 are welded to each respective flow component. The welding creates a corrosion site at the heat affected zone on each side of a respective VCR® fitting. The assembled fluid delivery system 3400 has a large footprint compared to equivalent monolithic fluid distribution system FIG. 27B shows a side view schematic of a prior art fluid delivery system 3400 shown in FIG. 27A. Shown are side views of high pressure isolation valves 3405 and 3406, the primary pressure regulator 3403 and its corresponding pressure sensing device 3404, low pressure pneumatic isolation valves 3407 and 3412, low pressure manual isolation valves 3408 and 3409, and low pressure sensing device 3410.

FIG. 28A, FIG. 28B, FIG. 28C and FIG. 28D show multiple views of an assembled fluid delivery system according to an embodiment of the present invention. An active fluid delivery system is formed when a plurality of active devices are mounted on the upper and lower surfaces of a dual channel two sided manifold plate and inlet and outlet fittings are mounted on the four vertical sides. FIG. 28A, FIG. 28B, FIG. 28C, FIG. 28D show a fluid delivery system 3500 using an exemplary manifold plate 3515 having seven receiving component stations and seven corresponding fluid components coupled to the manifold plate 3515. The fluid delivery system 3500 is assembled by mounting fluid components to each of the receiving component stations on the manifold plate 3515. The fluid delivery system shown in FIG. 28A, FIG. 28B, FIG. 28C and FIG. 28D may be used to replace the kind of previously known fluid delivery systems shown in FIG. 27A and FIG. 27B. In an exemplary application, the fluid delivery system 3500 comprises gas handling equipment of the kind used to supply process gas from a gas delivery bottle to a reactor chamber during the processing of semiconductor substrates. The manifold plate 3515 includes a primary system inlet 3501 and a primary system outlet 3502. The primary component is a pressure regulator 3503. Mounted to the pressure regulator 3503 is a device 3504 used to sense pressure on the downstream low pressure side of the pressure regulator 3503, Upstream of the pressure regulator 3503 are two high pressure pneumatically controlled shut off valves 3505 and 3506, High pressure valve 3505 is used to isolate the pressure regulator 3503 from the gas cylinder coupled to the inlet 3502, normally pressurized to 3000 psig. High pressure valve 3506 is used to isolate the upstream high pressure side of the pressure regulator 3503 from a bypass line 3511. The downstream side of the pressure regulator 3503 is usually set to 150 psig. This downstream gas flow is controlled by pneumatic valve 3507 and manual valves 3508 and 3509. To verify that the downstream system is pressurized, an additional pressure sensing device 3510 is included. An additional pneumatic valve 3512 and one way check valve 3513 provide isolation from the bypass line 3511. The pressure regulator 3503 has a much higher failure rate than the other components in the fluid delivery system. The bypass line 3511 is connected to a pump/purge system used to evacuate the process gas from both sides of the pressure regulator 3503 when the pressure regulator 3503 needs to be replaced. The assembly is mounted to a support bracket 3514.

Figure 29:
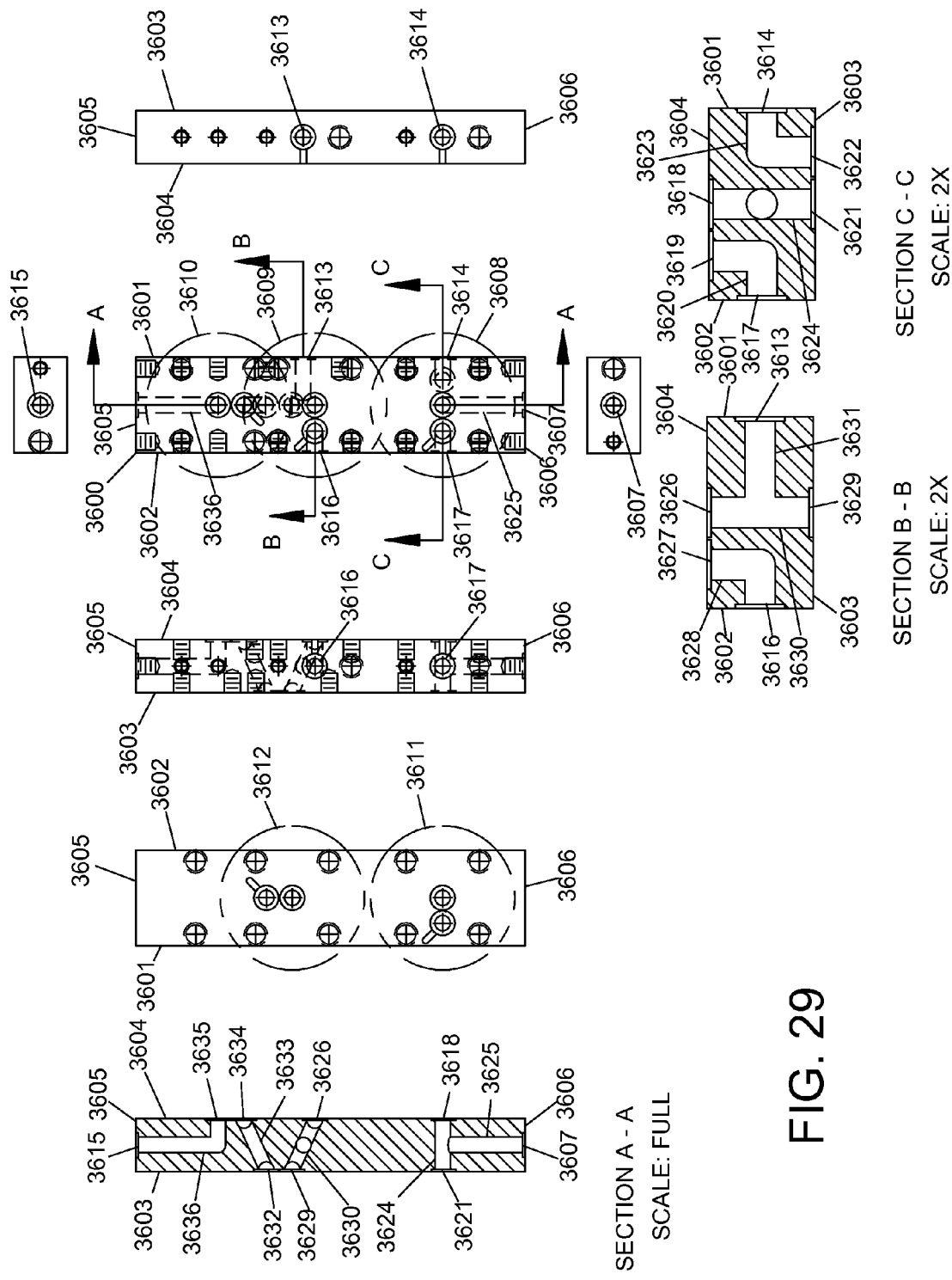
FIG. 29 shows a first embodiment of a dual channel two sided manifold plate of a kind contemplated in the present invention.

FIG. 29 shows a first embodiment of a dual channel two sided manifold plate of a kind contemplated in the present invention. FIG. 29 details a manifold plate 3600 having five receiving component stations. Manifold plate 3600 is of the kind used to form a fluid delivery system. The manifold plate 3600 is rectangular and includes a pair of side walls 3601 and 3602, a lateral bottom wall 3603, a lateral top wall 3604, and end walls 3605 and 3606. The manifold plate 3600 is substantially unitary and comprises a solid piece defining a first fluid channel inlet 3607, a second fluid channel inlet 3613, and five component receiving stations, 3608, 3609, 3610, 3611, and 3612, The manifold plate 3600 is configured such that one or more active fluid components are coupled to each of two opposing sides of the manifold plate. Included are a first fluid channel outlet 3614, a second fluid channel outlet 3615, and bypass outlets 3616, and 3617. An inlet 3618 to the component receiving station 3608 located on the lateral top wall 3604 of the one piece manifold plate 3600 is connected in fluid communication by an internal fluid passageway 3624 to an inlet 3621 of the second component receiving station 3611 located on the lateral bottom wall 3603 of the same one piece manifold plate 3600. An outlet 3619 of component receiving station 3608 is connected in fluid communication by an internal fluid passageway 3620 at 90 degrees in fluid communication with bypass outlet 3617 located on side wall 3602, The first fluid channel inlet 3607 located on end wall 3606 is connected in fluid communication by an internal fluid passageway 3625 to the internal fluid passageway 3624. An outlet 3622 of the component receiving station 3611 is connected in fluid communication by an internal fluid passageway 3623 at 90 degrees in fluid communication with first fluid channel outlet 3614 located on side wall 3601. An inlet 3626 to the third component receiving station 3609 located on the lateral top wall 3604 of the one piece manifold plate 3600 is connected in fluid communication by an internal fluid passageway 3630 to an inlet 3629 of the fourth component receiving station 3612 located on the lateral bottom wall 3603 of the same one piece manifold plate 3600. An outlet 3627 of the component receiving station 3609 is connected in fluid communication by an internal fluid passageway 3628 at 90 degrees in fluid communication with bypass outlet 3616 located on side wall 3602. The second fluid channel inlet 3613 located on side wall 3601 is connected in fluid communication by an internal fluid passageway 3631 to the internal fluid passageway 3630. An outlet 3632 from the component receiving station 3612 is connected in fluid communication by an internal fluid passageway 3633 with an inlet 3634 of the fifth component receiving station 3610 located on the lateral top wall 3604 of the same one piece manifold plate 3600. An outlet 3635 from the fifth component receiving station 3610 is connected in fluid communication by an internal fluid passageway 3636 at 90 degrees in fluid communication with the second fluid channel outlet 3615 located on end wall 3605. The internal fluid passageways 3633, 3630, and 3624 form single-axis, straight-line fluid pathways through the manifold plate 3600. Included are holes (not shown) running the length of the rectangular manifold plate 3600 to accommodate heater rods that allow for heating of the gas, manifold, and attached operational fluid components. An additional embodiment of the invention is a mirror image of manifold plate 3600.

FIG. 30 shows a second embodiment of a dual channel two sided manifold plate of a kind contemplated in the present invention. FIG. 30 details a manifold plate 3700 having seven receiving component stations. Manifold plate 3700 is of the kind used to form a fluid delivery system shown in FIG. 28A, FIG. 28B, FIG. 28C and FIG. 28D. The manifold plate 3700 is rectangular and includes a pair of side walls 3701 and 3702, a lateral bottom wall 3703, a lateral top wall 3704, and end walls 3705 and 3706. The manifold plate 3700 is substantially unitary and comprises a solid piece defining a first fluid channel inlet 3707, a second fluid channel inlet 3713, and seven component receiving stations, 3708, 3709, 3710, 3711, 3712, 3737, and 3738. The manifold plate 3700 is configured such that one or more active fluid components are coupled to each of two opposing sides of the manifold plate. Included are a first fluid channel outlet 3714, a second fluid channel outlet 3715, and bypass outlets 3716, and 3717. An inlet 3718 to the component receiving station 3708 located on the lateral top wall 3704 of the one piece manifold plate 3700 is connected in fluid communication by an internal fluid passageway 3724 to an inlet 3721 of the second component receiving station 3711 located on the lateral bottom wall 3703 of the same one piece manifold plate 3700. An outlet 3719 of the component receiving station 3708 is connected in fluid communication by an internal fluid passageway 3720 at 90 degrees in fluid communication with bypass outlet 3717 located on side wall 3702. The first fluid channel inlet 3707 located on end wall 3706 is connected in fluid communication by an internal fluid passageway 3725 to the internal fluid passageway 3724. An outlet 3722 of the component receiving station 3711 is connected in fluid communication by an internal fluid passageway 3723 at 90 degrees in fluid communication with first fluid channel outlet 3714 located on side wall 3701. An inlet 3726 to the third component receiving station 3709 located on the lateral top wall 3704 of the one piece manifold plate 3700 is connected in fluid communication by an internal fluid passageway 3730 to an inlet 3729 of the fourth component receiving station 3712 located on the lateral bottom wall 3703 of the same one piece manifold plate 3700. An outlet 3727 of the component receiving station 3709 is connected in fluid communication by an internal fluid passageway 3728 at 90 degrees in fluid communication with bypass outlet 3716 located on side wall 3702. The second fluid channel inlet 3713 located on side wall 3701 is connected in fluid communication by an internal fluid passageway 3731 to common internal fluid passageway 3730. An outlet 3732 from the component receiving station 3712 is connected in fluid communication by an internal fluid passageway 3733 with an inlet 3734 of the fifth component receiving station 3710 located on the lateral top wall 3704 of the same one piece manifold plate 3700. An outlet 3735 from the component receiving station 3710 is connected in fluid communication by an internal fluid passageway 3739 with an inlet 3740 of the sixth component receiving station 3738 located on the lateral bottom wall 3703 of the same one piece manifold plate 3700. An outlet 3741 from the component receiving station 3738 is connected in fluid communication by an internal fluid passageway 3742 with an inlet 3743 of the seventh component receiving station 3737 located on the lateral top wall 3704 of the same one piece manifold plate 3700. An outlet 3744 from the seventh component receiving station 3737 is connected in fluid communication by an internal fluid passageway 3736 at 90 degrees in fluid communication with the second fluid channel outlet 3715 located on end wall 3705 of the same one piece manifold plate 3700. The internal fluid passageways 3742, 3739, 3733, 3730, and 3724 form single-axis, straight-line fluid pathways through the manifold plate 3700. Included are holes (not shown) running the length of the rectangular manifold 3700 to accommodate heater rods that allow for heating of the gas, manifold, and attached operational fluid components. An additional embodiment of the invention is a mirror image of manifold plate 3700.

The fluid delivery system includes the manifold plate having component receiving stations on opposing sides. In addition to reducing the length of the fluid pathway from device inlet to outlet, and to reducing the overall size of the manifold plate, as described above, configuring the manifold plate with component receiving stations on opposing sides also enables assembly of the active fluid components so as to ease maintenance functions. For example, it is known that certain fluid components, such as pressure regulators, filters, and mass flow controllers, require maintenance and/or replacement at a greater rate than others, such as pressure transducers and pneumatic valves. In some embodiments, those fluid components that require greater service are positioned on a first side of the manifold plate, while the other fluid components are positioned on the opposing side. The fluid delivery system can then be oriented, such as within a gas cabinet or other storage area, such that the first side is facing outward for ease of service.

The present application has been described in terms of specific embodiments incorporating details to facilitate the understanding of the principles of construction and operation of the fluid delivery system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A modular gas delivery system comprising:
   a. a manifold having an upper surface, four vertical sides and a lower surface thereon located three or more component receiving stations located on the upper and lower surfaces, each of the component receiving stations having a gas inlet and a gas outlet;
   b. a first fluid delivery channel formed by a first and second component receiving station located on opposite sides of the manifold, the gas inlet from the first component receiving station is connected in fluid communication by an internal fluid passageway with the gas inlet of the second component receiving station;
   c. a second fluid delivery channel formed by remaining component receiving stations, the gas outlets from the component receiving stations located on the upper surface of the gas delivery manifold being connected in fluid communication by an internal fluid passageway with the gas inlets of the component receiving stations located on the lower surface of the manifold; and
   d. a plurality of fluid components, one fluid component connected to a corresponding one component receiving station.

2. A modular gas delivery system comprising:
   a. a manifold having an upper surface, four vertical sides and a lower surface thereon located three component receiving stations on the upper surface and two component receiving stations on the lower surface, each component receiving stations having a gas inlet and a gas a outlet;
   b. a first fluid delivery channel formed by a first and second component receiving station located on opposite sides of the gas delivery manifold, the gas inlet from the first component receiving station is connected in fluid communication by a first internal fluid passageway with the gas inlet of the second component receiving station, wherein the first fluid delivery channel includes an inlet port located on one of the four vertical sides with a second internal passageway in fluid communication with the first internal fluid passageway, a first outlet port located on one of the four vertical sides with a third internal passageway at 90 degrees in fluid communication with the outlet port from the first component receiving station, and a second outlet port located on one of the opposite vertical side from that which is located the first outlet port with a fourth internal passageway at 90 degrees in fluid communication with the outlet port from the second component receiving station;
   c. a second fluid delivery channel formed by remaining three component receiving stations, the gas inlet from a third component receiving station located on the upper surface of the manifold is connected in fluid communication by a fifth internal fluid passageway with the gas inlet of a fourth component receiving station located on the lower surface of the manifold, wherein the second fluid delivery channel includes an inlet port located on one of the four vertical sides with a sixth internal passageway in fluid communication with the fifth internal fluid passageway, a first outlet port located on one of the four vertical sides with a seventh internal passageway at 90 degrees in fluid communication with the outlet port from the third component receiving station, the gas outlet from the fourth component receiving station being connected in fluid communication by an eight internal fluid passageway with the gas inlet of a fifth component receiving station located on the upper surface of the manifold, wherein the second fluid delivery channel further comprises a second outlet port located on one of the four vertical sides with a ninth internal passageway at 90 degrees in fluid communication with the outlet port from the fifth component receiving station; and
   d. a plurality of fluid components, one fluid component connected to a corresponding one component receiving station, whereas a single operative fluid control device is formed when the plurality of fluid components are connected to corresponding component receiving stations thus completing a sealed interconnection of the respective internal fluid passageways and the plurality of fluid components.

3. A modular gas delivery system comprising:
   a. a manifold having an upper surface, four vertical sides and a lower surface thereon located three component receiving stations on the upper surface and two component receiving stations on the lower surface, each component receiving stations having a gas inlet and a gas a outlet;
   b. a first fluid delivery channel formed by a first and second component receiving station located on opposite sides of the gas delivery manifold, the gas inlet from the first component receiving station is connected in fluid communication by a first internal fluid passageway with the gas inlet of the second component receiving station, wherein the first fluid delivery channel includes an inlet port located on one of the four vertical sides with a second internal passageway in fluid communication with the first internal fluid passageway, a first outlet port located on one of the four vertical sides with a third internal passageway at 90 degrees in fluid communication with the outlet port from the first component receiving station, and a second outlet port located on one of the opposite vertical side from that which is located the first outlet port with a fourth internal passageway at 90 degrees in fluid communication with the outlet port from the second component receiving station;

c. a second fluid delivery channel formed by remaining five component receiving stations, the gas inlet from a third component receiving station located on the upper surface of the manifold is connected in fluid communication by a fifth internal fluid passageway with the gas inlet of a fourth component receiving station located on the lower surface of the manifold, wherein the second fluid delivery channel includes an inlet port located on one of the four vertical sides with a sixth internal passageway in fluid communication with the fifth internal fluid passageway, a first outlet port located on one of the four vertical sides with a seventh internal passageway at 90 degrees in fluid communication with the outlet port from the third component receiving station, the gas outlet from the fourth component receiving station being connected in fluid communication by an eight internal fluid passageway with the gas inlet of a fifth component receiving station located on the upper surface of the manifold, the gas outlet from the fifth component receiving station being connected in fluid communication by a ninth internal fluid passageway with the gas inlet of a sixth component receiving station located on the lower surface of the manifold, the gas outlet from the sixth component receiving station being connected in fluid communication by a tenth internal fluid passageway with the gas inlet of a seventh component receiving station located on the lower surface of the manifold, wherein the second fluid delivery channel further comprises a second outlet port located on one of the four vertical sides with an eleventh internal passageway at 90 degrees in fluid communication with the outlet port from the seventh component receiving station; and d. a plurality of fluid components, one fluid component connected to a corresponding one component receiving station, whereas a single operative fluid control device is formed when the plurality of fluid components are connected to corresponding component receiving stations thus completing a sealed interconnection of the respective internal fluid passageways and the plurality of fluid components.

* * * * *